Figure 1:
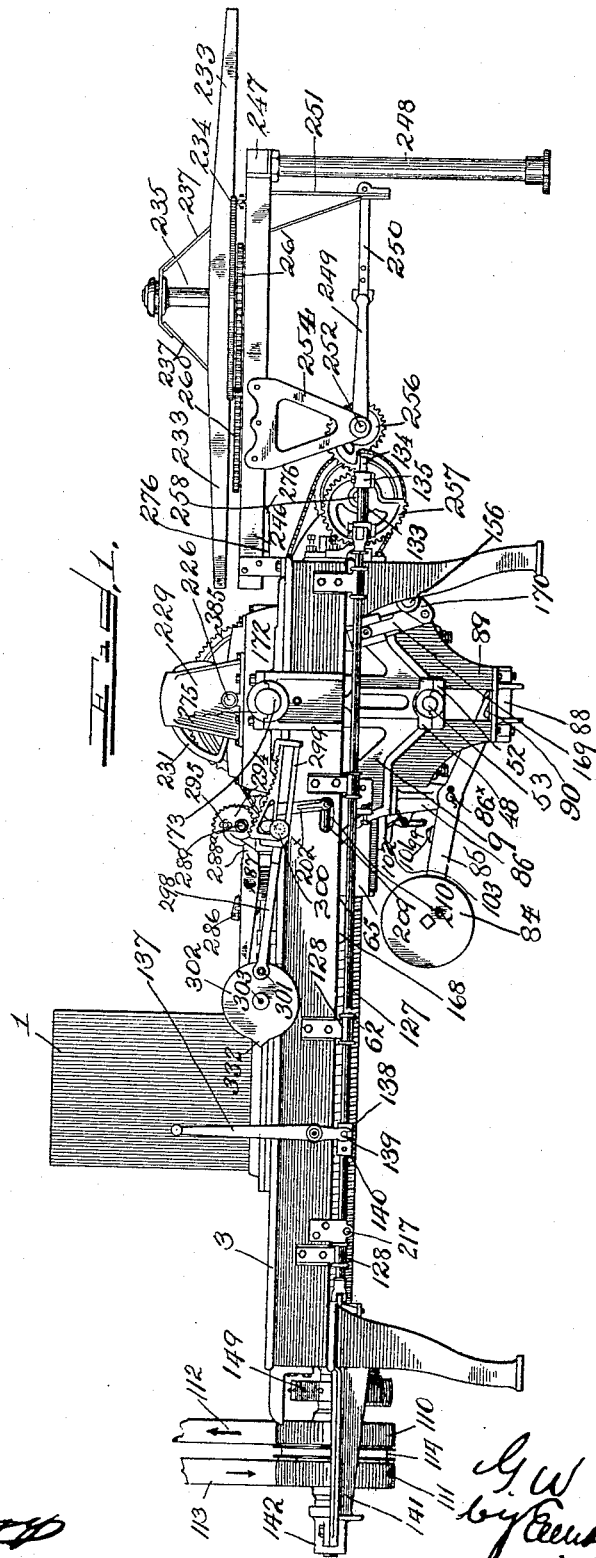

No. 768,071. PATENTED AUG. 23, 1904.
G. W. PACKER.
MOLDING MACHINE.
APPLICATION FILED JUNE 10, 1901.
NO MODEL. 41 SHEETS—SHEET 2.

No. 768,071. PATENTED AUG. 23, 1904.
G. W. PACKER.
MOLDING MACHINE.
APPLICATION FILED JUNE 10, 1901.
NO MODEL. 41 SHEETS—SHEET 4.

Witnesses: Inventor
G. W. Packer
by Elliott & Hopkins
Attys

No. 768,071. PATENTED AUG. 23, 1904.
G. W. PACKER.
MOLDING MACHINE.
APPLICATION FILED JUNE 10, 1901.
NO MODEL. 41 SHEETS—SHEET 5.
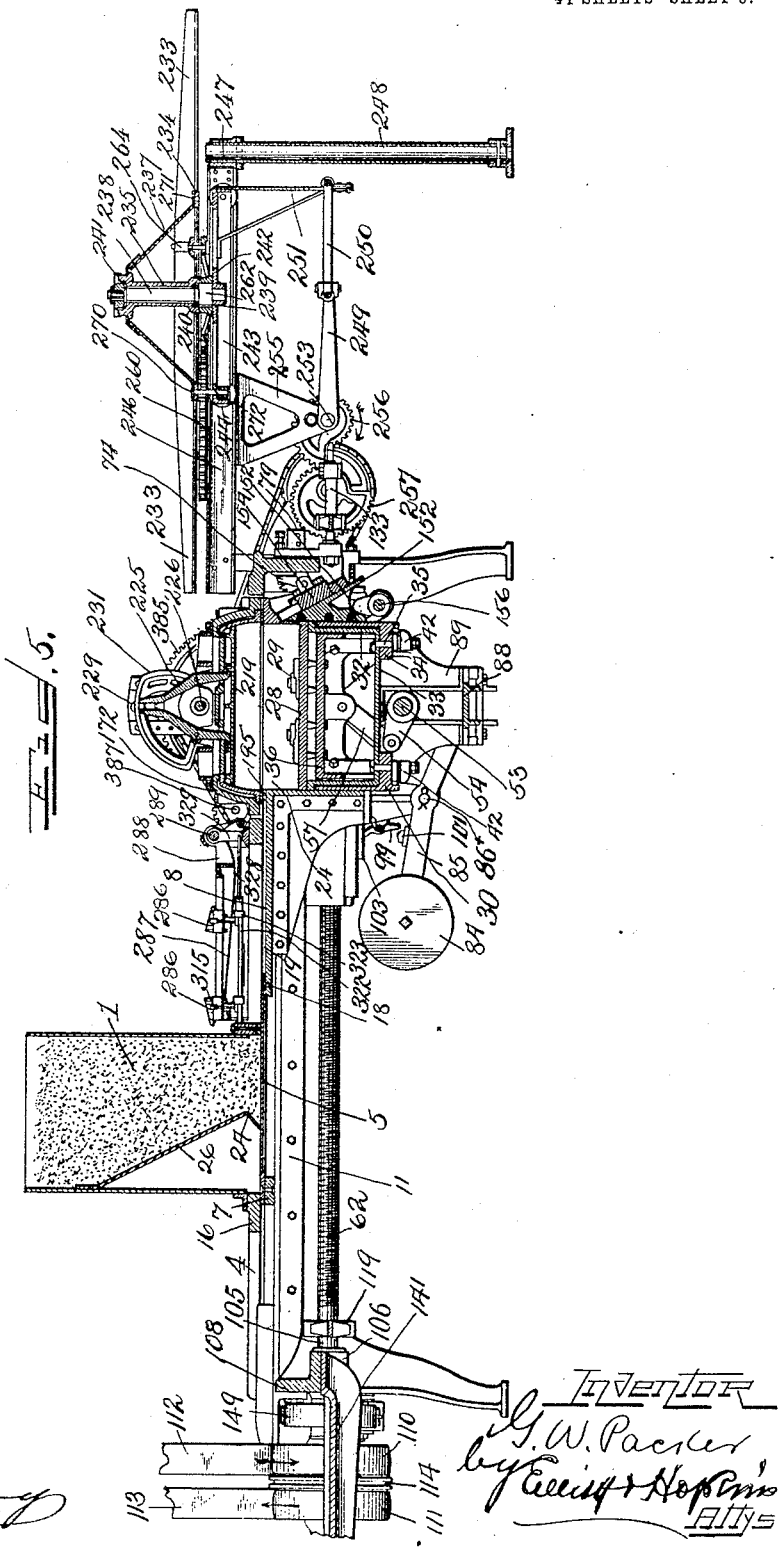

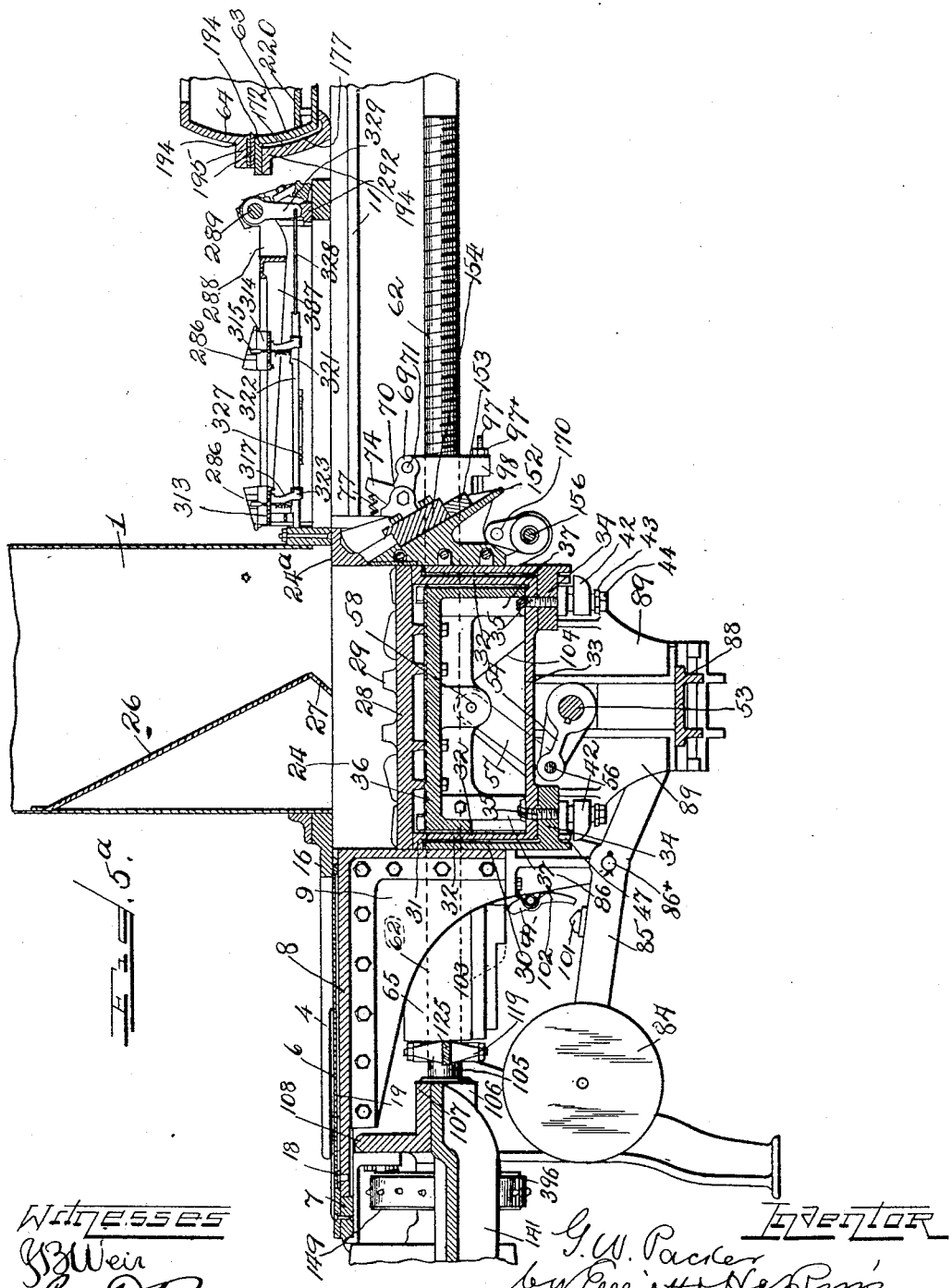

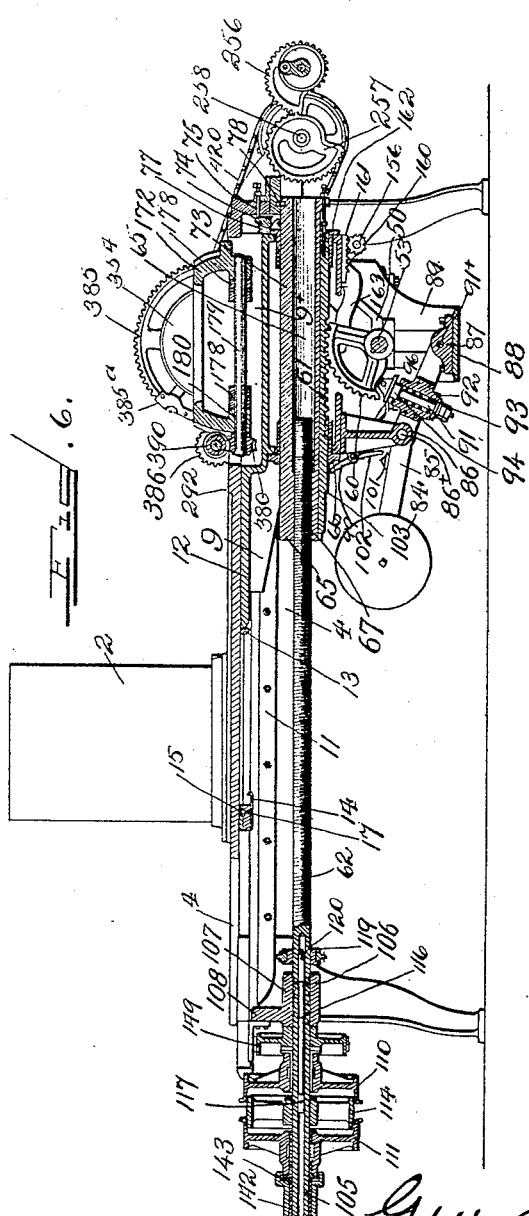

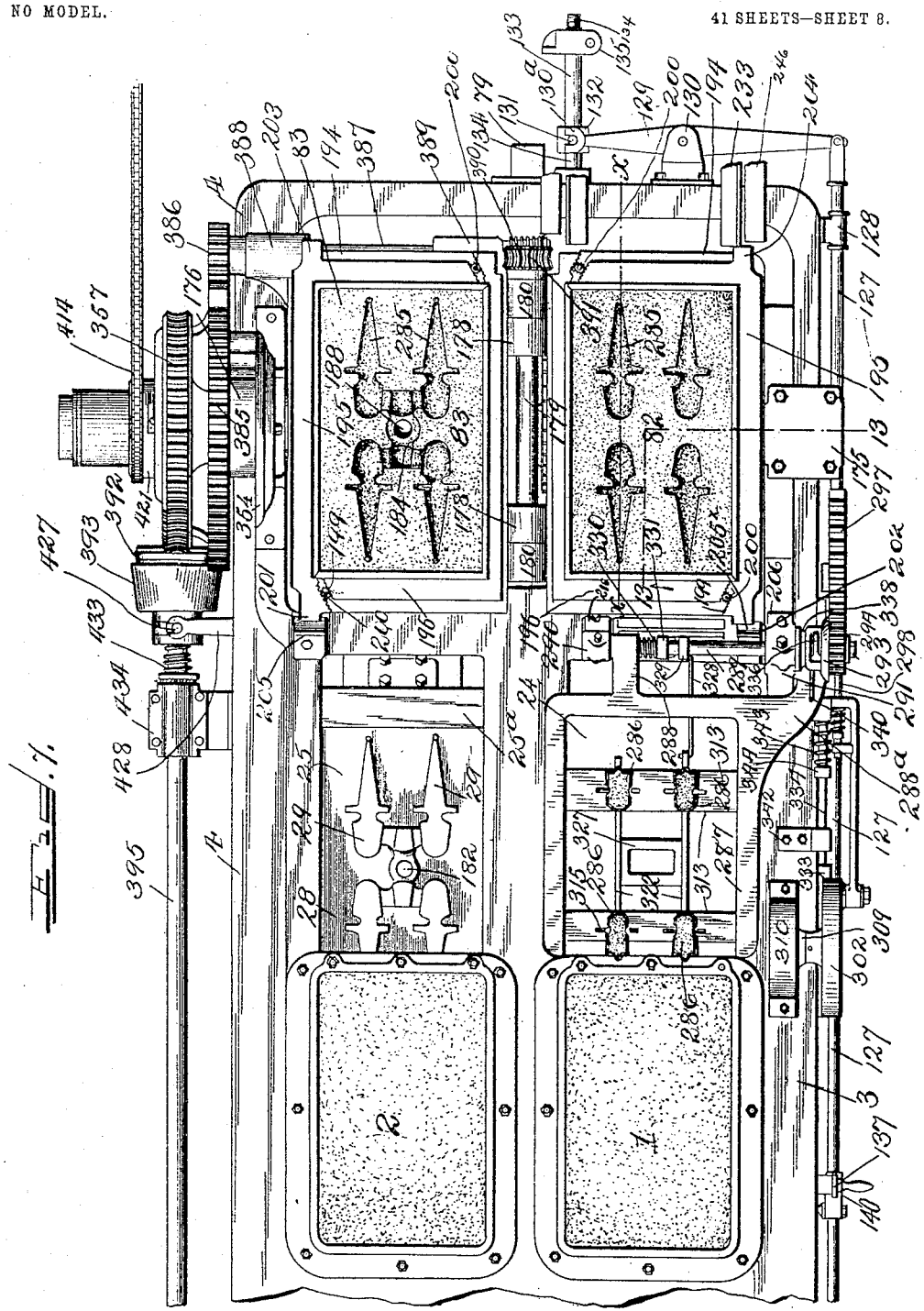

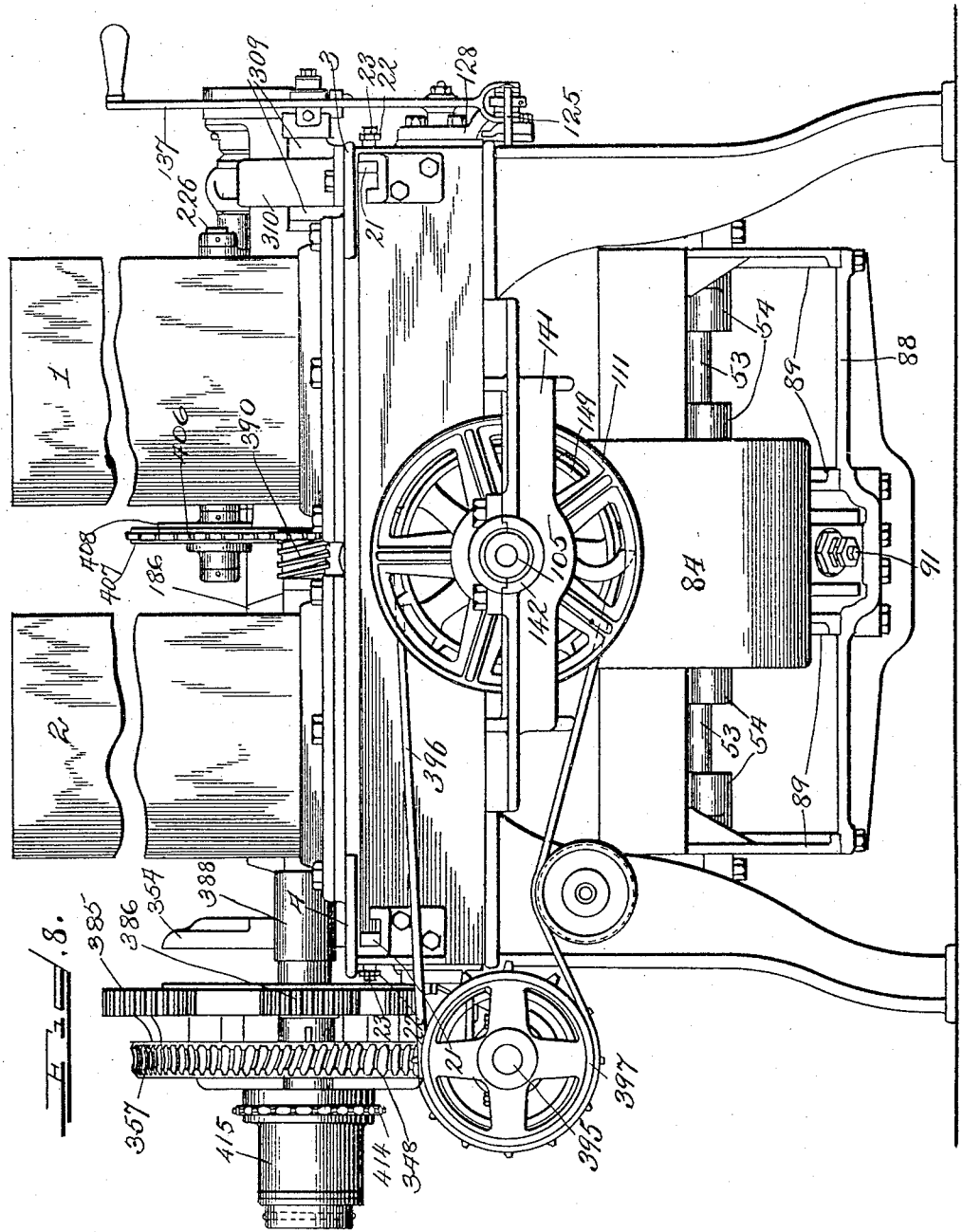

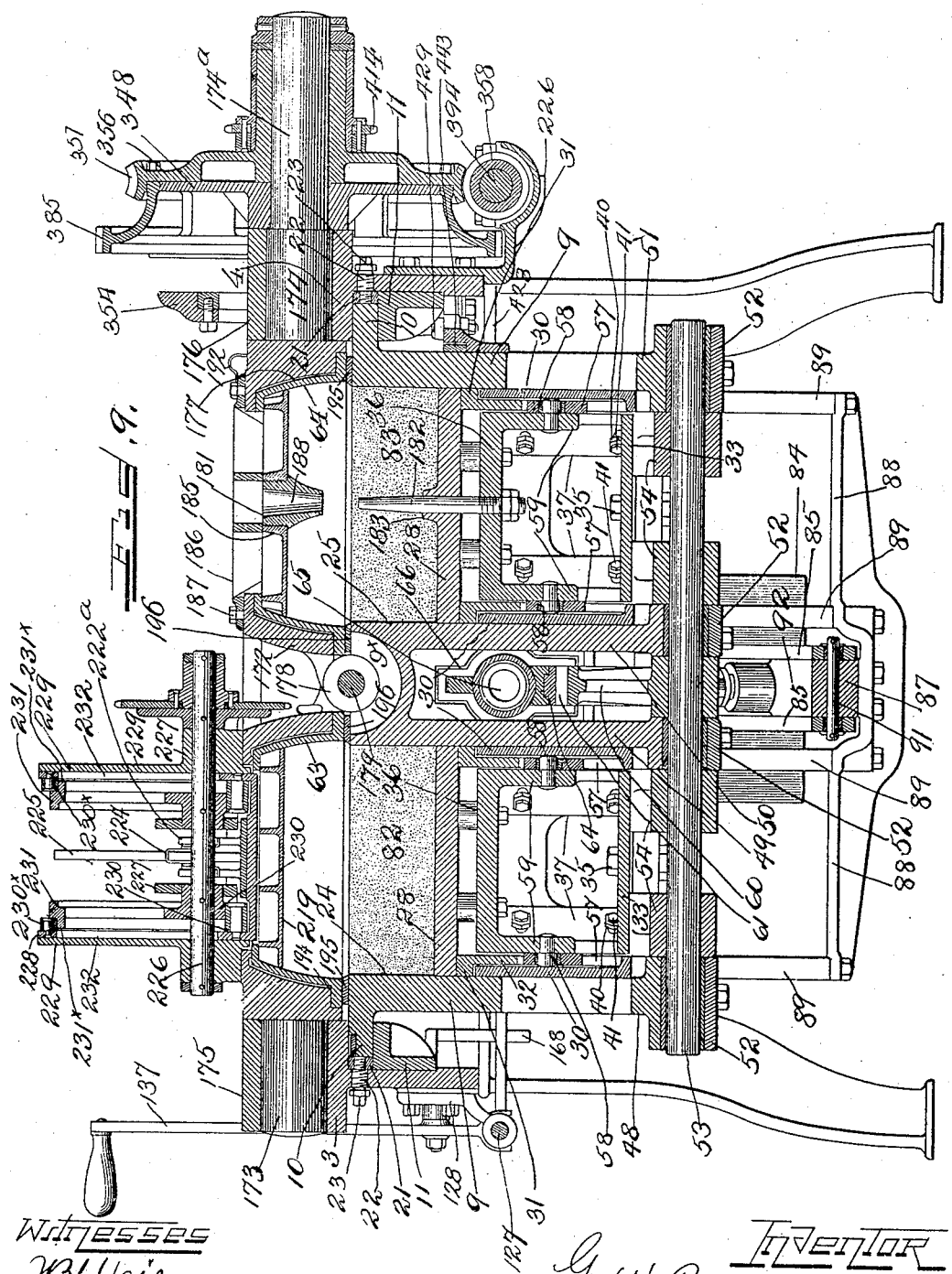

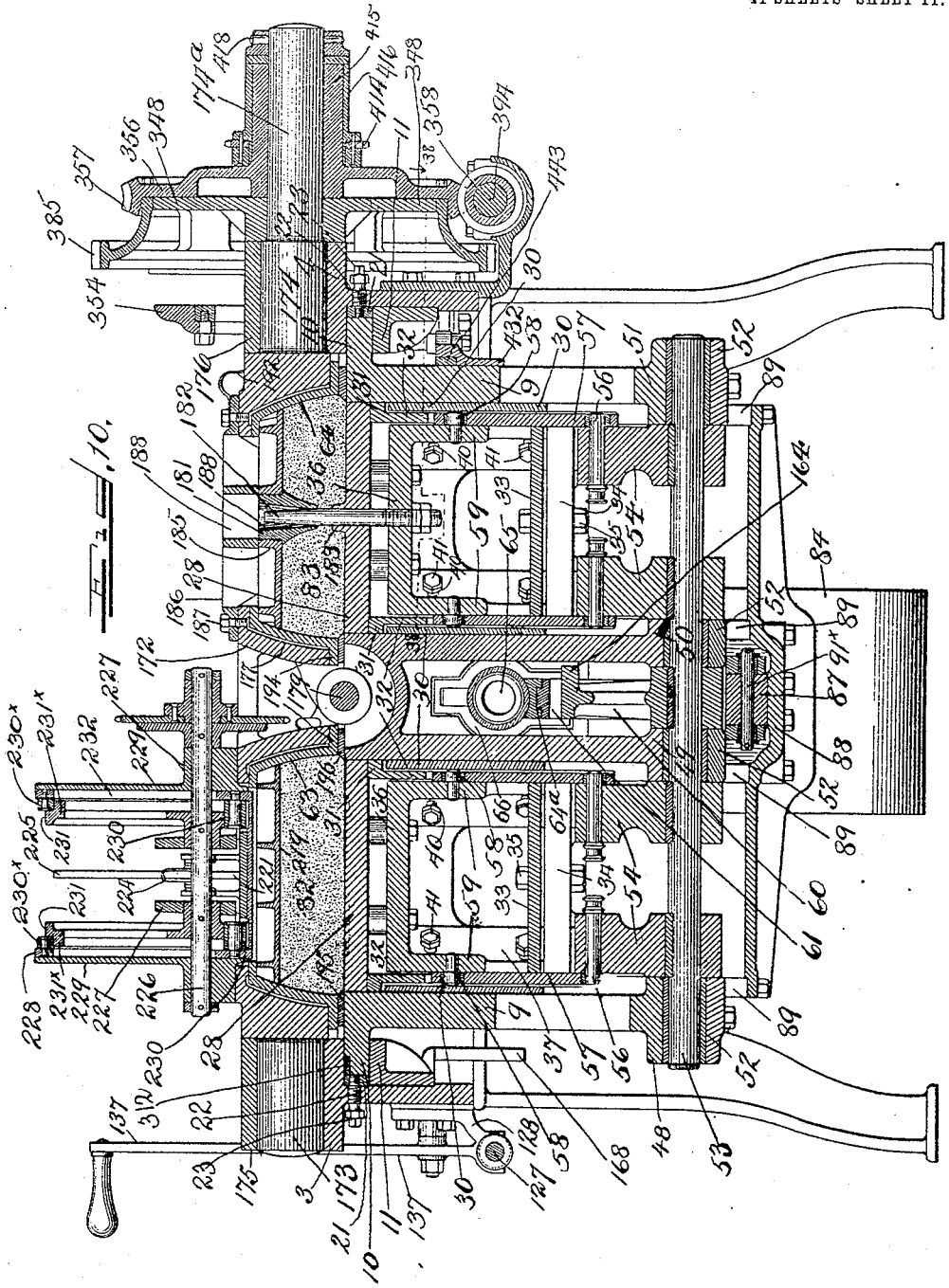

No. 768,071. PATENTED AUG. 23, 1904.
G. W. PACKER.
MOLDING MACHINE.
APPLICATION FILED JUNE 10, 1901.
NO MODEL. 41 SHEETS—SHEET 12.
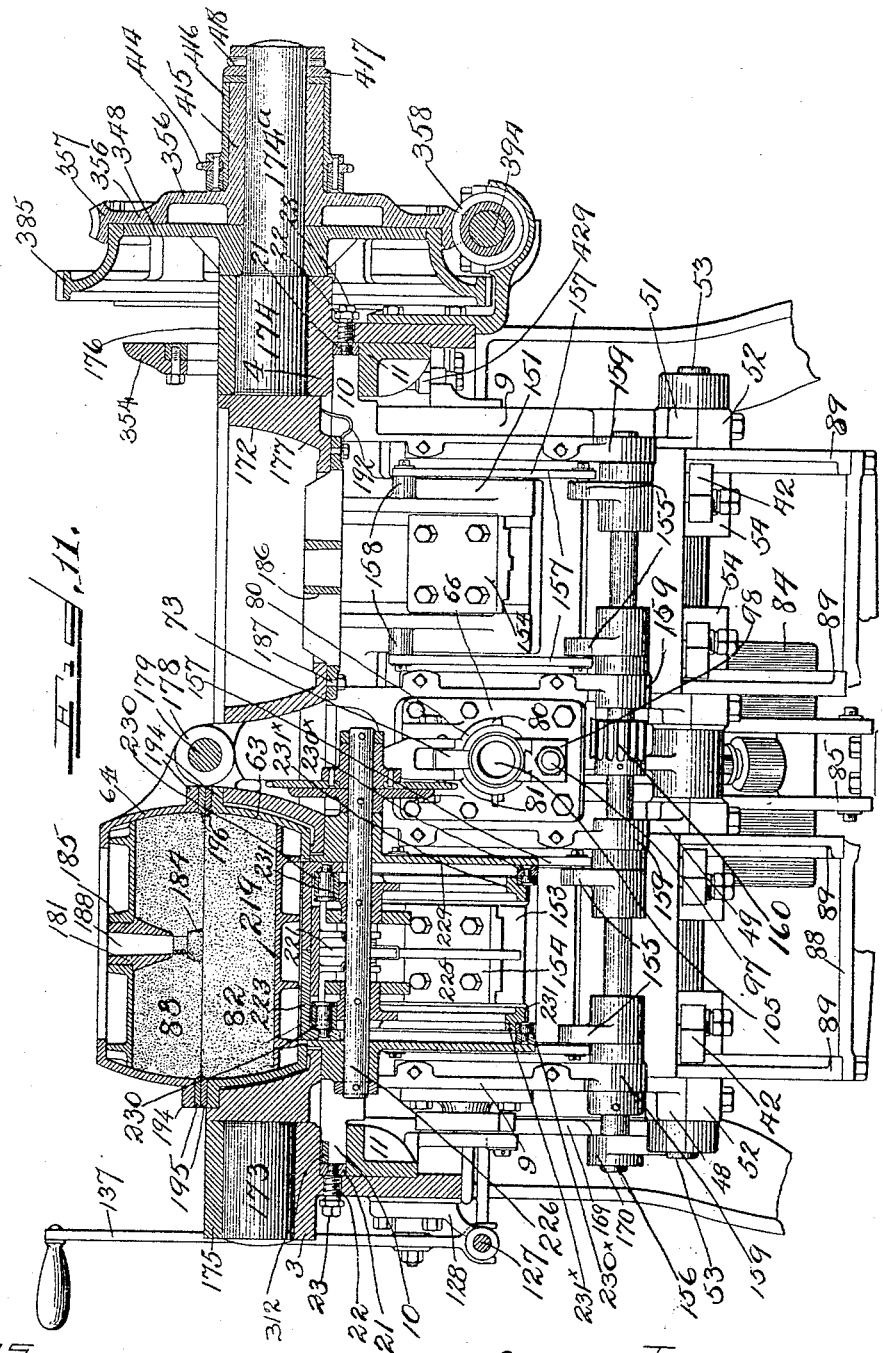

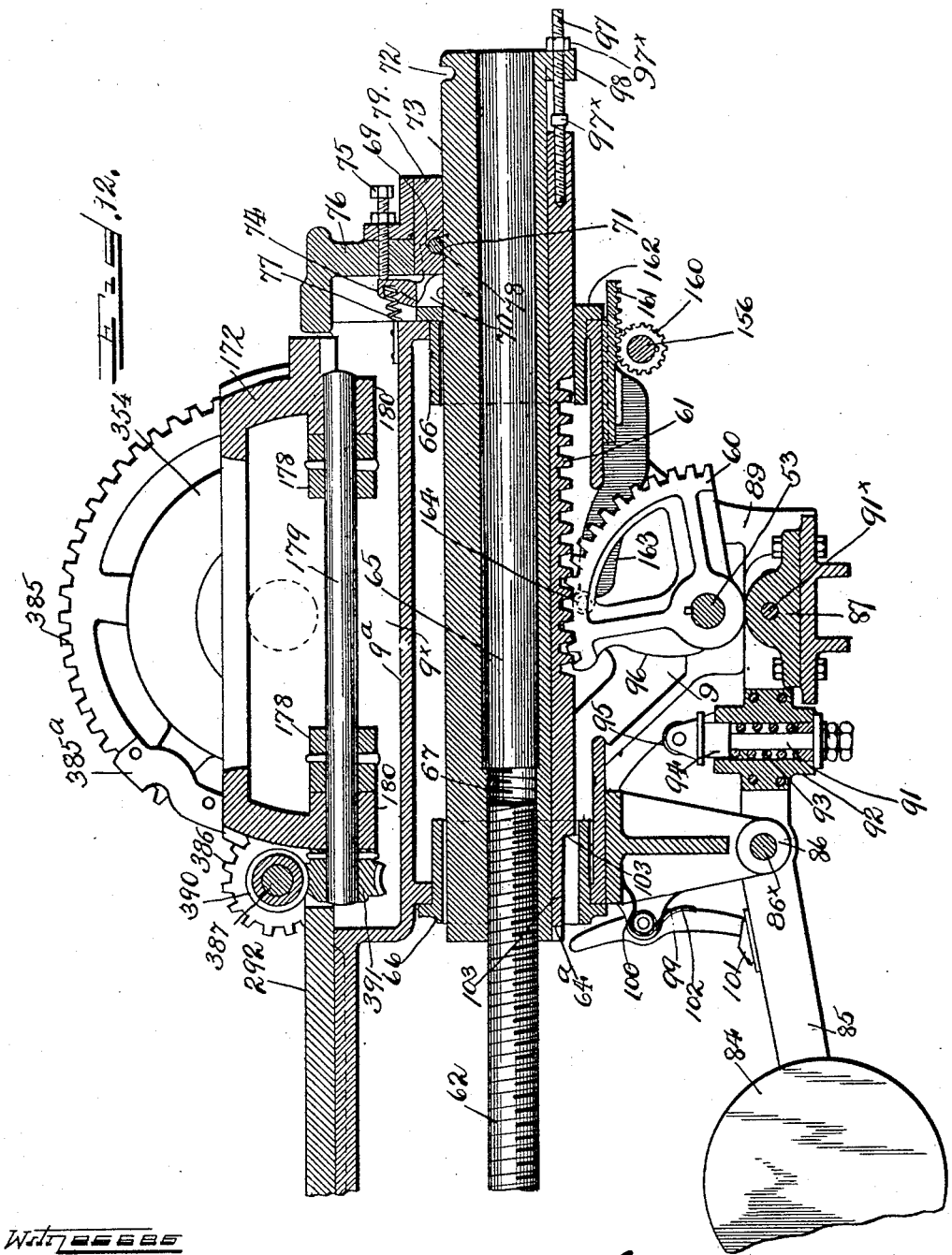

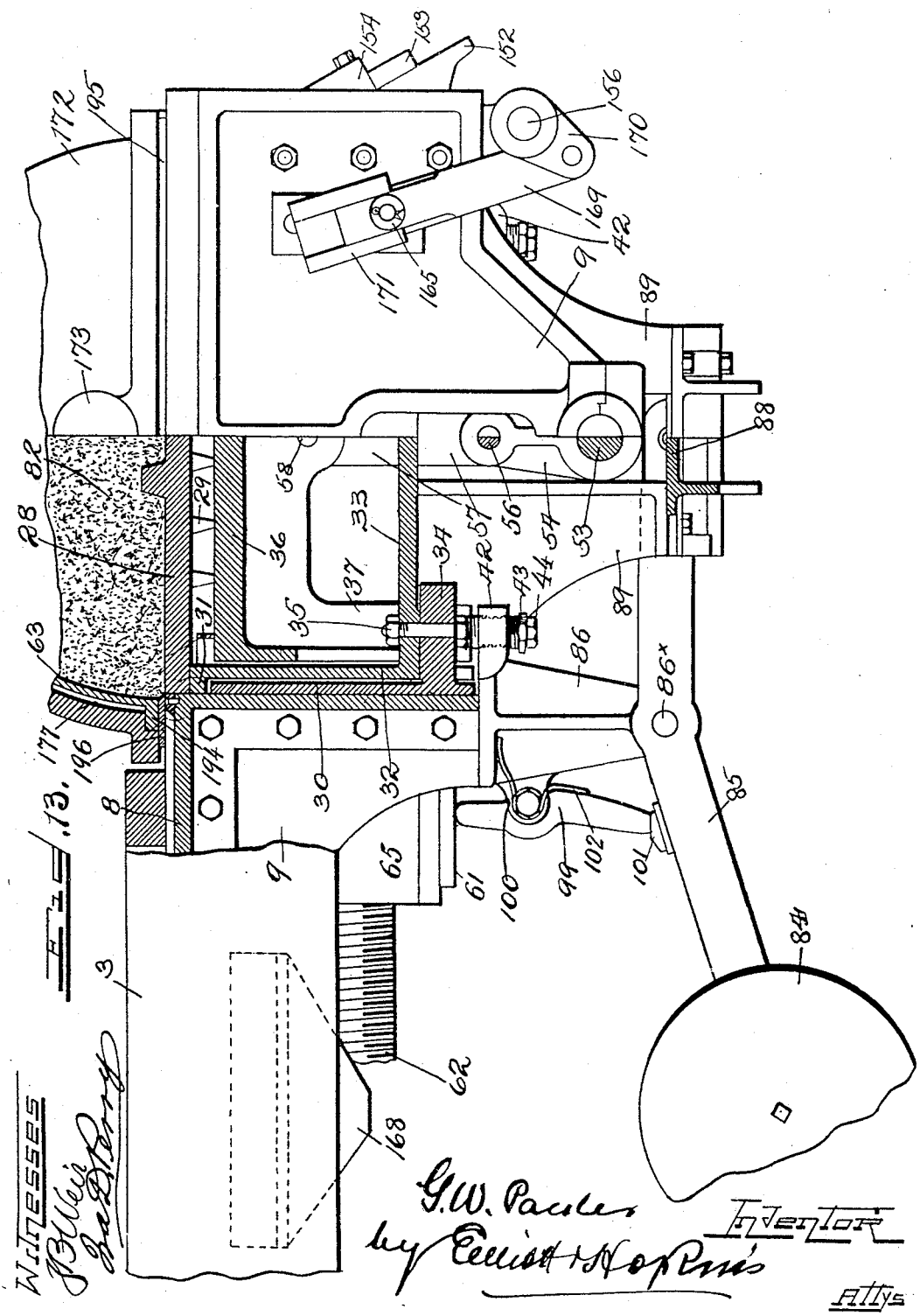

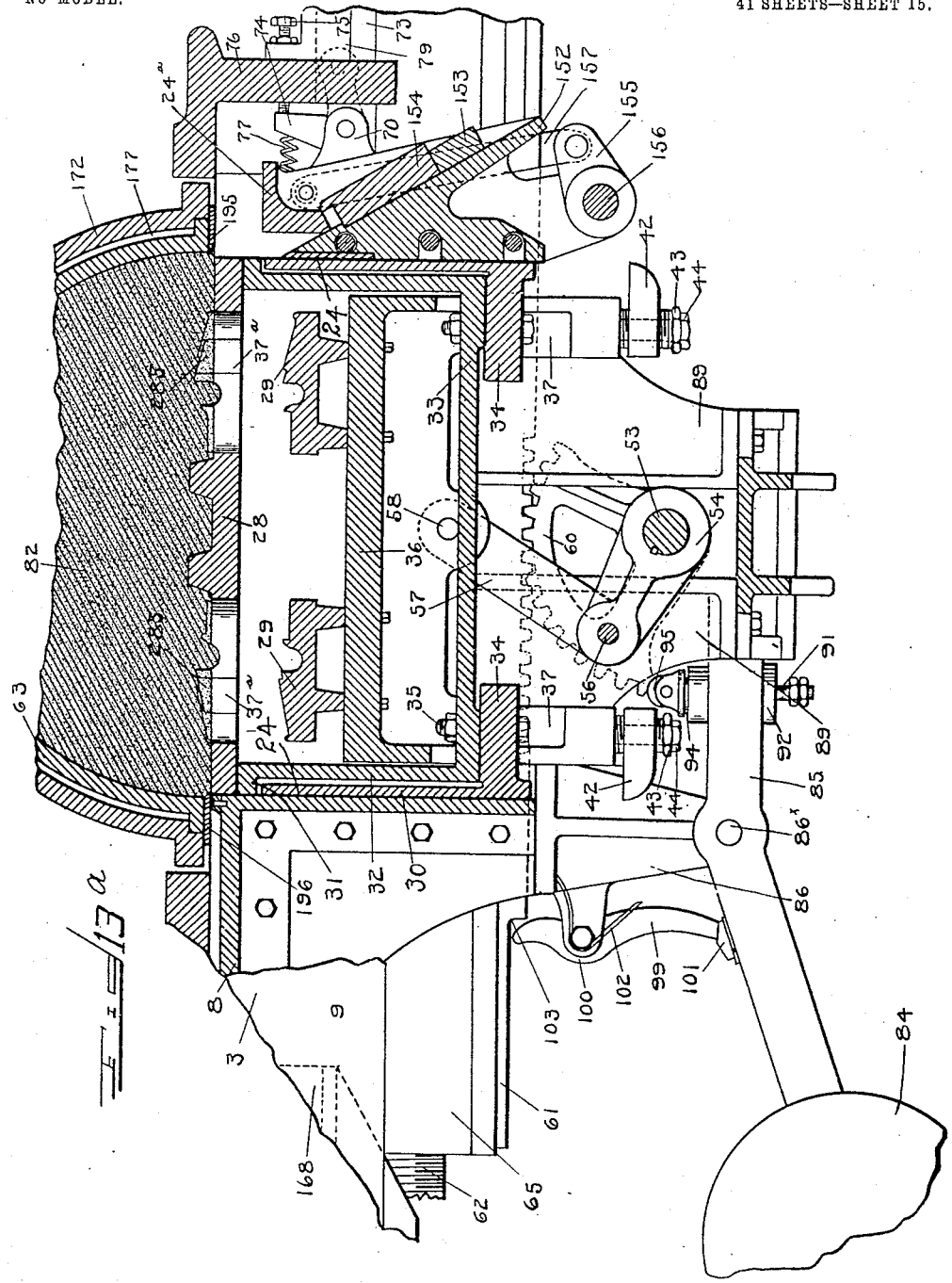

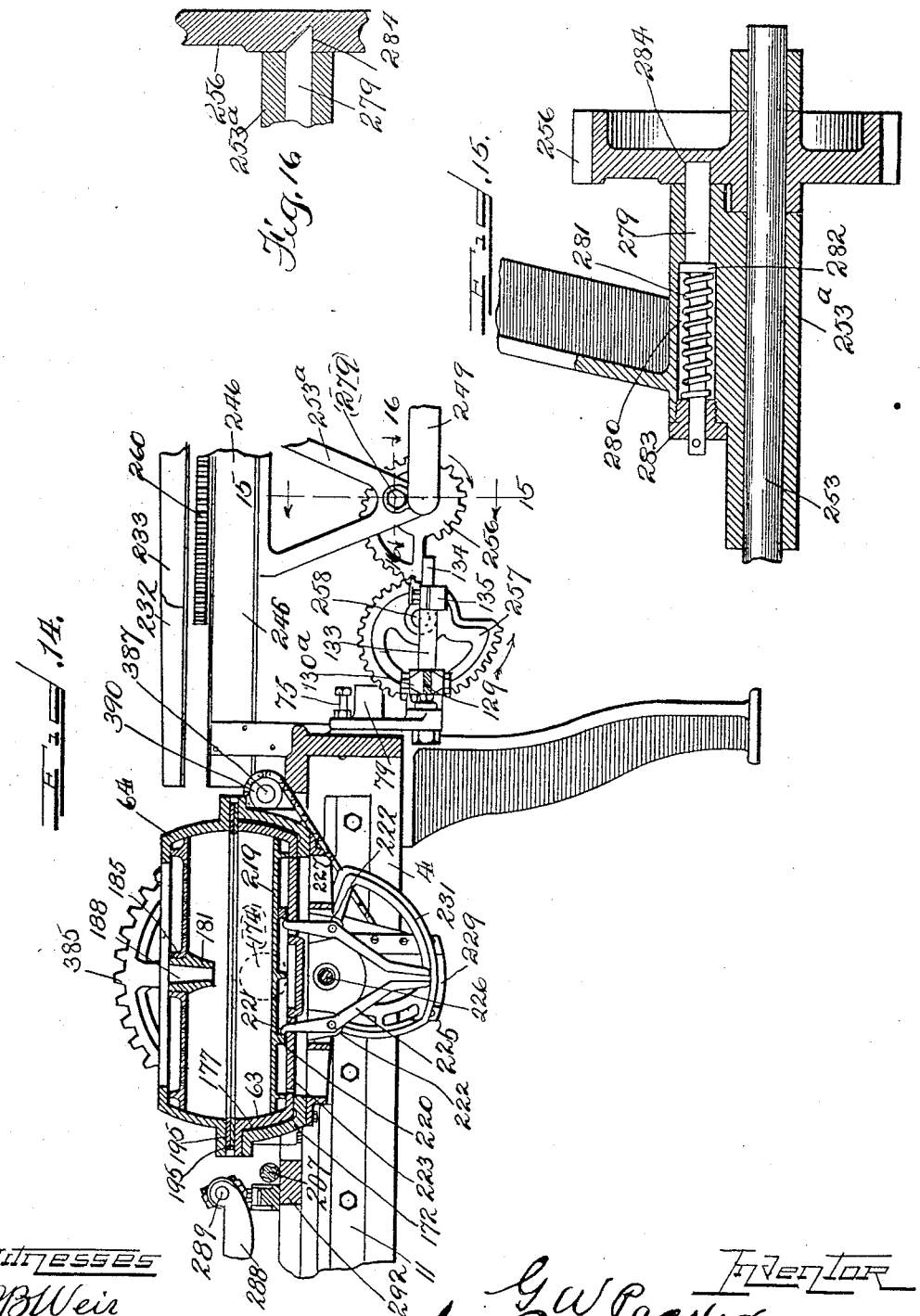

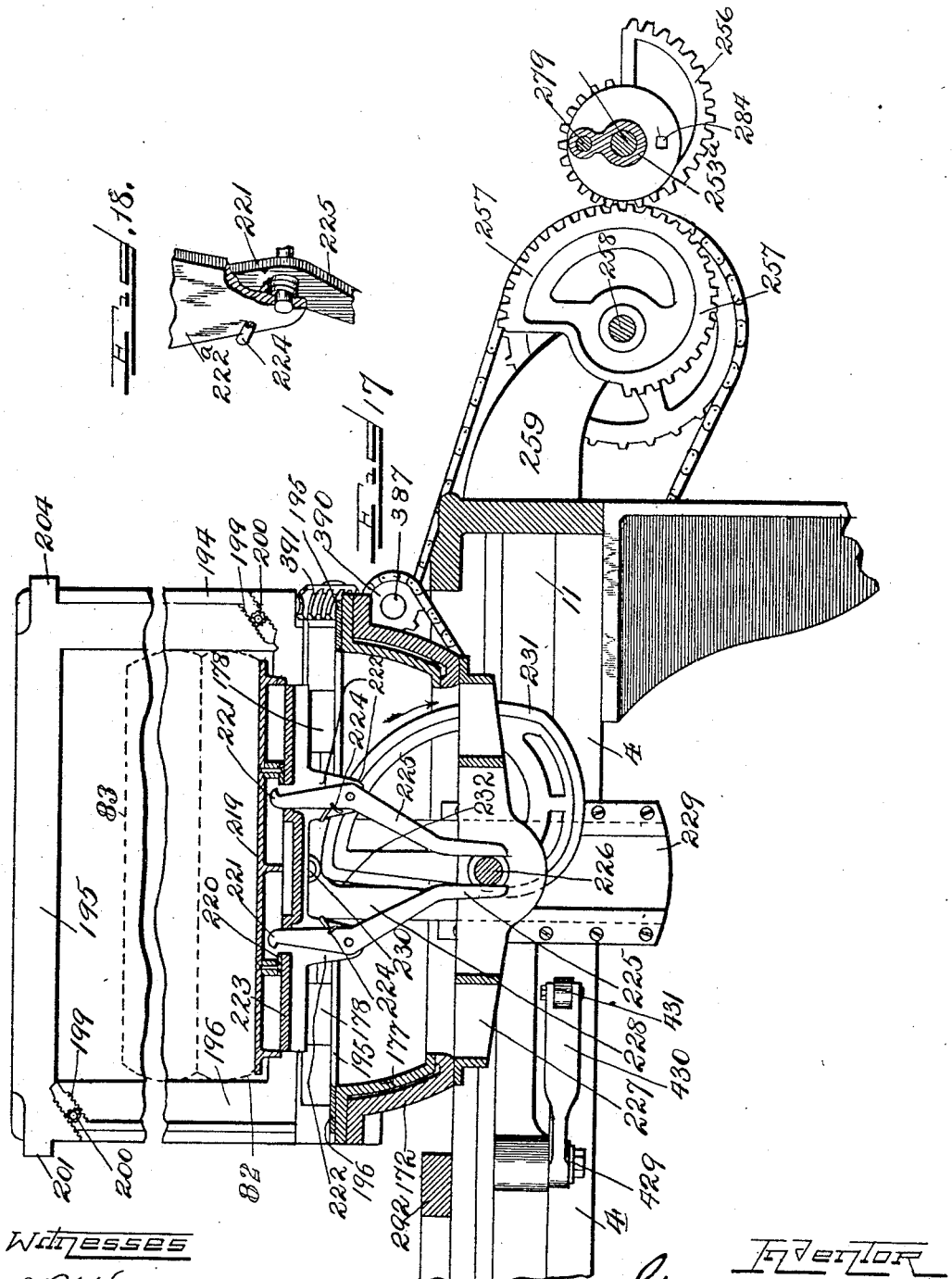

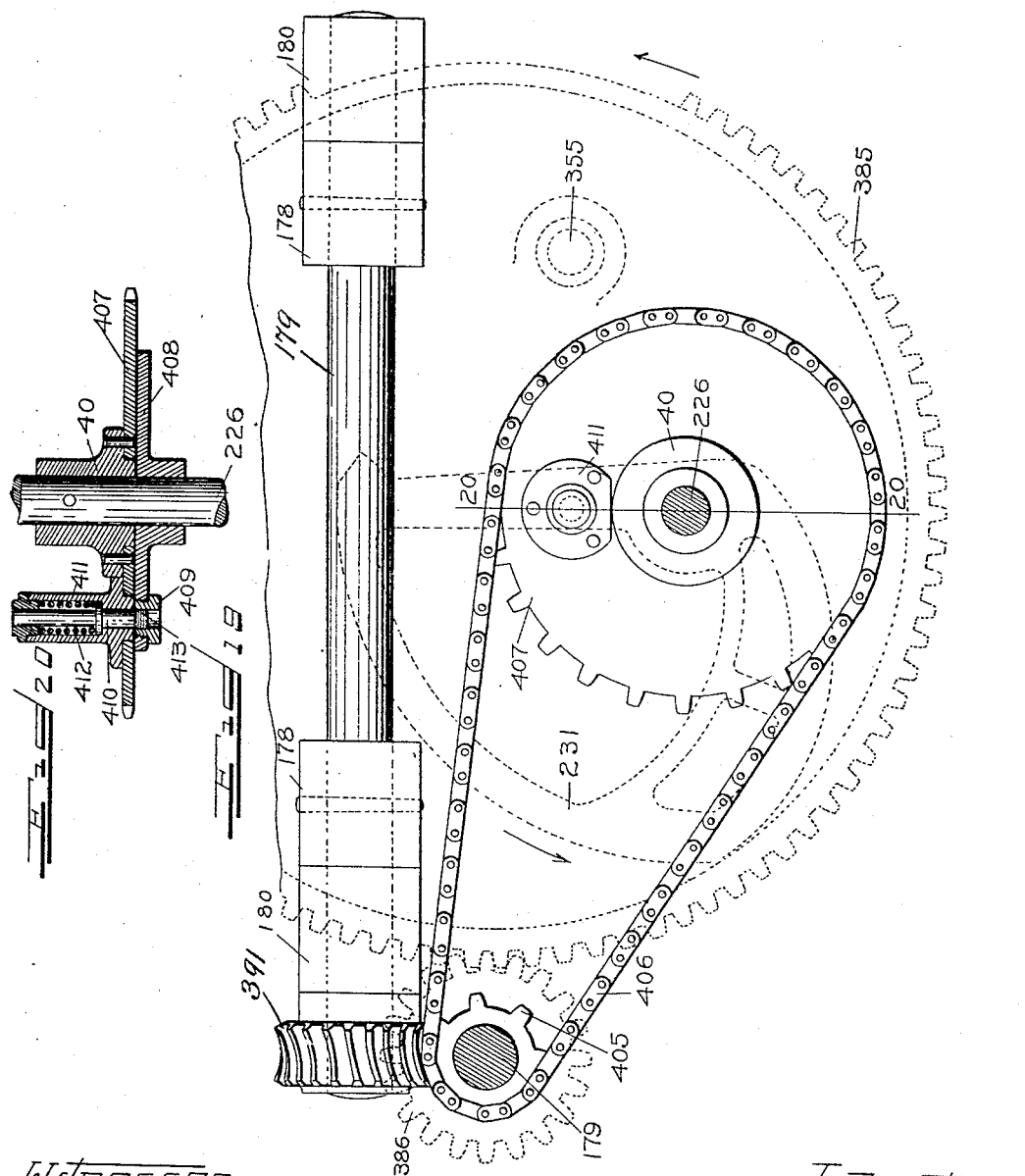

No. 768,071. PATENTED AUG. 23, 1904.
G. W. PACKER.
MOLDING MACHINE.
APPLICATION FILED JUNE 10, 1901.
NO MODEL. 41 SHEETS—SHEET 19.
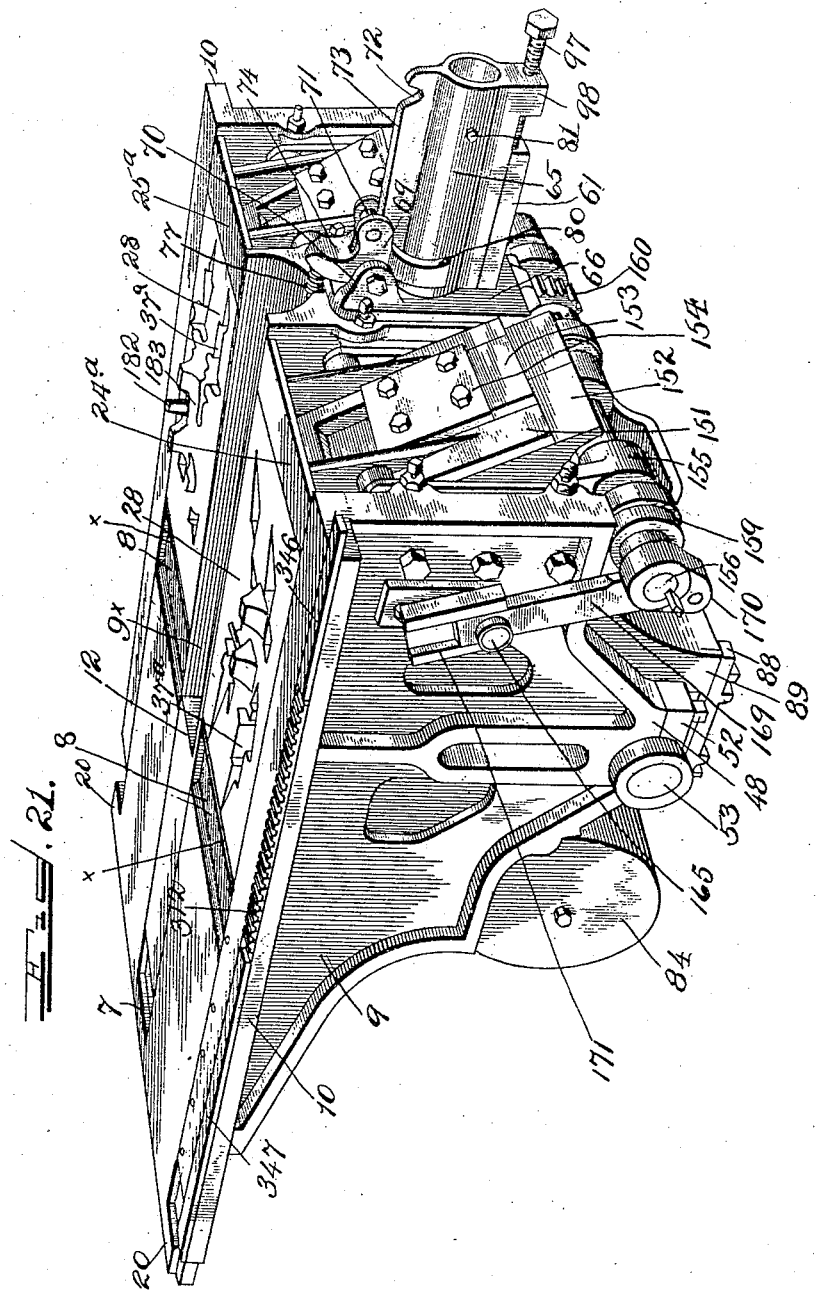
Witnesses
JB Weir
Inventor
G. W. Packer
by Elliott Hopkins
Attys

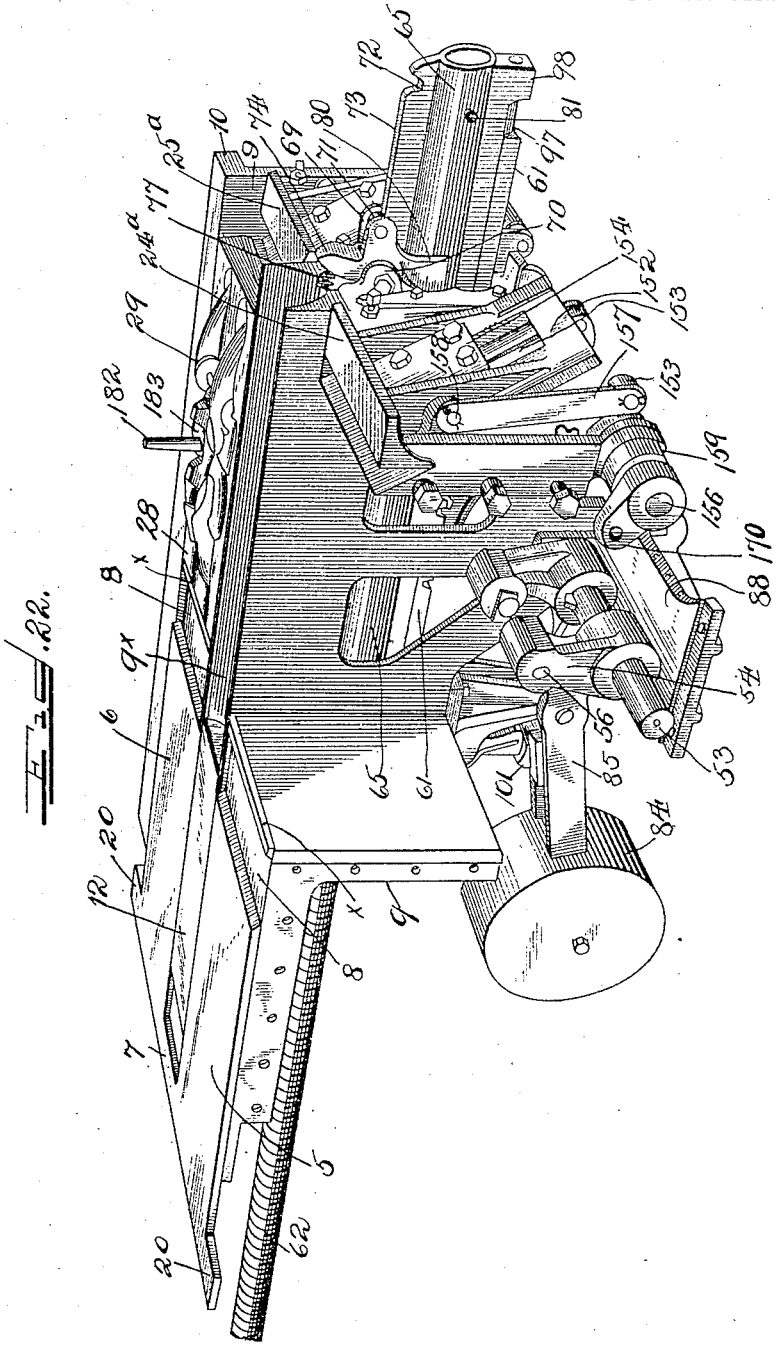

No. 768,071. PATENTED AUG. 23, 1904.
G. W. PACKER.
MOLDING MACHINE.
APPLICATION FILED JUNE 10, 1901.
NO MODEL. 41 SHEETS—SHEET 21.
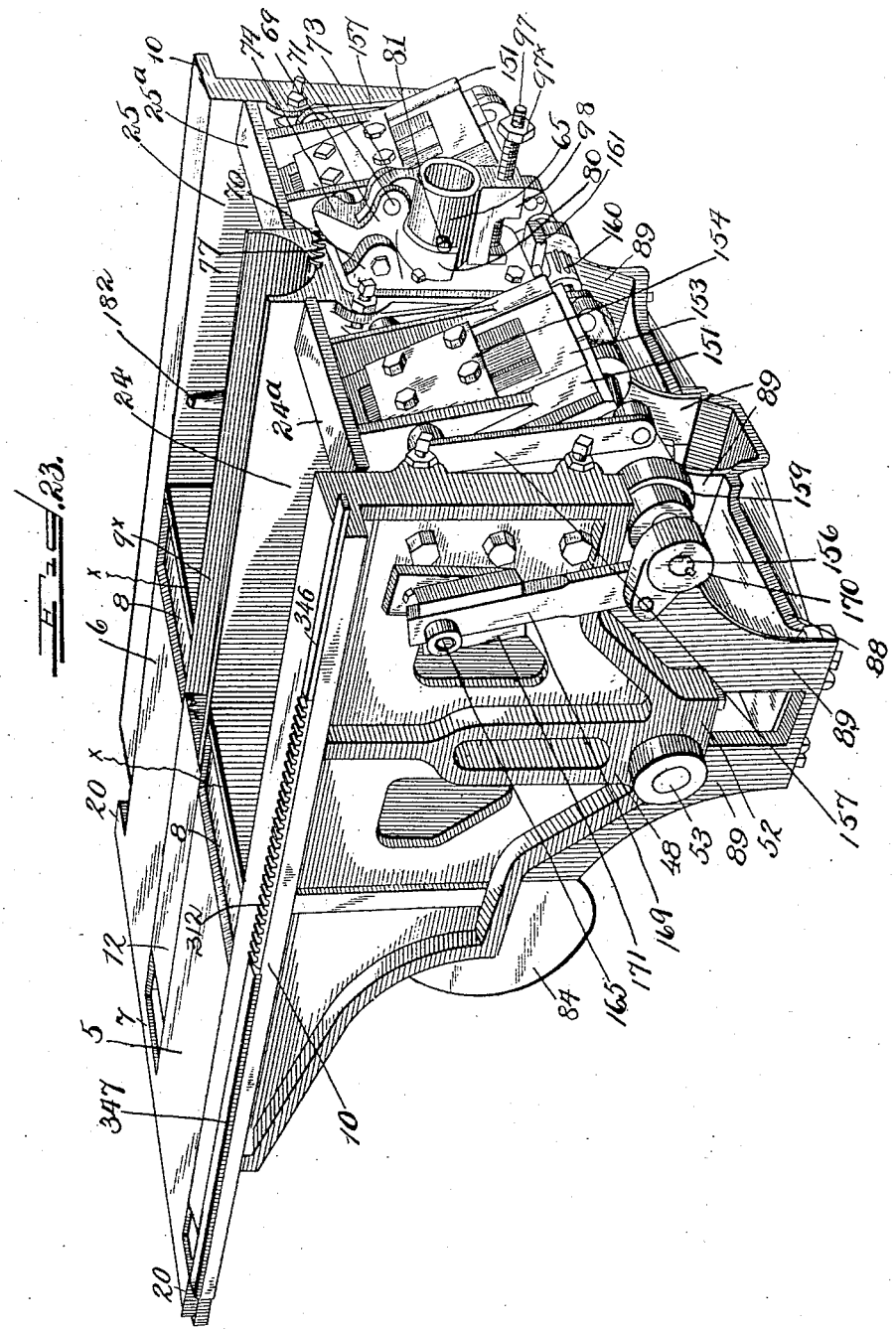

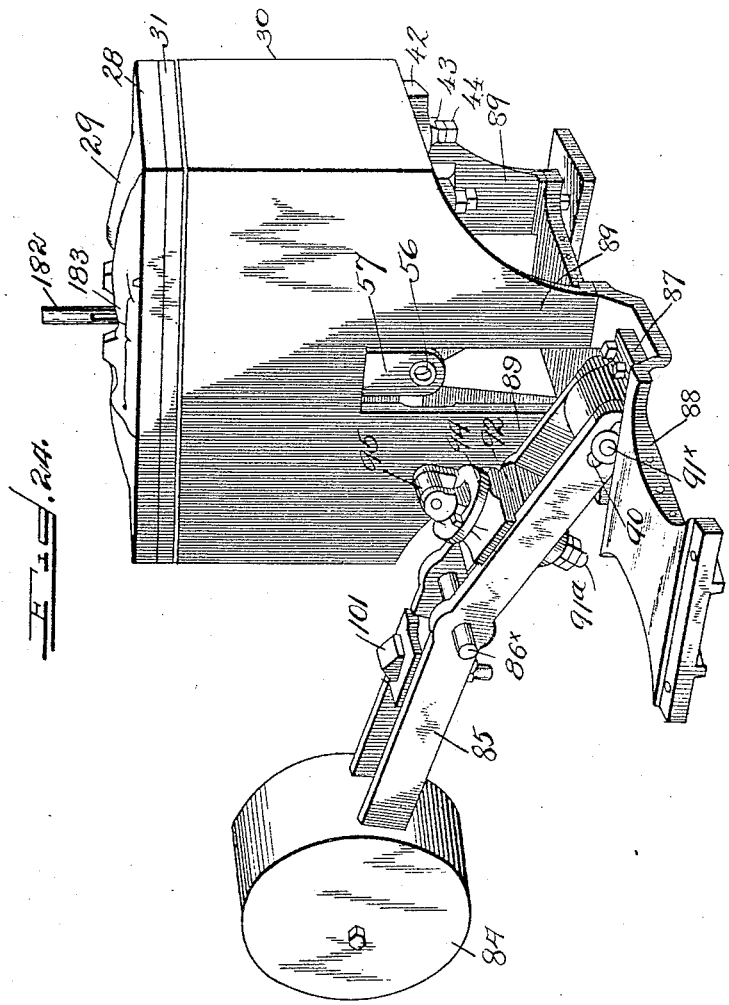

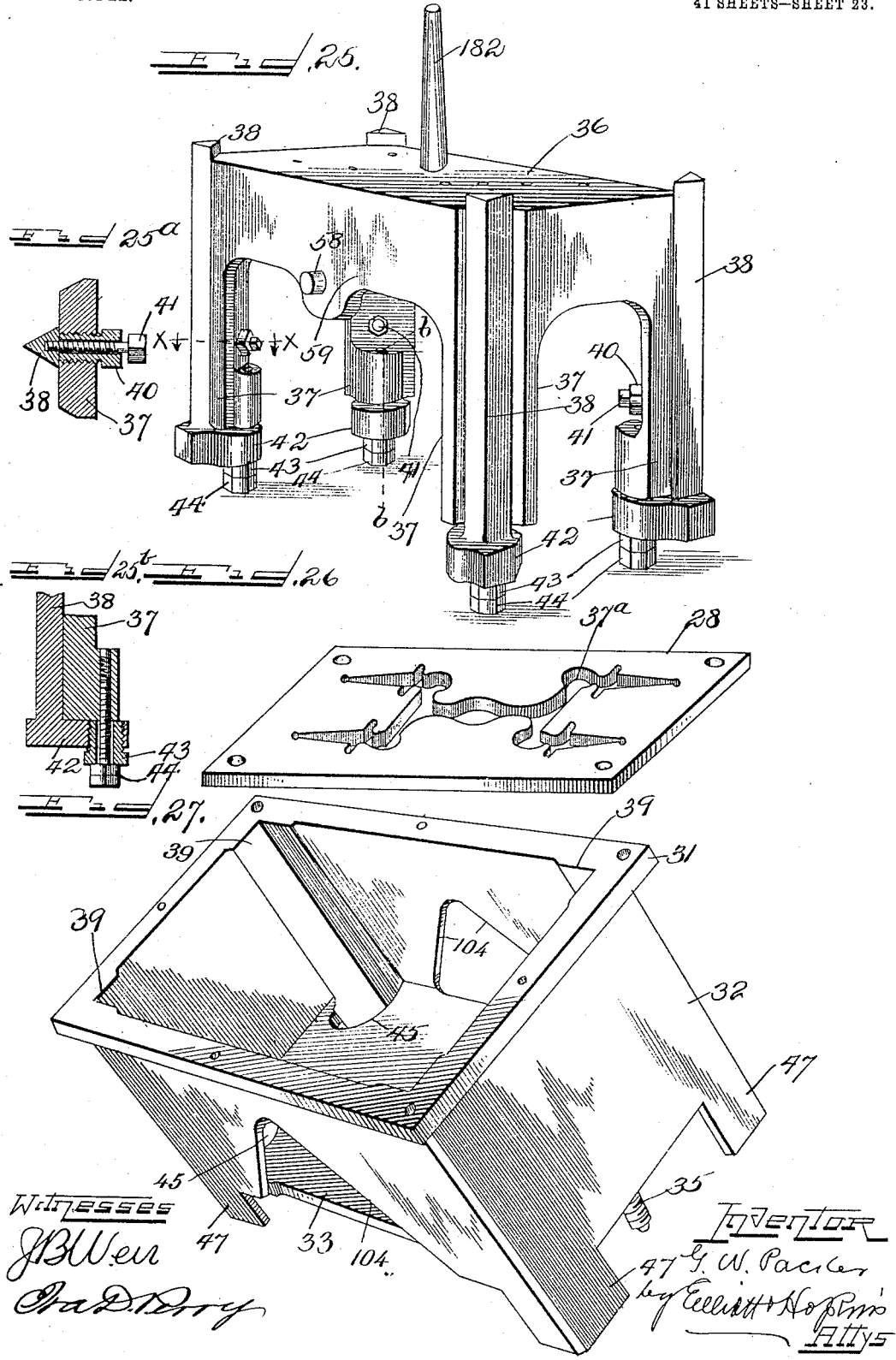

No. 768,071. PATENTED AUG. 23, 1904.
G. W. PACKER.
MOLDING MACHINE.
APPLICATION FILED JUNE 10, 1901.
NO MODEL. 41 SHEETS—SHEET 24.
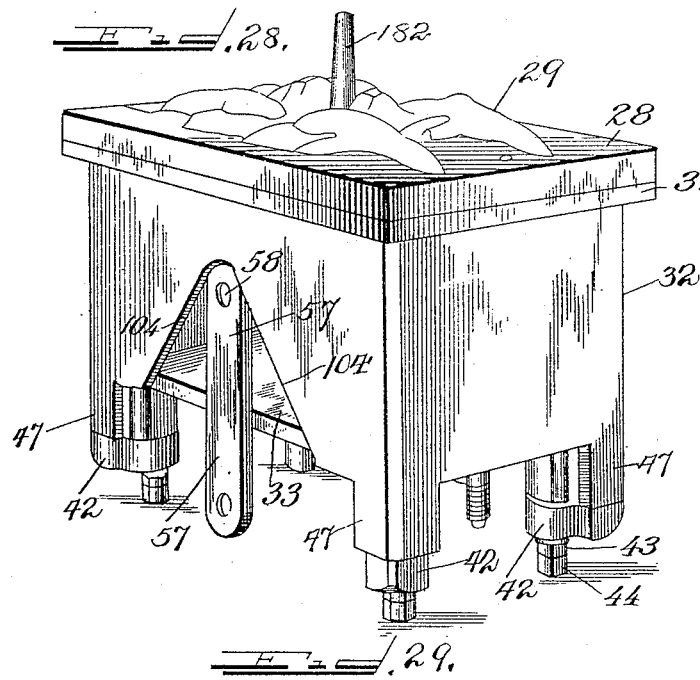
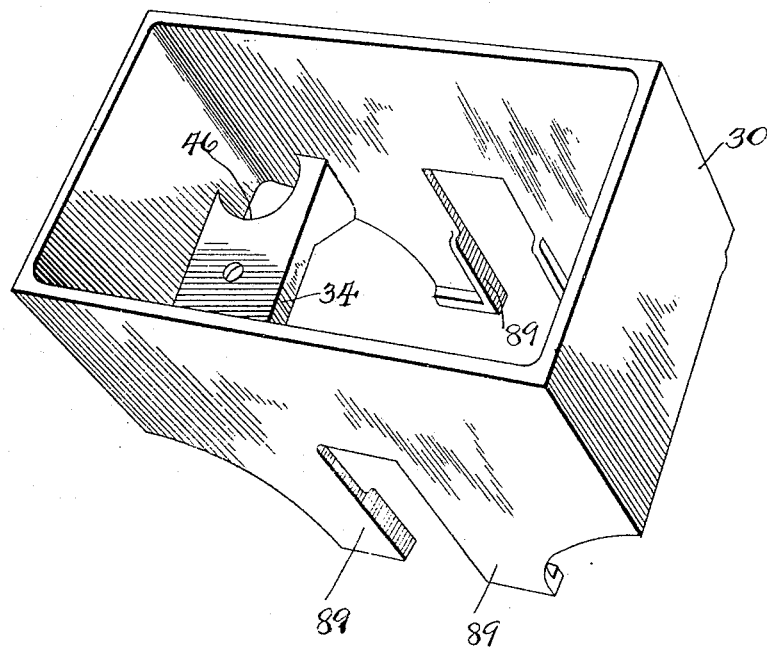

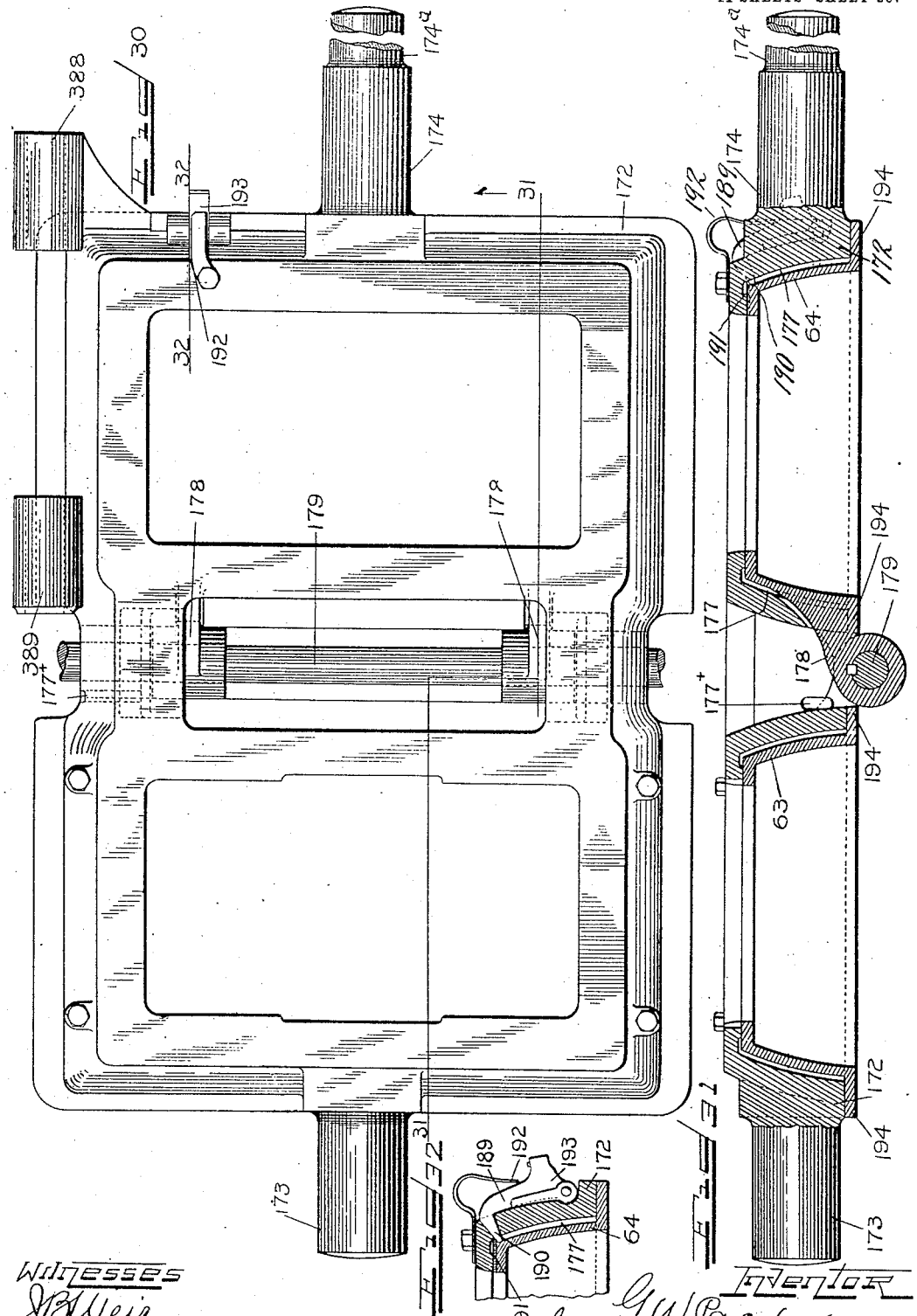

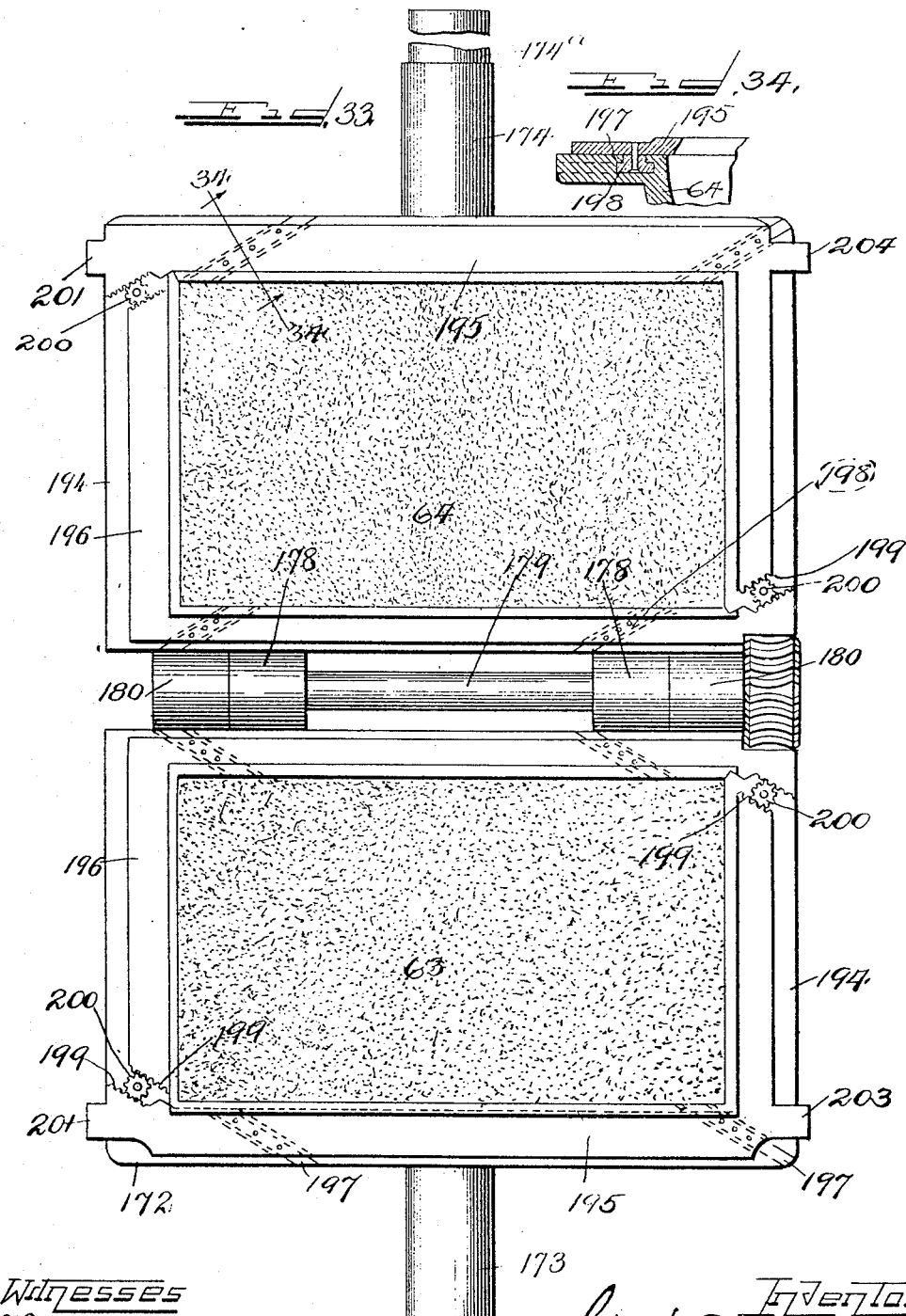

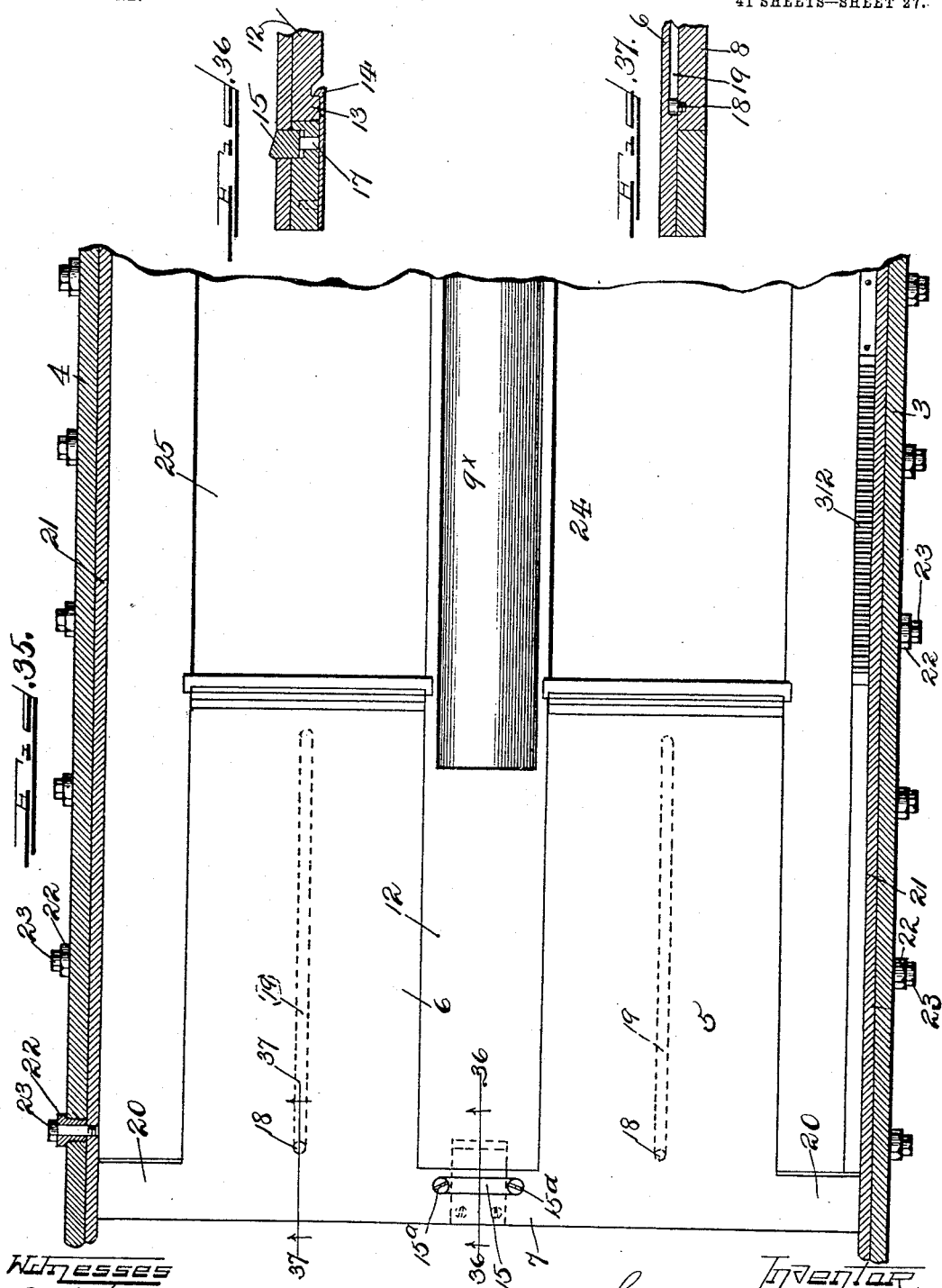

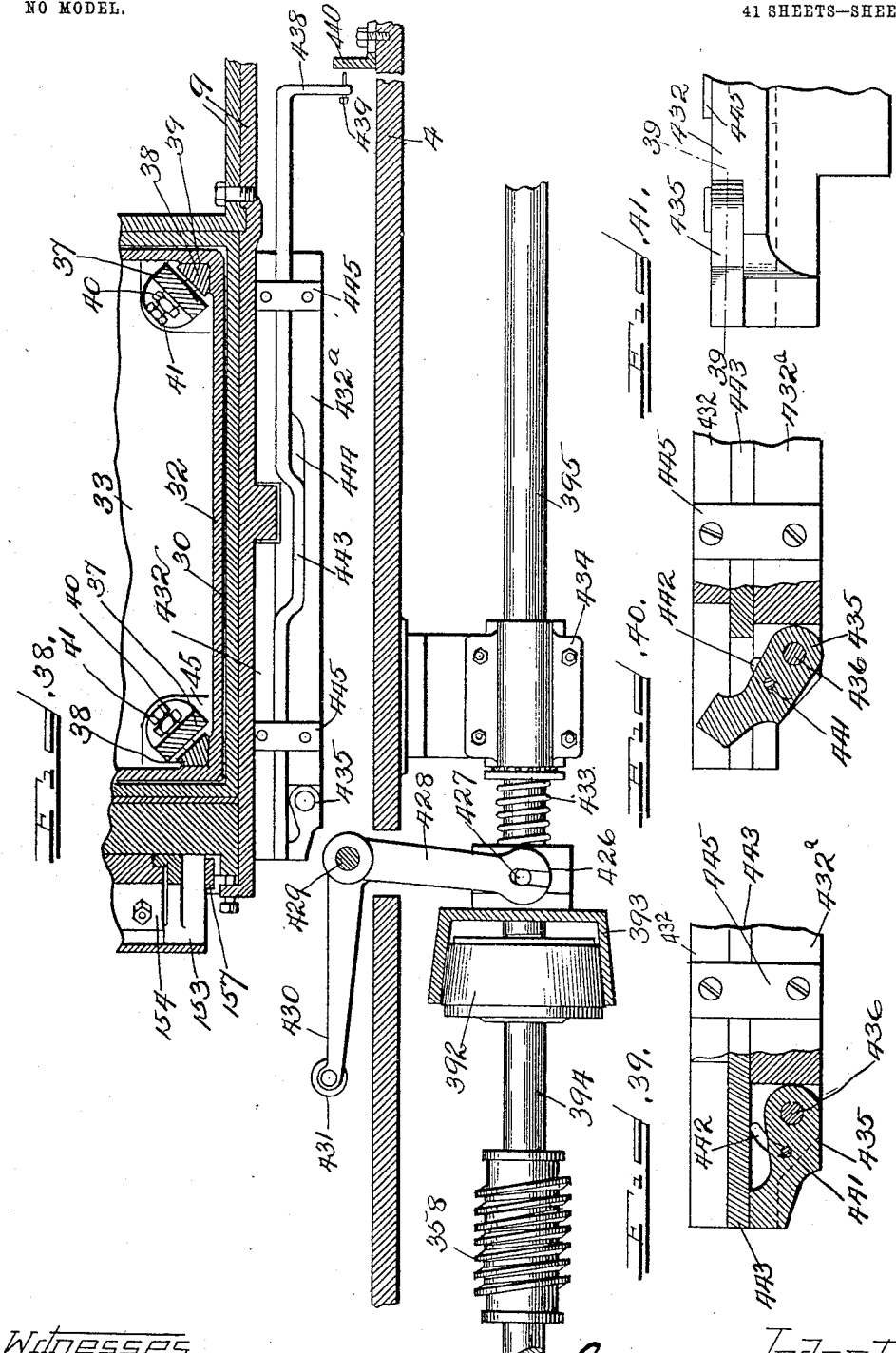

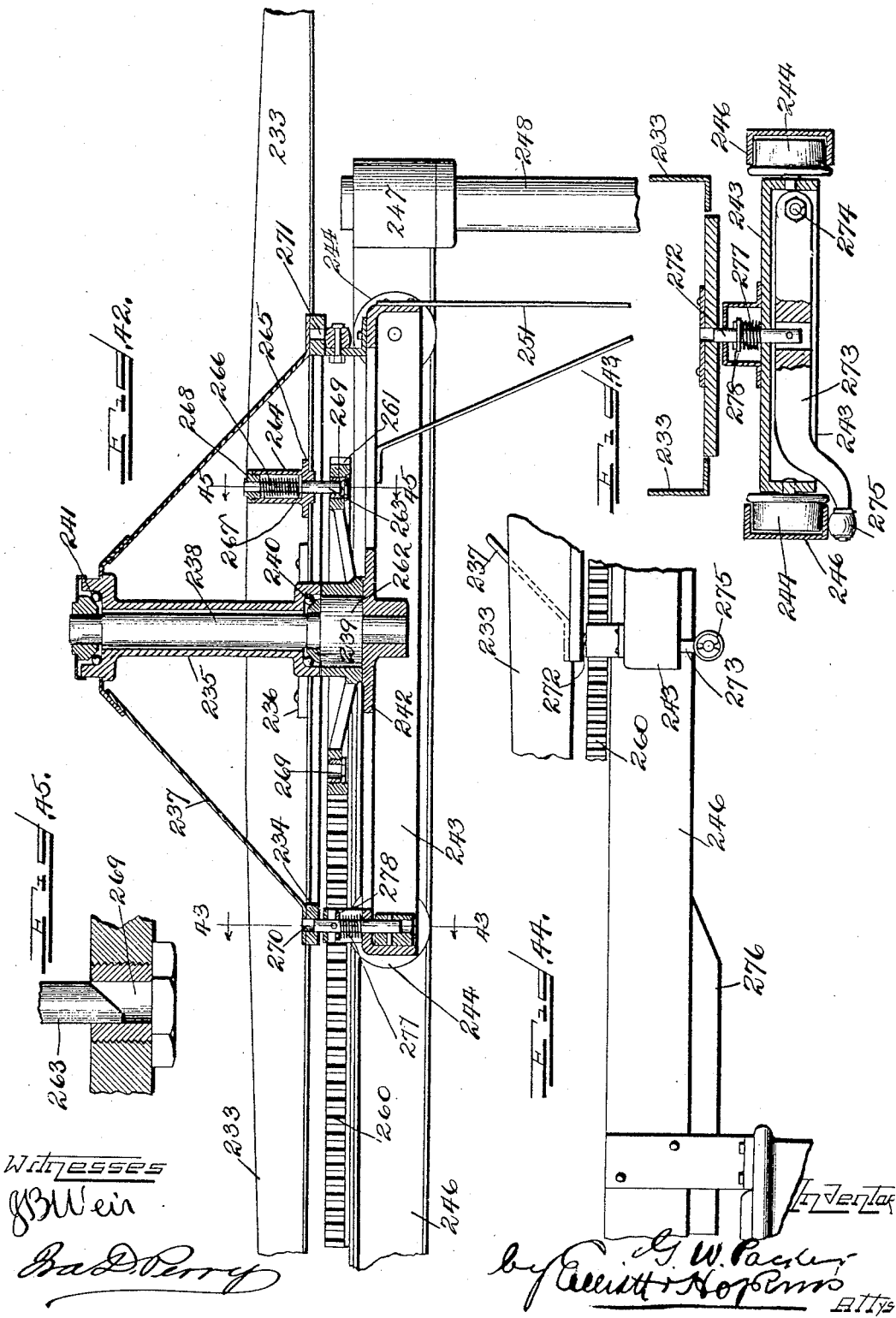

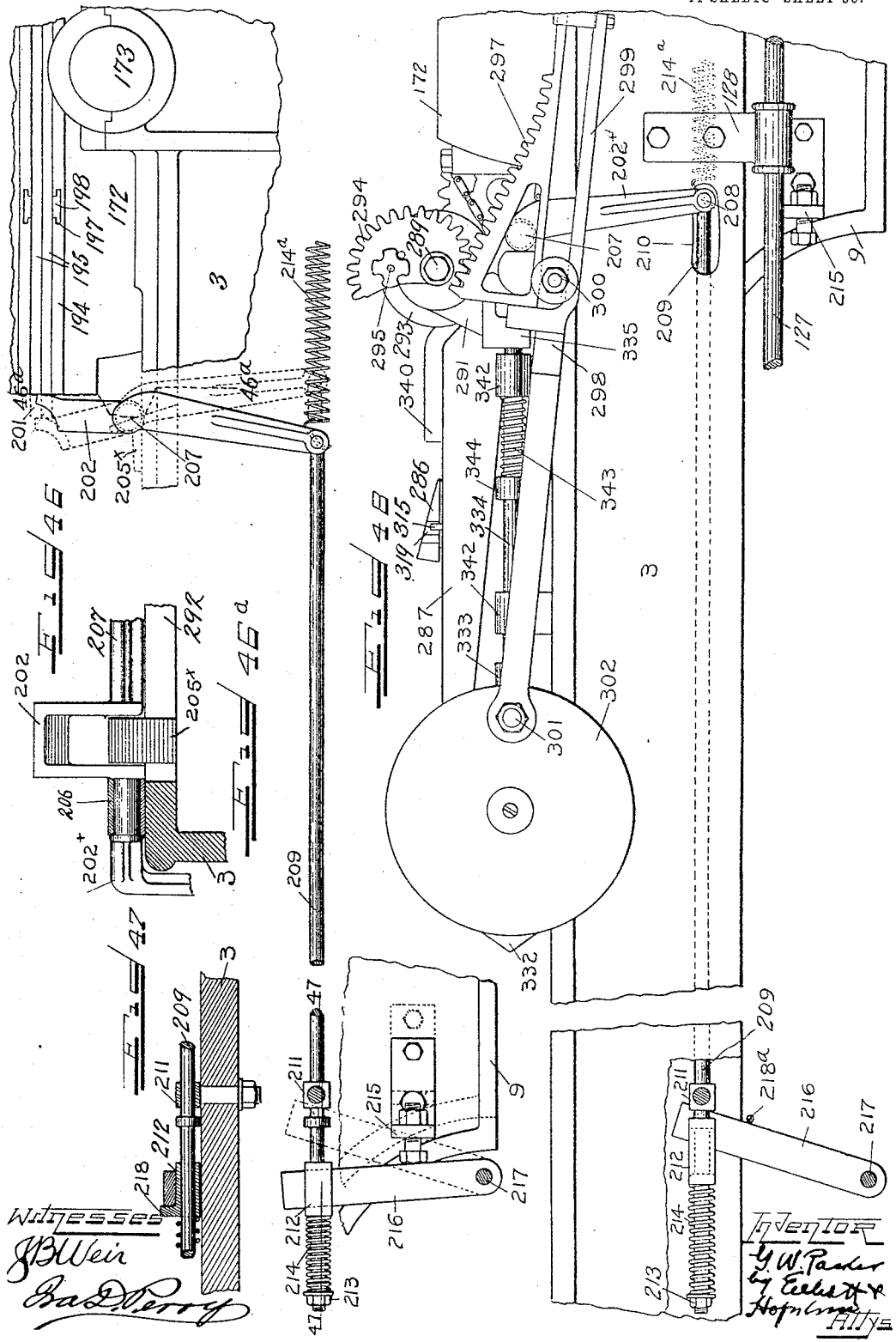

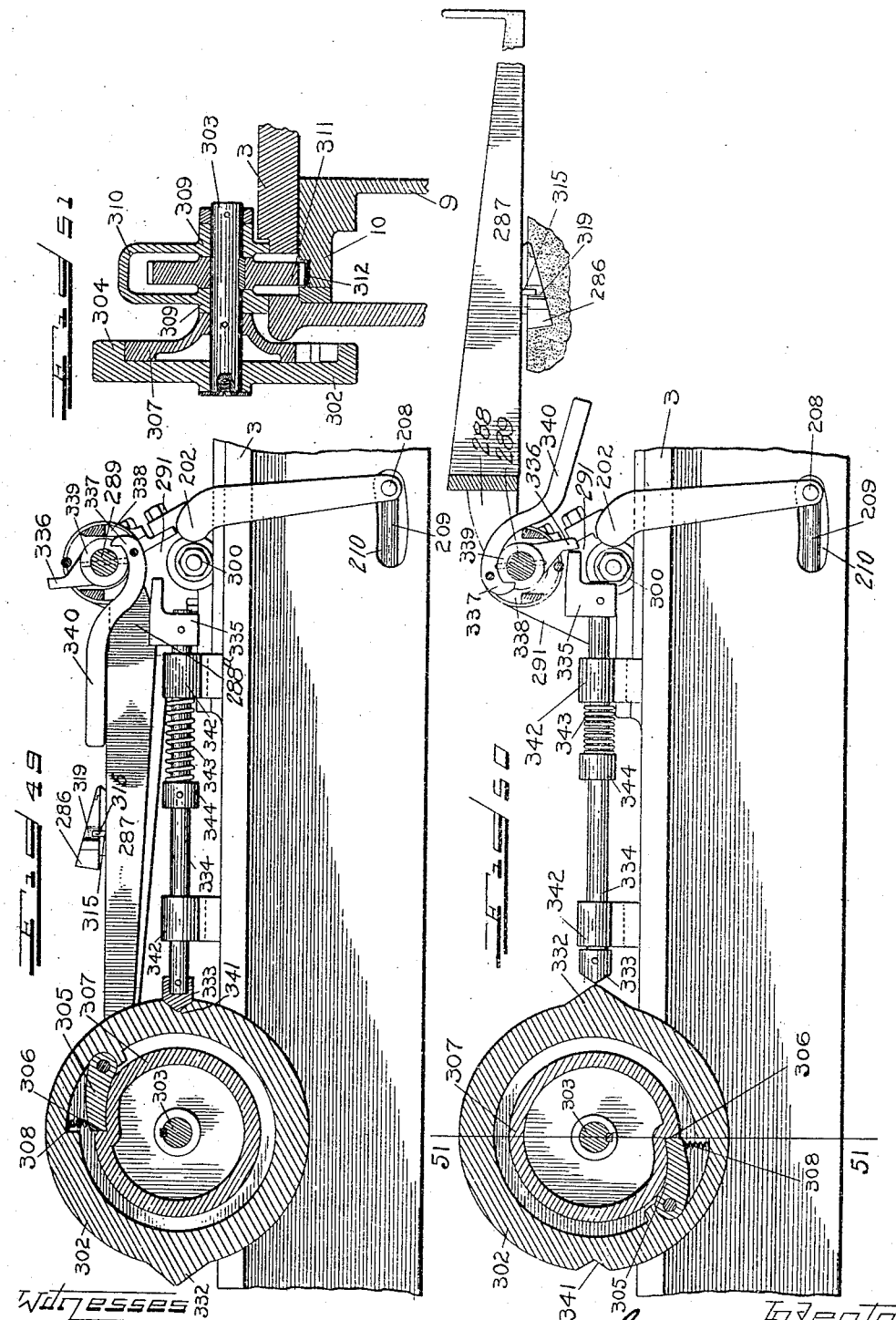

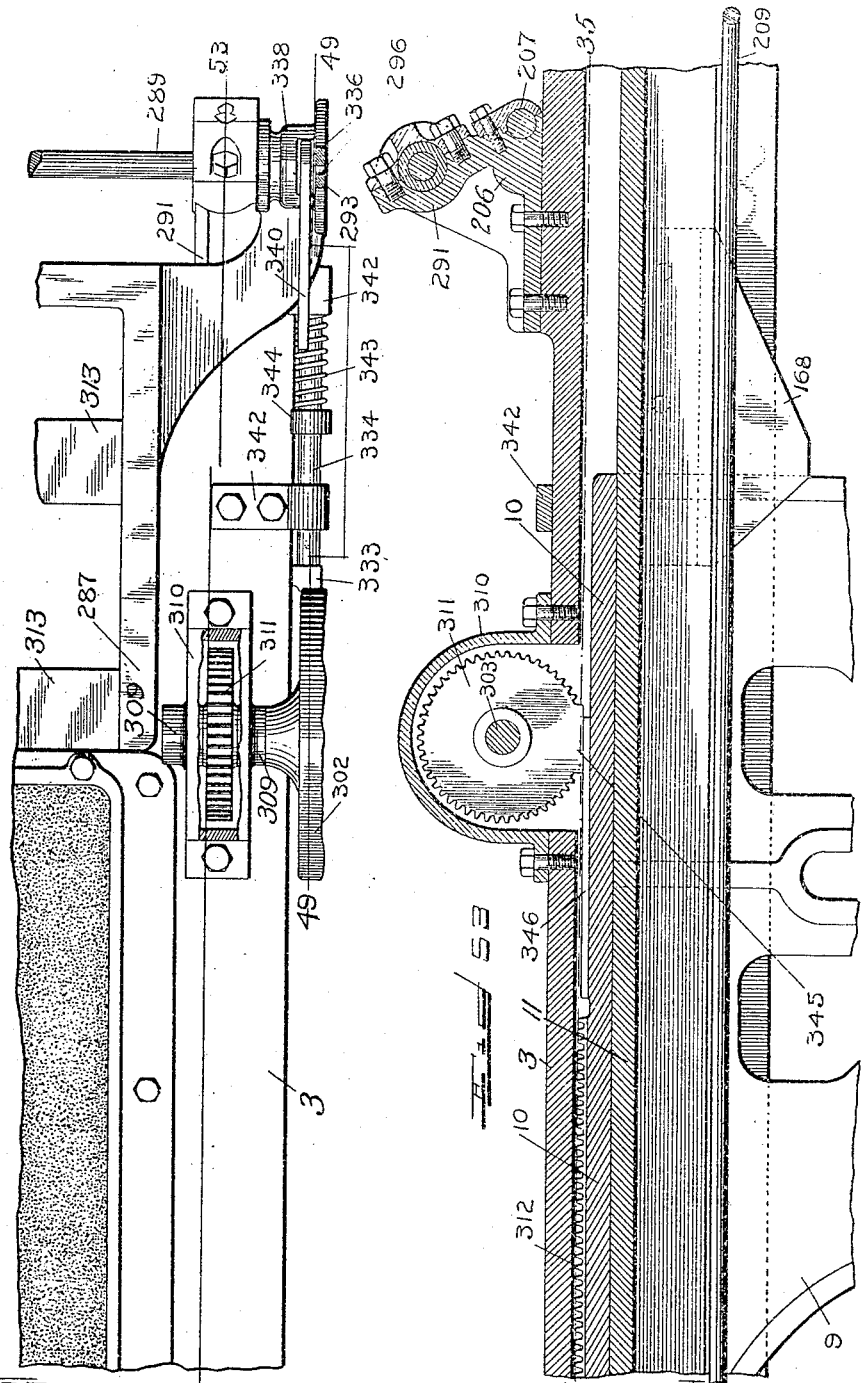

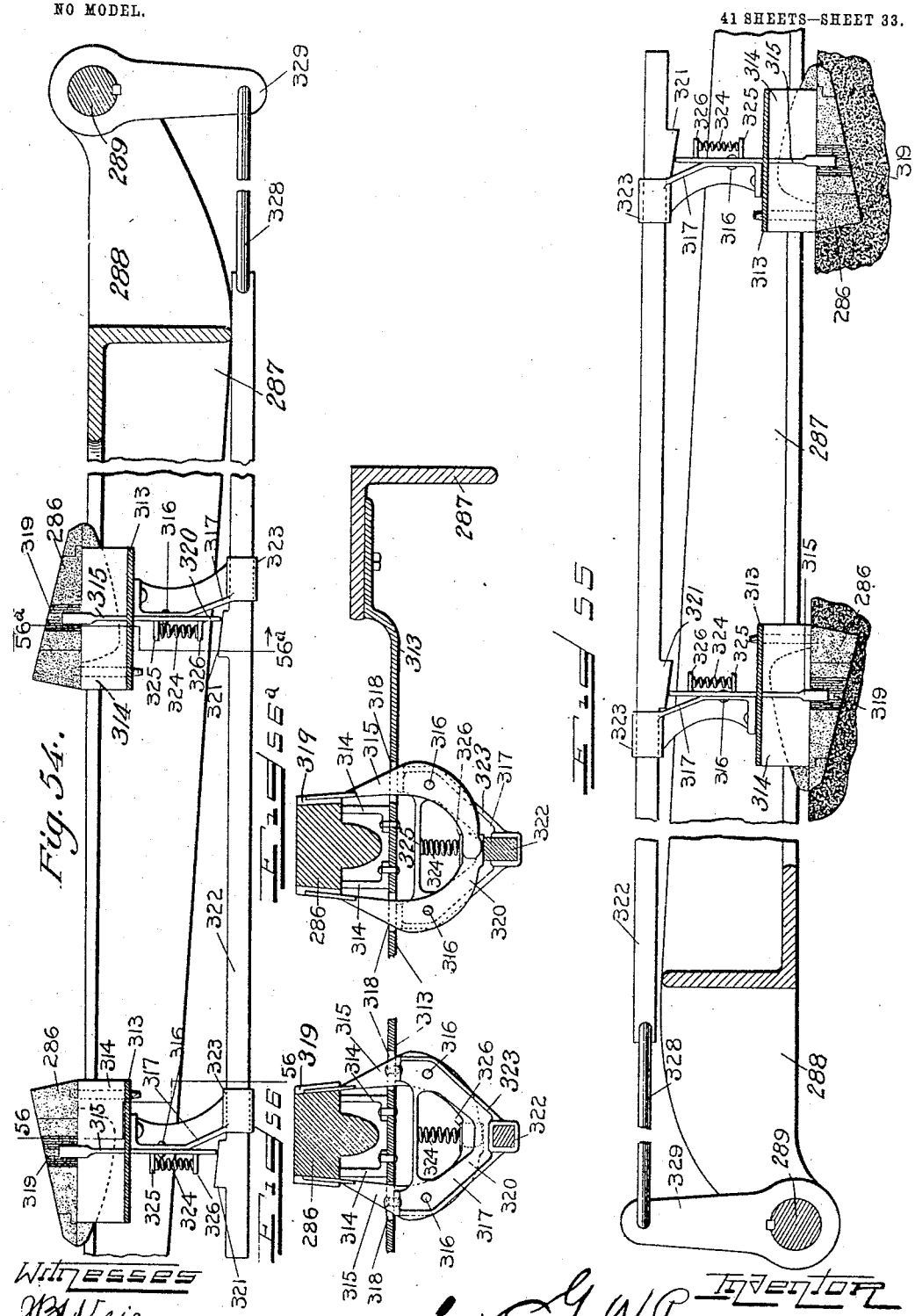

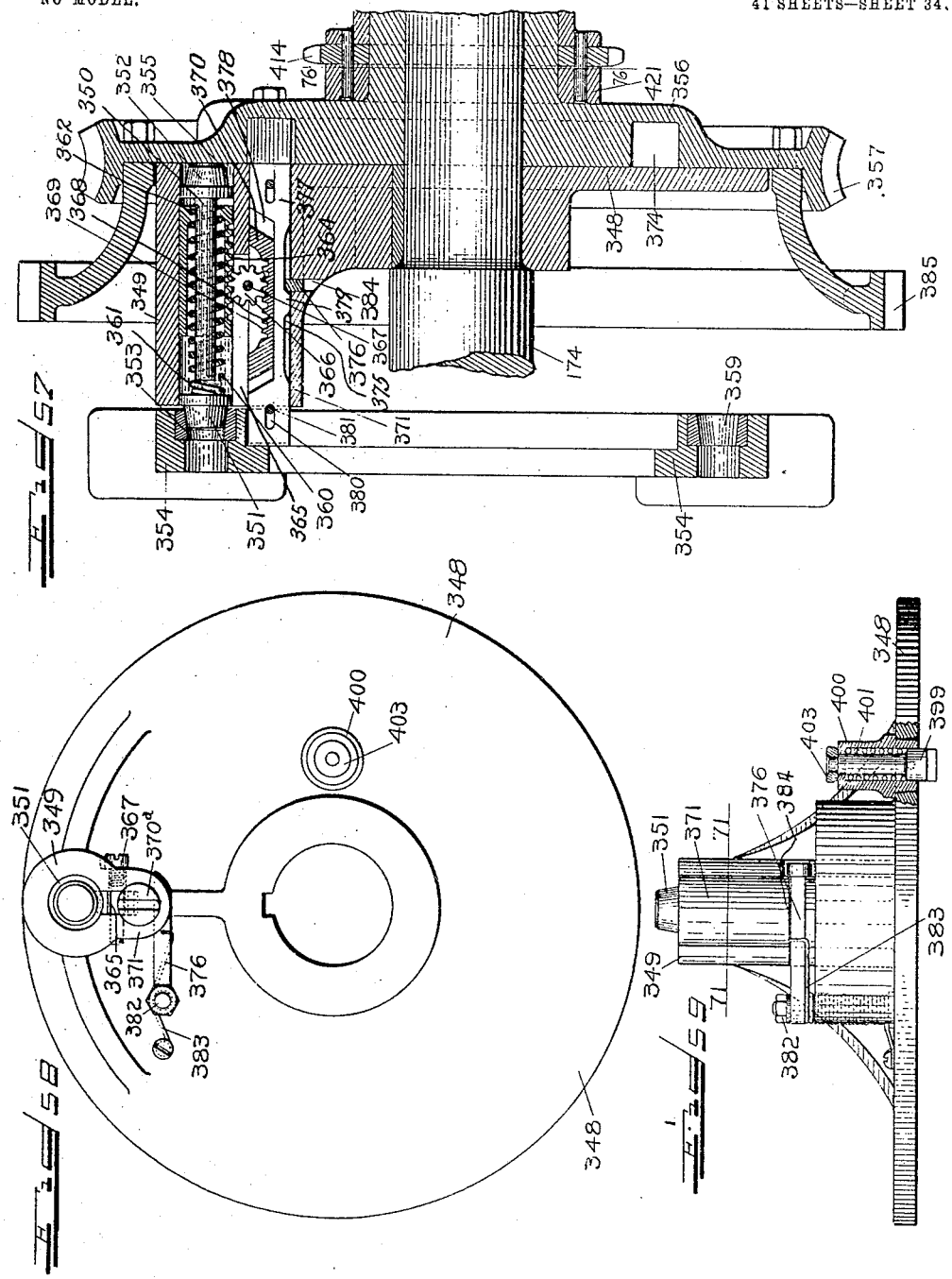

No. 768,071. PATENTED AUG. 23, 1904.
G. W. PACKER.
MOLDING MACHINE.
APPLICATION FILED JUNE 10, 1901.
NO MODEL. 41 SHEETS—SHEET 35.
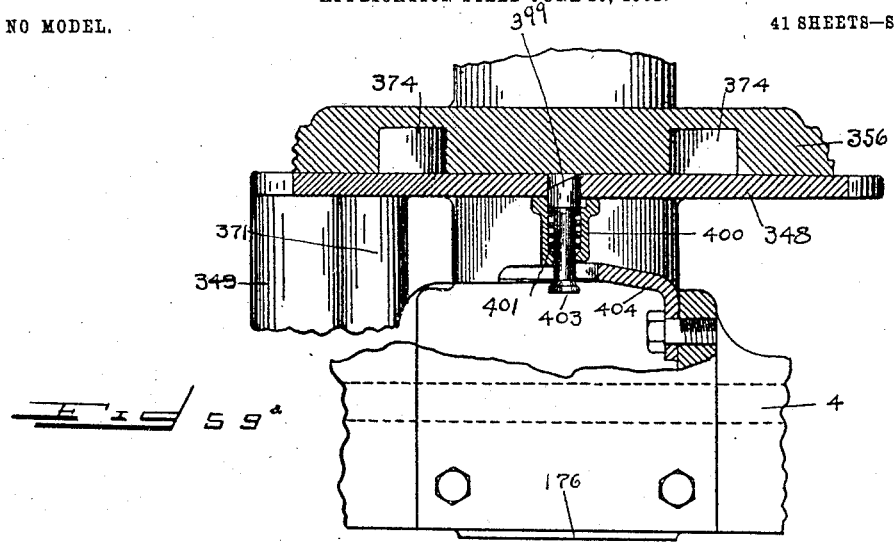
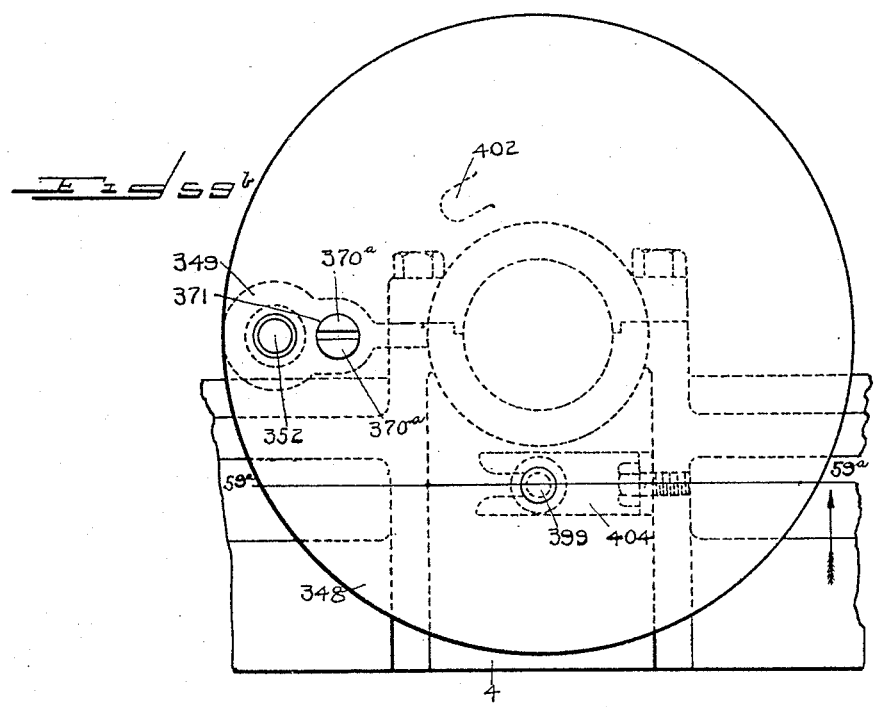

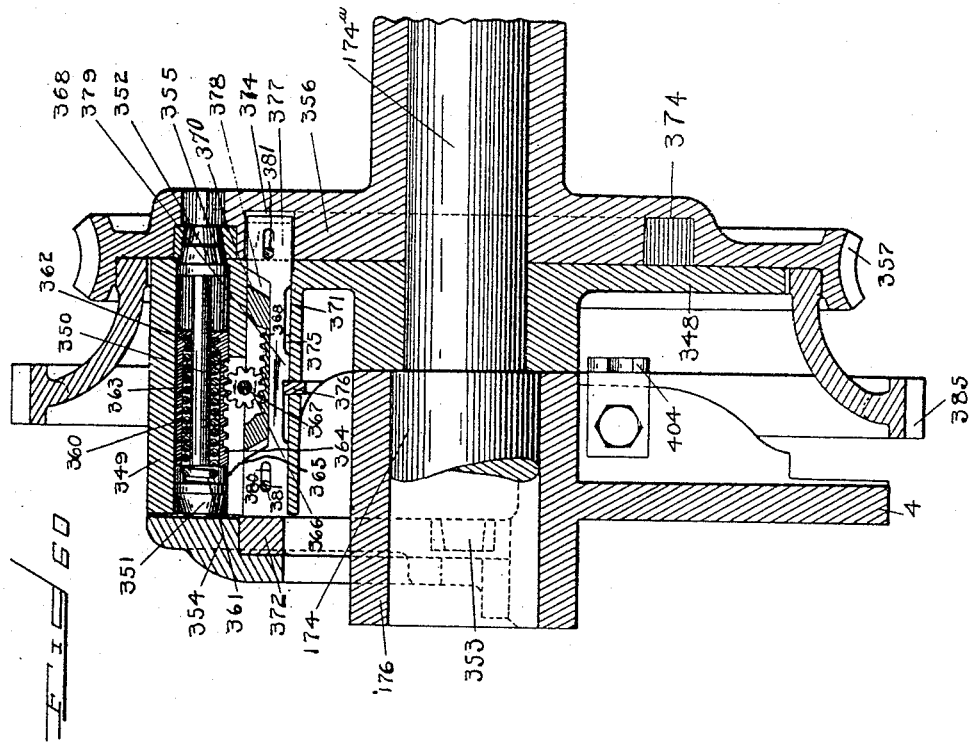

No. 768,071. PATENTED AUG. 23, 1904.
G. W. PACKER.
MOLDING MACHINE.
APPLICATION FILED JUNE 10, 1901.
NO MODEL. 41 SHEETS—SHEET 37.
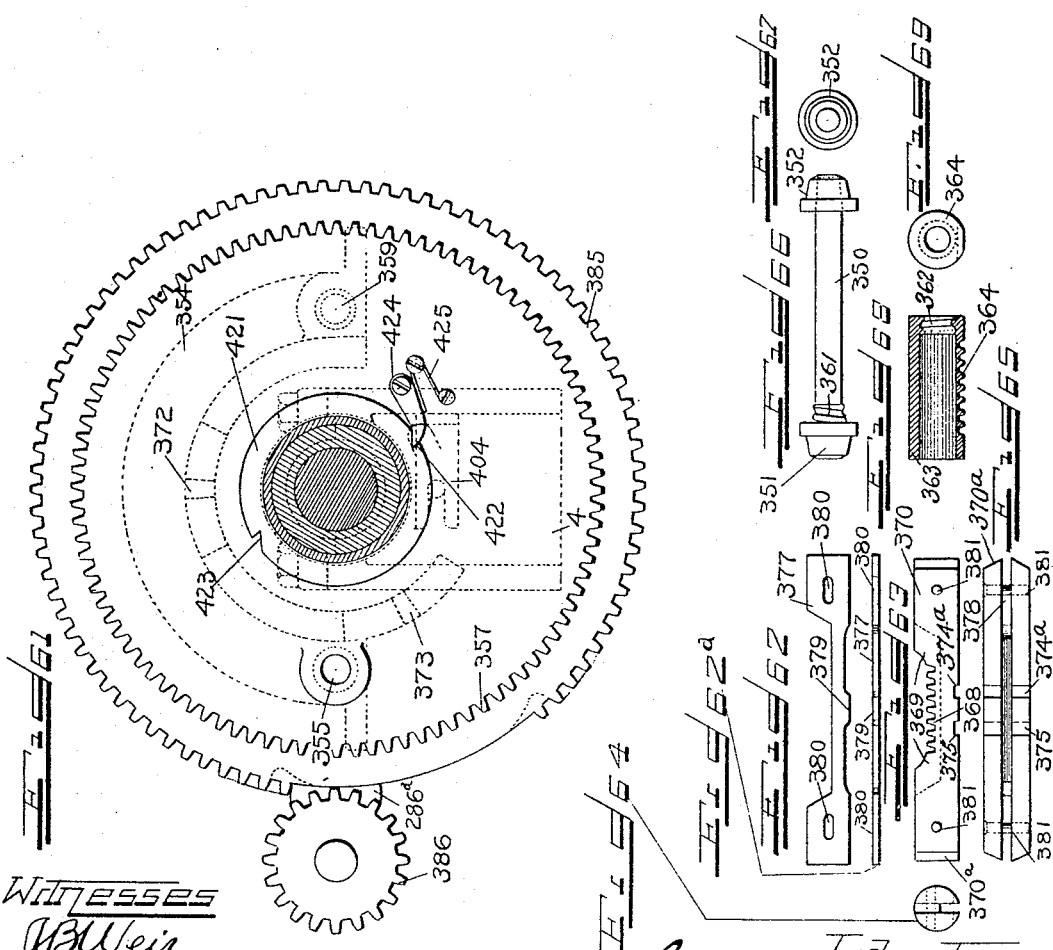

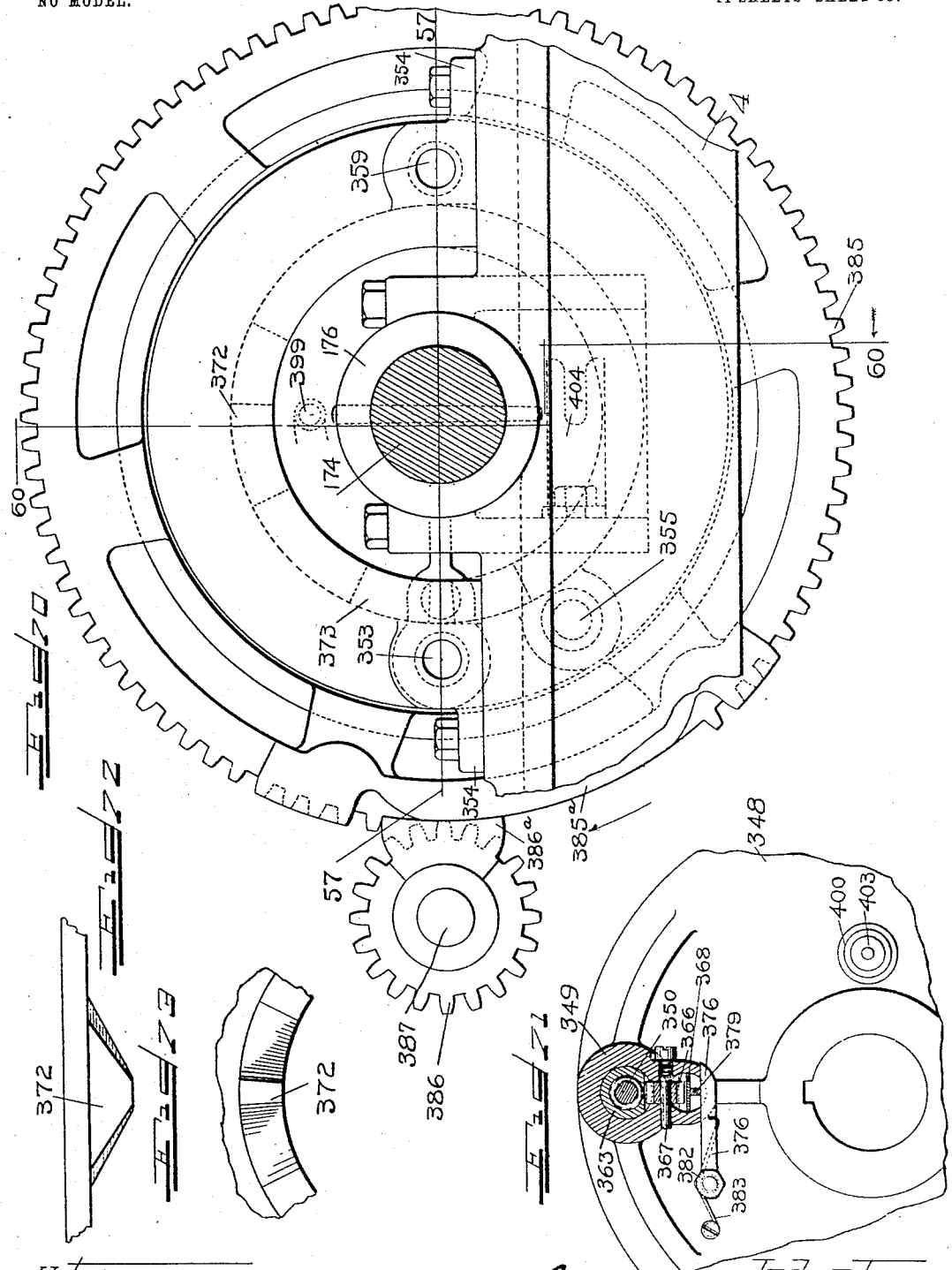

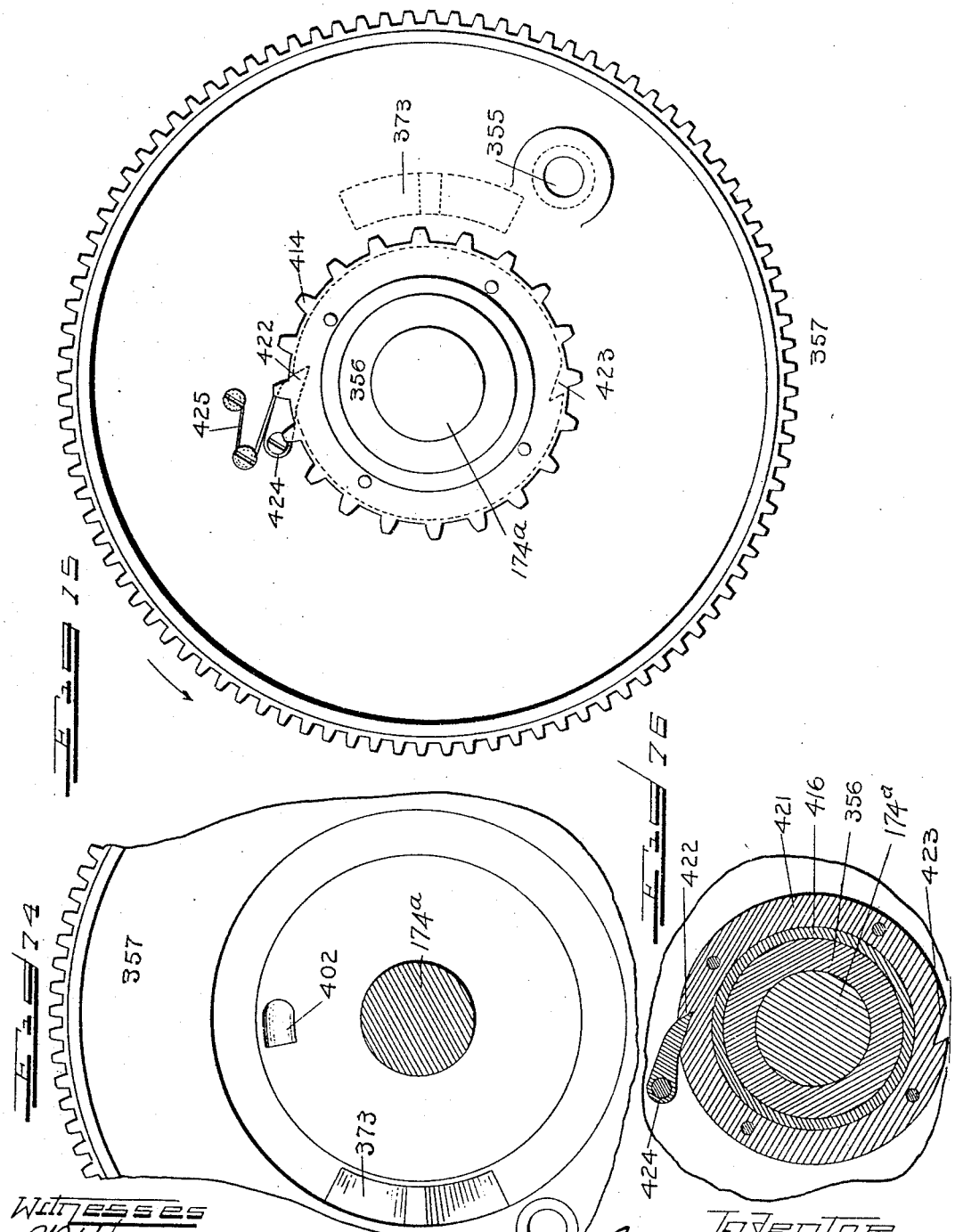

No. 768,071. PATENTED AUG. 23, 1904.
G. W. PACKER.
MOLDING MACHINE.
APPLICATION FILED JUNE 10, 1901.
NO MODEL. 41 SHEETS—SHEET 40.
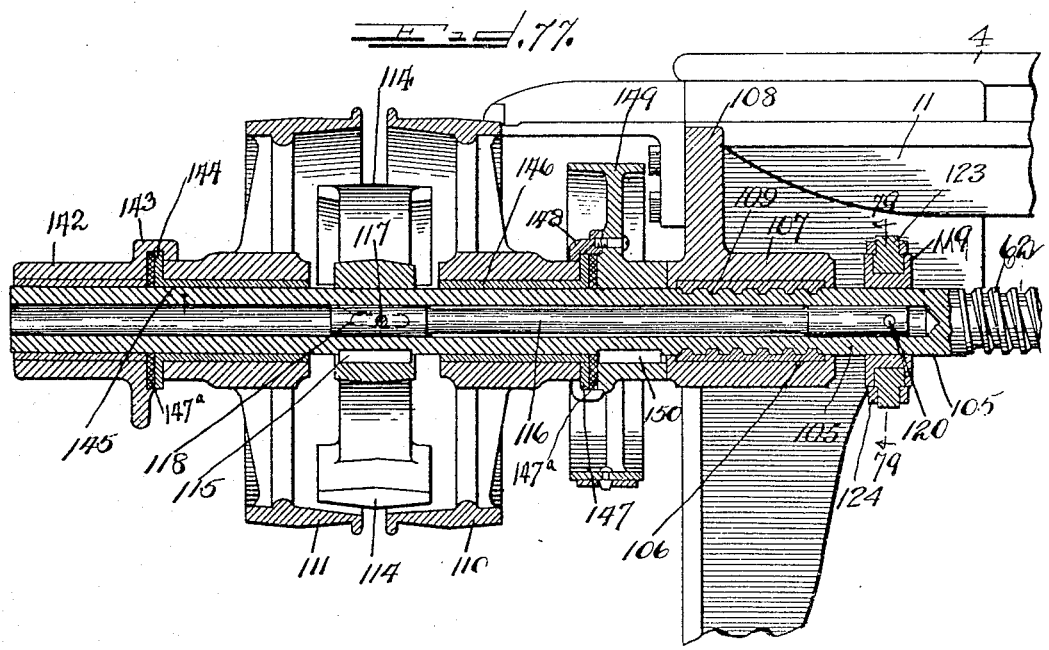
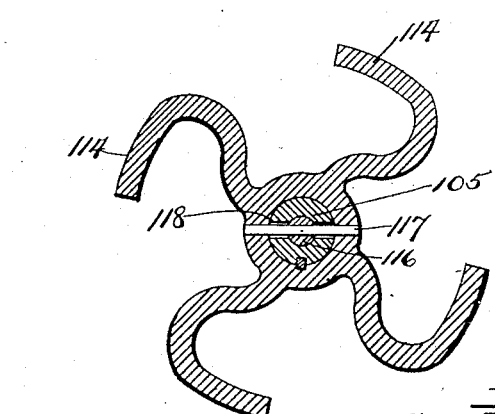
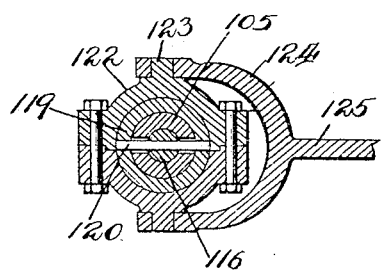
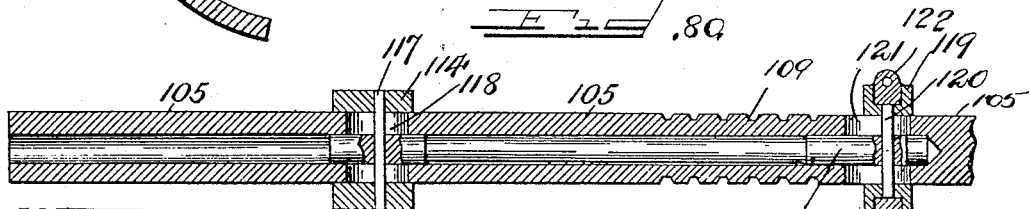

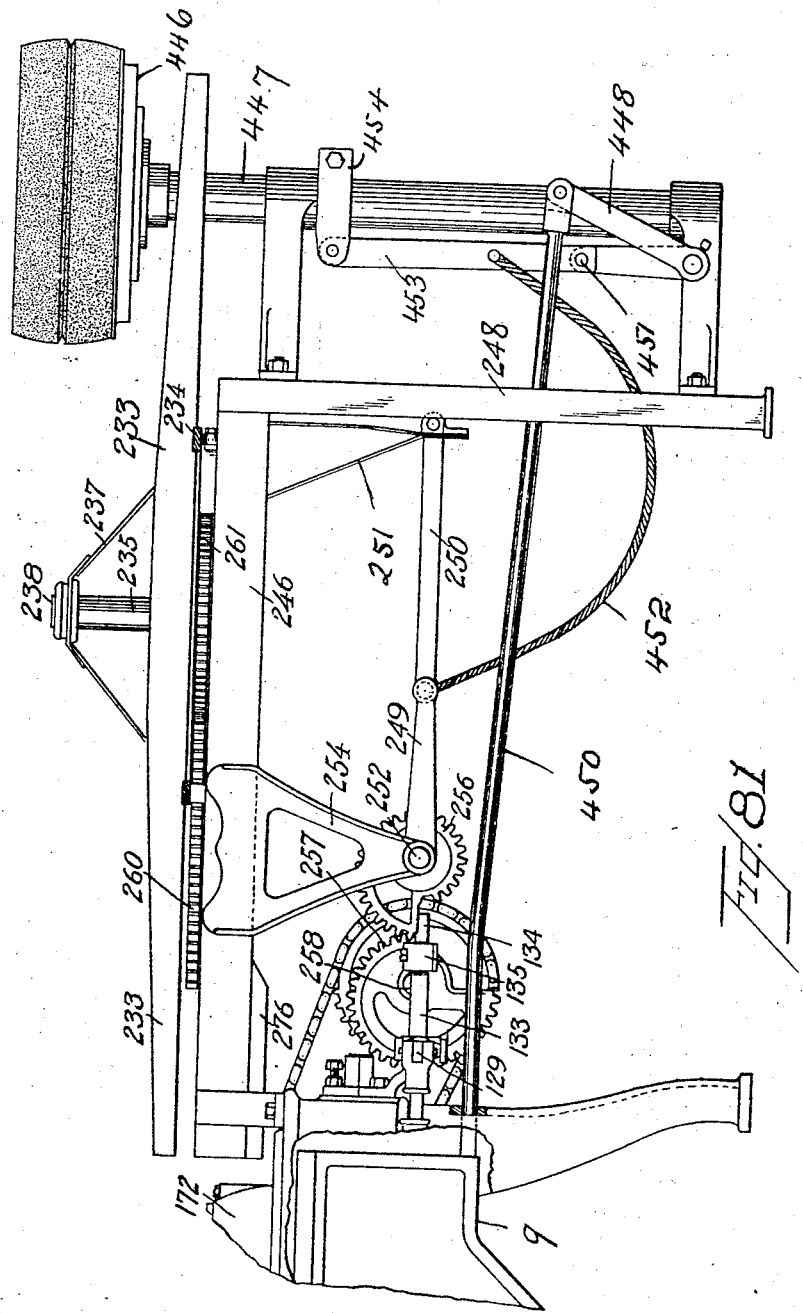

No. 768,071.

Patented August 23, 1904.

UNITED STATES PATENT OFFICE.

GEORGE W. PACKER, OF CHICAGO, ILLINOIS.

MOLDING-MACHINE.

SPECIFICATION forming part of Letters Patent No. 768,071, dated August 23, 1904.

Application filed June 10, 1901. Serial No. 63,968. (No model.)

*To all whom it may concern:*

Be it known that I, GEORGE W. PACKER, a citizen of the United States, residing at Chicago, in the county of Cook and State of Illinois, have invented certain new and useful Improvements in Molding-Machines, of which the following is a full, clear, and exact specification.

This invention relates to molding-machines; and it has for its main or general object to produce a mold complete and set the core or cores therein ready for the metal by machinery.

The invention also has subsidiary objects relating to improvements in the various groups of devices comprising the general machine, among which are to establish by improved means a permanent and definite relation between the relatively movable flasks, whereby they may move relatively always in the same line of travel for bringing the mold members accurately together face to face; to produce two mold members in separate flasks and cause the flasks themselves to automatically deposit one mold member upon the other; to simultaneously produce the cope and drag and automatically deposit one upon the other; to automatically release the retaining-strips; to provide a charger-box which shall receive the sand direct from the hopper or other supply and hold it in a position registering with the flask while it is forced directly therefrom into the flask or flasks together with the pattern; to fill the charger-box uniformly as regards density, whereby the mold will be of uniform density throughout its face; to provide improved means for ramming or squeezing the mold from the face or pattern side, whereby the sand adjacent to the imprints will have the requisite density and the other parts of the mold will not be unduly compressed; to fill or charge the flasks from below, whereby the pattern-plate may be made to serve as the bottom of the charger-box; to provide improved means for varying the size of the charge and the degree of compression; to cause the flask-charger to automatically travel back and forth into register alternately with the flask and with a sand-supply and coöperate with the flask in producing a mold; to provide for the adjustment of the patterns transversely of the flasks, whereby they may be centered with relation to the stripper-plates as well as with reference to each other to automatically set a core or chill in a mold; to operatively connect a core-setter with a mold-producing means, so that the core will be automatically set in the mold and where the mold is composed of two members will operate in time to set the core and recede before the members come together; to automatically eject the mold through the face side of the flask, whereby it may be removed, and finally to automatically remove the mold from the mold-producing means.

It might be here stated that the expression "face side" used with reference to the flask throughout the specification and the claims means that side of the flask through which the mold-cavity is exposed and which comes against the companion flask.

With these ends in view my invention consists in certain features of novelty in the construction, combination, and arrangement of parts by which the said objects and certain other objects hereinafter appearing are attained, all as fully described with reference to the accompanying drawings and more particularly pointed out in the claims.

Figure 2:
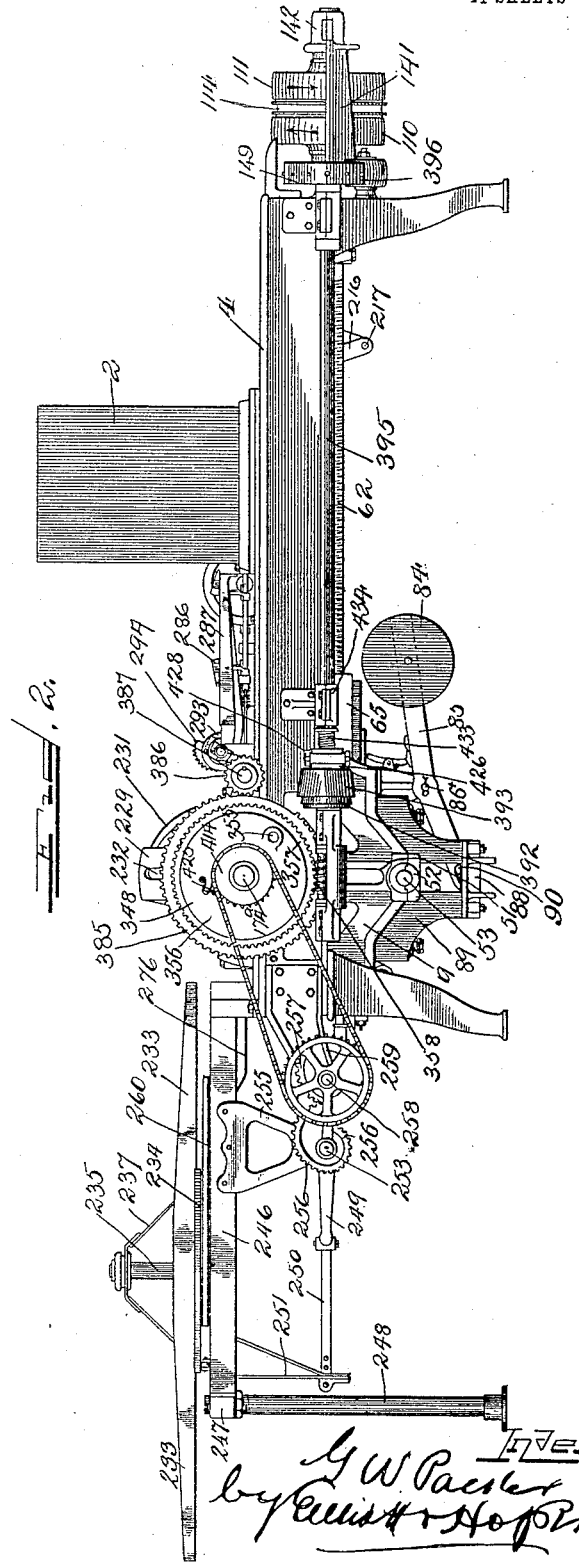
Figure 3:
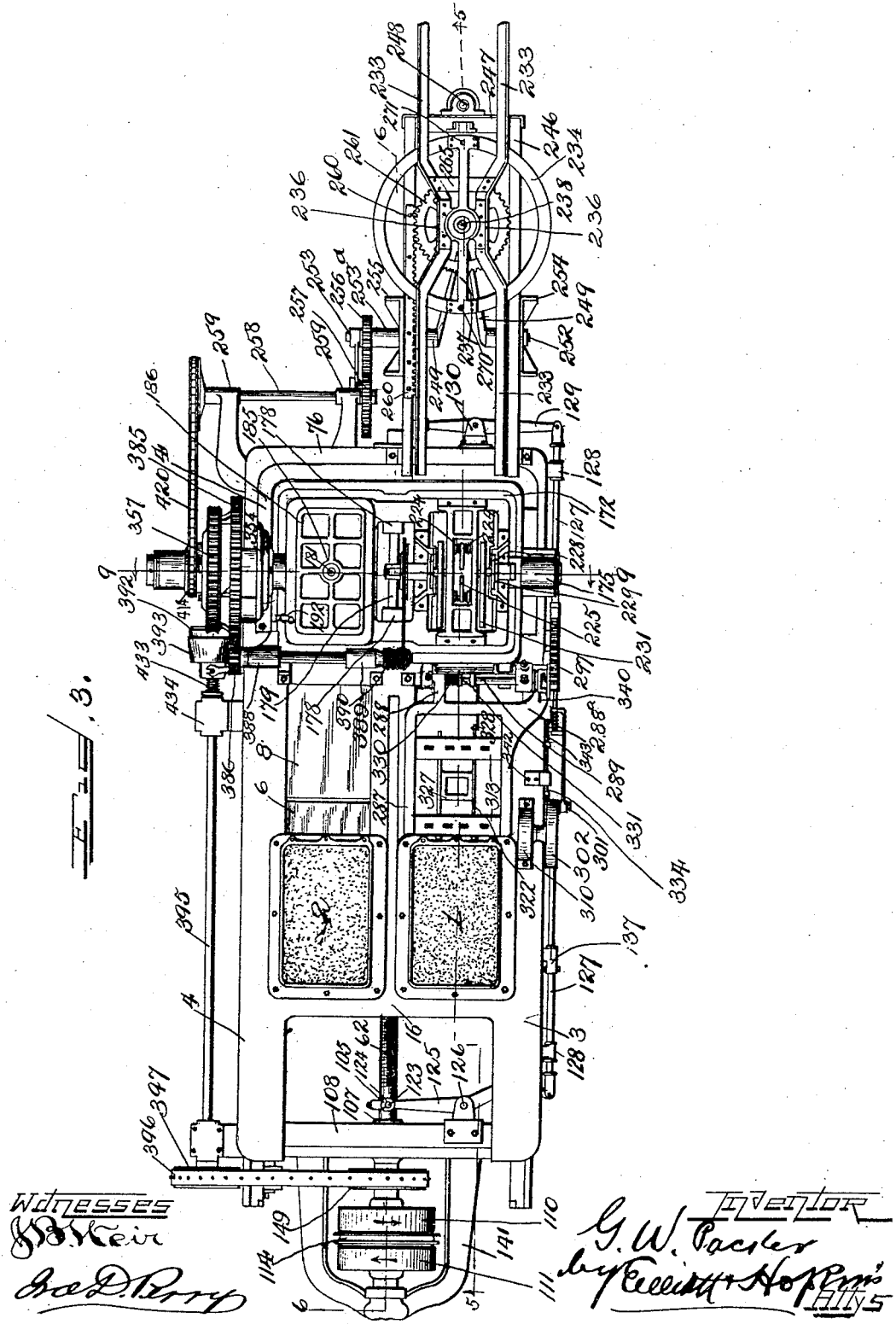
Figure 4:
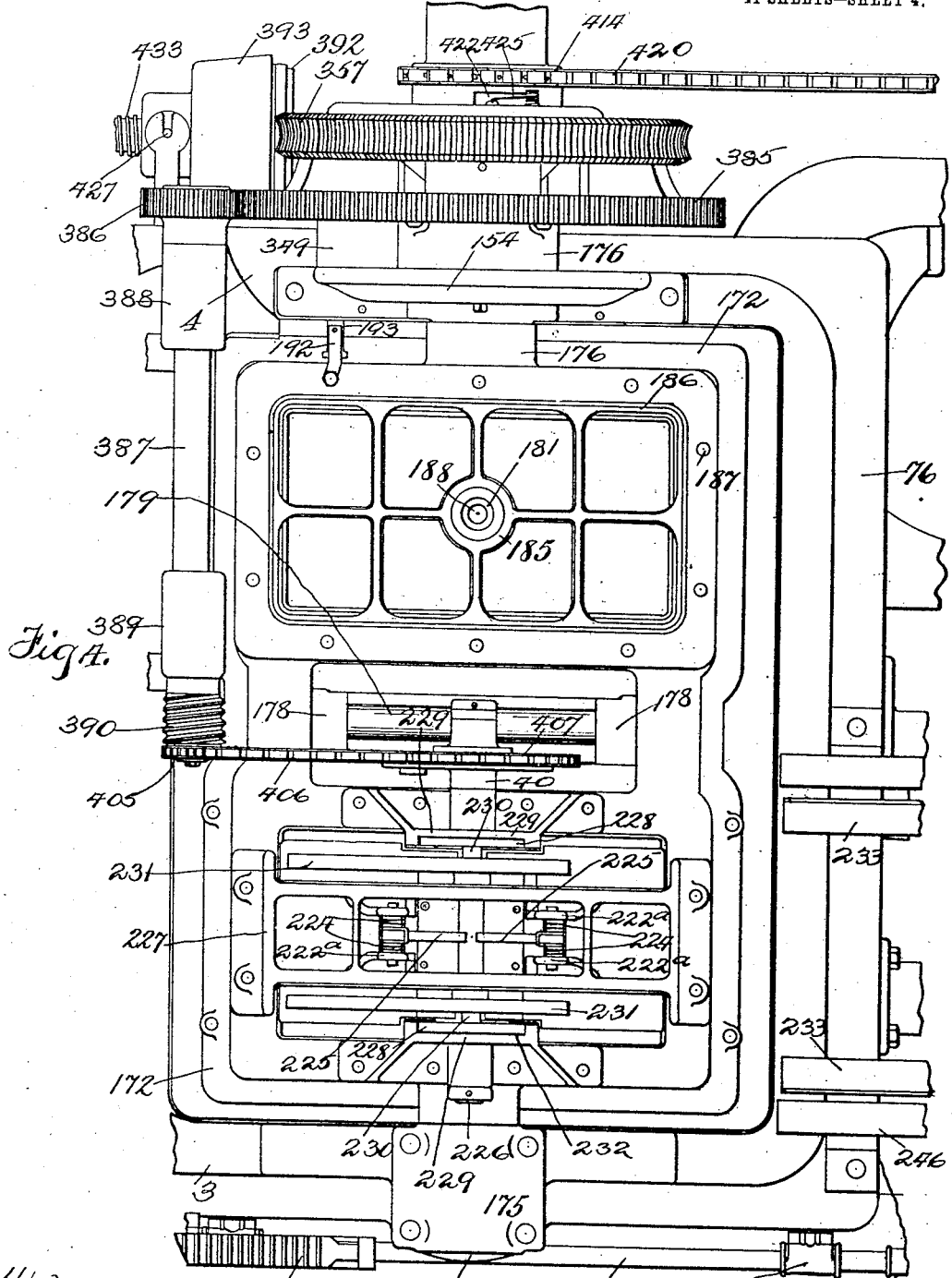

In the said drawings, Figure 1 is a side elevation of a molding-machine constructed according to this invention. Fig. 2 is a side elevation of the opposite side. Fig. 3 is a plan view showing the flasks inverted. Fig. 4 is an enlarged plan view of the flasks and flask-frame in an inverted position. Fig. 5 is a vertical longitudinal sectional view taken on the line 5 5, Fig. 3, showing the charger registering with the flask. Fig. 5ª is a similar section, on a larger scale and partly broken away, showing the charger in a position registering with the sand-hopper. Fig. 6 is a vertical longitudinal central section taken on the line 6 6, Fig. 3. Fig. 7 is an enlarged plan view with the mold-remover and a part of the driving mechanism omitted, showing the flasks turned face upward with a mold member in each. Fig. 8 is an end elevation. Fig. 9 is a transverse section taken on the line 9 9, Fig. 3, showing the chargers registering with the flasks and filled with sand ready to force the same into the flasks. Fig. 10 is a similar view showing the charging mechanism at the completion of its charging operation. Fig. 11 is a similar section showing one of the flasks turned over upon the other for bringing the mold members together face to face and producing the complete mold, the chargers in this figure having receded from the flasks on their return movement toward the sand-hopper. Fig. 12 is an enlarged detail central sectional view in the same plane as Fig. 6, showing the parts at about the limit of the compressing stroke, Fig. 6 illustrating the parts at the limit of the receding stroke of the pattern-plate. Fig. 13 is a detail side elevation of the charger-carriage and connected parts, partly in vertical section, taken on line 13 13, Fig. 7, showing the pattern and stripper plates at the limit of their upward stroke. Fig. 13$^a$ is a similar section on line $x$ $x$, Fig. 7. Fig. 14 is a detail vertical section taken in the same plane as Fig. 5, showing the parts in the position they assume just before the flasks begin to separate. Fig. 15 is an enlarged detail sectional view taken on the vertical line 15 15, Fig. 14. Fig. 16 is an enlarged detail sectional view taken on the horizontal section-line 16 16, Fig. 14. Fig. 17 is a section similar to Fig. 14, on a larger scale, showing the flasks in the act of separating and the mold-ejector in the act of ejecting the bottom board through the face of the lower flask. Fig. 18 is a detail perspective view of the spring for actuating one of the latches which hold the bottom board. Fig. 19 is an enlarged detail side elevation of the mechanism for imparting motion to the mold-ejector from the flask-actuating mechanism. Fig. 20 is a detail sectional view taken on the line 20 20, Fig. 19. Fig. 21 is a perspective view of the charger-carriage, showing the parts in the position they assume at the completion of the compressing stroke. Fig. 22 is a similar view with one side of the carriage removed, one of the chargers being also partially removed and showing the edges of the charger-boxes in their lowered position. Fig. 23 is a similar view showing the parts in the position they assume at the completion of the downward stroke of the pattern and stripper plates, the charger-carriage being on its way toward the sand-hopper. Fig. 24 is a perspective view of a part of the charger-carriage, showing in connection therewith one of the stripper-plate-supporting casings and the weight for elevating the same. Fig. 25 is a detail perspective view of one of the pattern-plates and its adjustable corner-gibs. Fig. 25$^a$ is a detail section on line $x$ $x$, Fig. 25. Fig. 25$^b$ is a detail section on line $b$ $b$, Fig. 25. Fig. 26 is a detail perspective view of the stripper-plate, removed from its supporting frame or casing. Fig. 27 is a detail perspective view of the guide-plate for the pattern-plate, which also constitutes the supporting-frame for the stripper-plate. Fig. 28 is a perspective view of the three members shown in Figs. 25, 26, and 27, assembled in their proper relative positions and illustrating in addition a number of patterns protruding through the stripper-plate and one of the links which raise and lower the pattern and stripper plates. Fig. 29 is a detail perspective view of the housing in which the device shown in Fig. 28 is located and by the upper edges of which the stripper-plate-supporting frame shown in Fig. 27 is elevated. Fig. 30 is a plan view of the flasks and flask-frame in the inverted position, the bottoms of the flasks being omitted. Fig. 31 is a longitudinal sectional view thereof, taken on the irregular section-line 31 31, Fig. 30. Fig. 32 is a detail section taken on the line 32 32, Fig. 30. Fig. 33 is a detail plan view of the two flasks looking toward the face side thereof. Fig. 34 is a detail transverse section taken on the line 34 34, Fig. 33. Fig. 35 is a plan section on line 35 35, Fig. 53, of one end of the main frame, showing the charger-carriage withdrawn to a position under the sand-hoppers which does not appear in this view. Fig. 36 is an enlarged transverse section taken on the line 36 36, Fig. 35. Fig. 37 is a section taken on the line 37 37, Fig. 35. Fig. 38 is a detail plan section on line 38 38, Fig. 10, showing a part of the charger-carriage and main frame, illustrating the manner in which the movement of the carriage disconnects the clutch members which actuate the flask mechanism. Fig. 39 is a detail plan section on line 39 39 of Fig. 41 of the independently-deflectible end on the deflecting-bar which disconnects the clutch members, showing said end rendered rigid by the shifting bar hereinafter described. Fig. 40 is a similar view showing the shifting bar withdrawn. Fig. 41 is a detail side elevation of the parts shown in Fig. 39. Fig. 42 is a detail vertical longitudinal sectional view on line 5 5, Fig. 3, of the mold-remover mechanism, partly broken away. Fig. 43 is a transverse sectional view thereof, taken on the line 43 43, Fig. 42. Fig. 44 is a detail side elevation of a part of the mold-remover frame, showing the cam or incline for releasing the lock which holds the mold-removing arms against rotation. Fig. 45 is an enlarged detail section taken on the line 45 45, Fig. 42. Fig. 46 is a detail side elevation of the means for automatically shifting the retaining-strips of the flasks. Fig. 46$^a$ is a detail section on line 46$^a$ 46$^a$, Fig. 46. Fig. 47 is a detail plan section taken on the line 47 47, Fig. 46. Fig. 48 is a side elevation of a part of the main frame, showing the core-setter and actuating mechanism. Fig. 49 is a detail side elevation, partly in vertical section on the irregular line 49 49, Fig. 52, of the core-setter, being shown in position for receiving the core and a core illustrated therein. Fig. 50 is a similar view showing the core-setter setting a core in the mold, a part of which latter is also illustrated. Fig. 51 is a transverse section taken on the line 51 51, Fig. 50. Fig. 52 is a detail plan view of a part of the core-setter and its actuating mechanism, partially sectioned and broken away. Fig. 53 is a vertical longitudinal sectional view taken on the line 53 53, Fig. 52. Fig. 54 is an enlarged detail side elevation of a part of the core-setter, showing a number of cores supported in the core-holders in readiness to be transferred to the mold. Fig. 55 is a similar view showing a core-setter in the act of setting the cores in the mold. Fig. 56 is a detail transverse section taken on the line 56 56, Fig. 54. Fig. 56$^a$ is a similar section on line 56$^a$ 56$^a$, Fig. 54. Fig. 57 is a detail plan section, on an enlarged scale, taken on the line 57 57, Fig. 70, showing the intermittent lock mechanism for oscillating the flasks on a common axis alternately in opposite directions. Fig. 58 is a detail face view of the disk secured to the flask-frame which carries said lock mechanism looking from the inner side. Fig. 59 is a plan view thereof, partly in section. Fig. 59$^a$ is a bottom plan section thereof, taken on the line 59$^a$ 59$^a$, Fig. 59$^b$, showing the locking-dog thrown out of action. Fig. 59$^b$ is an outer face view thereof. Fig. 60 is a view similar to Fig. 57, showing the tension of the bolt-actuating spring reversed for causing the bolt to shoot toward the left, the section in the latter view being taken on the irregular and vertical line 60 60, Fig. 70, after the disk shown in Fig. 59 has made a quarter-turn in the direction of the arrow shown in Fig. 70. Fig. 61 is a detail view showing the outline of the teeth of the mutilated gear and its relation to the flask-actuating pinion, showing the relative position of the parts when the flasks are turned face upward. In this view the sprocket-wheel for imparting motion to the mold-removing mechanism is omitted for the sake of clearness. Fig. 62 is a detail side elevation of a member of the tension-reversing mechanism hereinafter described. Fig. 62$^a$ is a bottom edge view thereof. Fig. 63 is a detail side elevation of another member of said mechanism for rotating the pinion of said mechanism. Fig. 64 is an end view thereof. Fig. 65 is a plan view thereof. Fig. 66 is a detail view of the bolt. Fig. 67 is an end view thereof. Fig. 68 is a longitudinal sectional view of the toothed sleeve for the bolt. Fig. 69 is an end view thereof. Fig. 70 is a side elevation of the mechanism for inverting and actuating the flasks, details of which are shown in Figs. 57 to 69 looking from the inner side and showing the parts in the position they assume when the flasks are inverted on their common axis. Fig. 71 is a detail transverse section taken on the line 71 71, Fig. 59. Fig. 72 is a detail plan view of the cam or incline on the frame for shifting the tension of the bolt-actuating spring while the bolt is locking the mutilated gear to the flask-frame. Fig. 73 is a face view thereof. Fig. 74 is an inner face view of a part of the worm-wheel, showing the groove for one of the members of the tension-reversing mechanism and the incline in said groove which reverses said mechanism. Fig. 75 is an outer face view of said worm-wheel, showing also the sprocket and pawl and ratchet which imparts motion to the mold-remover. Fig. 76 is a detail transverse section taken on the line 76 76, Fig. 57. Fig. 77 is an enlarged longitudinal sectional view of the shiftable mechanism for driving the worm or screw alternately in opposite directions. Fig. 78 is a detail sectional view of the shiftable clutch member of said mechanism. Fig. 79 is a detail sectional view taken on the line 79 79, Fig. 77. Fig. 80 is a plan section of the shaft which drives the worm, showing the shifting-rod and its connection to the shiftable clutch member; and Fig. 81 is a side elevation of the mold-remover, showing a modification hereinafter explained.

In order that the drawings may be better comprehended as the detailed description of the invention proceeds, the following brief explanation of the general construction and operation of the particular example of the invention shown in the drawings will be given.

According to this invention when the same is utilized for producing a mold composed of two mold members the mold members are formed in two flasks, respectively, which are invertible on a common axis and which receive the sand while inverted from two horizontally-reciprocating charger-boxes which alternately register, respectively, with the two flasks simultaneously and with a sand-hopper having an automatic valve for closing the hopper as the charger-boxes move away toward the flasks. When the charger-boxes reach a position registering with the flasks, the sand is forced upwardly into the flasks simultaneously by the pattern and stripper plates which constitute the bottoms of the charger-boxes, and thus ram or squeeze the mold from the face side while impressing the patterns therein. The pattern-plates then withdraw slightly in advance of the withdrawal of the stripper-plates, which latter subsequently overtake the pattern-plates in their downward movement, while the charger-boxes, with the balance of the charger mechanism, recede horizontally from the flasks in the direction of the sand-hoppers, and when clear of the flasks the latter turn face upward on their common axis and then begin to close together face to face for placing one mold member—the cope, for example—upon the other or drag. Before the flasks close together, however, an automatic core-setter approaches the still mold member and sets the core or cores therein and withdraws to receive another core for the next mold. In the meanwhile the flasks come together, the retaining-strips thereof for holding the mold members are automatically released, the flasks then separate, and the completed mold is ejected or elevated from the bottom of the lower flask to a position above the face of such lower flask, and as a final result an automatic mold-remover slides under the elevated mold and then swings it laterally out of the way to a place of safety. In this way the loose sand is automatically transformed into a complete mold ready for the metal.

When two flasks are employed for simultaneously producing two mold members, it is preferable to store the sand in two separate hoppers. These are shown at 1 2 as supported in any suitable manner upon the side members 3 4 of the main frame and which hoppers are open at bottom when not closed by a pair of sliding valves 5 6, respectively connected together at their outer ends by a connection 7, shown as formed integrally therewith. (See Figs. 22, 23, and 35.) As better shown in Fig. 22, these valves are supported upon a table 8, projecting from one side of a carriage 9, which has side flanges 10, supported in suitable guideways 11, formed on or secured to the inner faces of the side members 3 4 of the main frame and being adapted to reciprocate toward and from the sand-hoppers 1 2, as will be hereinafter described more in detail. As better shown in Figs. 21, 22, and 23, the valves 5 6 are countersunk in the face of the table 8, so as to be flush with the edges of the latter, and the table is provided at a point between the valves with a tongue 12, which is also flush with the faces of the valves 5 6, and is provided at its outer end with a catch 13, (see Fig. 6,) which, as better shown in Figs. 35 and 36, is adapted to engage with a spring-latch 14, secured to the under side of the connecting member 7 of the valves, so that when the tongue 12 is pushed inwardly between the valves 5 6 in the manner shown in Figs. 35 36 the catch member 13 will automatically engage with the latch or other catch member 14, and thus attach the valves to the carriage 9 through the agency of the tongue 12 and table 8, on which it is formed. This attachment of the valves 5 6 to the carriage 9 occurs when the carriage is advanced to the extremity of its stroke toward the left as viewed in Figs. 5, 5$^a$, 6, and 35, and when in such position the bottoms of the hoppers 1 2 are uncovered and the sand allowed to discharge, such position being shown in Fig. 5$^a$. When the carriage 9 returns toward the right, however, it pulls the valves 5 6 to a position under the hoppers, as shown in Fig. 5, so as to shut off further discharge of the sand, and in order that the carriage may continue on its way to complete the balance of its stroke toward the right without pulling the valves 5 6 with it the valves are automatically released from the tongue 12 by means of a trip 15, (see Fig. 36,) loosely held by screws 15$^a$, which engages against the under side of a cross member 16 of the frame at about the time the valves close the hoppers, and this trip 15 being operatively related, by means of a pin 17, to the spring-latch 14 it forces the latch downwardly out of engagement with the catch 13, thus releasing the tongue 12 from the valves and permitting the carriage to move on its way without carrying the valves with it. Just before the carriage 9 reaches the limit of its stroke toward the right, as viewed in Fig. 5, however, it imparts a further blow to the valves in the same direction by means of studs 18, projecting from the upper side of the table 8 and engaging in slots 19, formed in the under sides of the valves 5 6, as clearly shown in Figs. 5, 35, and 37, the studs 18 engaging in the right-hand ends of the slots or grooves 19 and imparting motion to the valves just before the carriage reaches the end of its stroke. By thus causing the valves to register with the table 8 it will be seen that the length of the main frame may be considerably reduced, inasmuch as the valves do not project toward the left much beyond the left-hand end of the table 8 when the latter is at the limit of its stroke toward the left. The outer edges of the valves may be held and guided by the side flanges 10 of the carriage, as better shown in Figs. 21, 22, 23, and 35, and such outer edges may, if desired, be also provided with lateral projections 20, which extend flush with the outer edges of the side flanges 10 and rest on the guideways 11 of the main frame, said guideways being, if desired, provided with gibs 21, having adjusting-screws 22 23, whereby lost motion and wear may be compensated for and the carriage adjusted transversely, as hereinafter described.

The carriage 9 may be constructed in any suitable manner, either cast integrally or formed of suitable detachable members bolted or otherwise secured together. The construction and formation of this carriage is best shown in the perspective views in Figs. 21, 22, and 24, and in Fig. 22 one side of the carriage is removed for disclosing internal mechanism. In any event, however, the carriage is formed with a number of charger-boxes 24 25, equal in number to the number of mold members to be produced at one time, and, as clearly shown in the figures just referred to, the upper edges of these charger-boxes are flush with the surfaces of the valves 5 6, and as the carriage arrives at a position with the charger-boxes 24 25 registering with the bottoms of the hoppers 1 2, respectively, the charger-boxes receive the sand from the hoppers until they are even full. This position of the carriage is best illustrated in Fig. 5$^a$, the sand being omitted, in which position it is seen that the valves 5 6 have registered with or overlapped the table 8, and the hoppers are wide open over the charger-boxes 24 25. The rear upper edges of the charger-boxes are provided with cleats or strips *x* as a means of making them flush with the faces of the valves 5 6. In order that the sand may distribute itself evenly in the charger-boxes 24 25 as the latter approach, the hoppers are provided with inclines or chutes 26, which shoot the sand toward the approaching charger-box, and as a consequence the advancing side of the box receives its sand and passes under the chute 26, where it is relieved from further pressure of the sand above, and the lower end of the chute 26 has an oppositely-inclined portion 27, which, as the charger-box advances, tends to crowd the sand down in the rear side of the box, and thus make the sand deposited within the box of substantially uniform density.

The sand is received in the charger-boxes directly upon the stripper-plate 28 and pattern or patterns 29, which together constitute the bottoms of the charger-boxes and also constitute a part of the charger mechanism for forcing the sand into the flasks, as hereinafter described, it being understood that one of the stripper-plates 28 and a pattern 29, or a match plate which is the equivalent thereof, are arranged in each of the charger-boxes, as more clearly illustrated in Figs. 5ª, 9, 10, and 13. Fitted accurately within each of the charger-boxes 24 25 is a housing 30 of box-like formation, as illustrated in Fig. 29, and each of these housings is secured to and constitutes the support for one of the stripper-plates 28. This may be accomplished in any suitable way. In the example shown in the drawings the stripper-plate 28 rests upon the flanged upper edge 31 of a guide-casing 32, (see Figs. 24, 26, 27, and 28,) and, if desired, may be bolted or otherwise secured thereto, so as to be capable of rising and falling therewith, while fitting snugly within the charger-box, which the flange 31 also fits. In the guide-casing 32 is formed a flooring 33, and in the lower side of the housing 30 at each end thereof is formed a cross-bar 34, which passes under the flooring 33 and is rigidly attached thereto by means of bolts 35, only one of such bolts being shown in Fig. 13, but it being understood that the same construction is employed at the opposite end of the housing. Thus it will be seen that when the housing 30 is raised and lowered the stripper-plate 28 will be compelled to follow.

Arranged within each of the guide-casings 32 is the pattern-plate 36, (see Figs. 24 to 29,) which is secured to and supports the patterns 29 and which latter project through openings 37ª in the stripper-plate in a well-known manner and when protruding through the stripper-plate, as shown in Figs. 5ª and 28, are capable of producing their impression in the sand when forced upwardly, as shown in Fig. 10, the casing 32 constituting a guide for the pattern-plate 36 in its up-and-down movements.

As better shown in Fig. 25, the pattern-plate is provided at its four corners with guide-legs 37, and to the outer sides of these are secured, respectively, four corner-gibs 38, the guide-legs 37 having their corners sheared off or flattened, with the adjustable gibs 38 resting flat thereagainst and being triangular in cross-section, so as to constitute a continuation of the sides of the legs 37 and complete the corners. The gibs 38 are respectively fitted in corner-ways 39, formed in the corners of the guide-casing 32, and thus center the pattern-plate with reference to the guide-casing 32, while permitting the pattern-plate, together with the corner-gibs, to move up and down freely within the casing. In order that wear between the gibs and the corner-guideways 39 may be readily taken up and the pattern-plate 36 be centered with relation to the casing whereby the patterns may be adjusted relatively to the stripper-plate, and thus enable the patterns to be brought accurately into register with the stripper-plate, the corner-gibs 38 are secured to the corner-legs 37 by adjustable means. The form of construction for accomplishing this consists in providing each of the legs 37 on its inner side with a transverse set-screw or bolt 40, which is threaded in the leg 37 (see Figs. 25 to 38) and abuts against the inner face of the gib 38, and this bolt 40 is hollow, and passing through it is another bolt 41, which has its inner end threaded in the inner face of the gib, with its head abutting against the outer end of the set-screw 40. By the described means it will be seen that when the bolt or set-screw 40 is backed off from the gib 38 and the set-screw 41 is tightened up the gib will be drawn in closer toward the corner-leg, or when the hollow bolt or set-screw 40 is screwed in the gib will be forced outwardly away from the leg, and by thus manipulating the transverse adjusting-bolts of the various legs the pattern-plate may be given the desired transverse adjustment with relation to the stripper-plate.

In order that the initial or normal position of the pattern-plate may be adjusted with relation to the stripper-plate 28 in a vertical or perpendicular direction, so that the extent to which the patterns 29 will protrude through the stripper-plate at the limit of the upper movement may be varied to suit the requirements, these corner-gibs are made adjustable also longitudinally of the corner-legs 37, the hollow bolts 40 being of sufficient inside diameter, as appears in Fig. 25ª, to permit the inner bolt 41 to rise and fall a slight distance independently of the leg 37. This vertical adjustment is accomplished by a set of bolts or set-screws similar to the bolts 40 41. As better shown in Fig. 25, the lower ends of the gibs 38 are provided each with a foot-piece 42, which projects inwardly under the corner-legs 37 adjacent thereto, and in the bottom of this foot-piece is screwed a hollow set-screw 43, which impinges against the lower end of the leg 37 directly thereover, and passing through the hollow screw 43 is a set-screw or bolt 44, which is threaded in the lower end of the leg 37 and has its head abutting against the lower end of the bolt 43. Thus it will be seen that by screwing up the bolt 43 and at the same time backing off the bolt 44 the leg 37 may be elevated with relation to the corner-gib 38, and by screwing down the bolt 43 it may be lowered, the bolt 44 in that event being screwed up to take up the lost motion. It will also be seen that the inner diameter of the hollow bolt 43 is larger than the bolt 44 to allow for transverse adjustment of the bolt 44 with reference to the bolt 43 when the parts are moved by means of the adjusting-bolts 40 41.

As clearly appears in Figs. 13, 27, 28, and 29, the guide-casing 32 is provided in each corner of its bottom or floor 33 with an aperture 45 of sufficient size to permit the corner-legs 37 and gibs 38 to pass downwardly therethrough, so that the pattern-plate 36 will be capable of requisite up-and-down movement independently of the stripper-plate, which is supported by said guide-casing 32, and the cross members 34 of the housing 30, which project under the flooring 33 of the casing 32, are likewise provided with apertures 46 of sufficient size to permit the said corner-legs 37 and gibs 38 to pass therethrough and move vertically independently thereof. The foot-piece 42 on the lower end of each of the corner-gibs 38, however, has sufficient lateral projection to engage under depending corner-pieces 47, formed on the four corners of the guide-casing 32, and constitute a support for elevating the guide-casing 32, together with the stripper-plate, when the pattern-plate 36 and its connected parts just described are elevated by suitable means, which will now be explained. The housing 30, being secured to the bottom 33 of the guide-casing 32, will also be elevated in unison with the pattern-plate by the same means.

The carriage 9 is provided on its under side with four hangers or depending portions 48 49 50 51, the first and last of which constitute the sides of the carriage, while the two hangers 49 50 are arranged at a short distance apart at about the mid-width of the carriage, as better shown in Figs. 9 and 10, and on the lower end of each of these hangers is formed a bearing-box 52, and in each of these bearing-boxes is journaled a transverse shaft 53, which is independent of the main frame of the machine and moves back and forth with the carriage 9, in which, as before explained, are formed the charger-boxes 24 25. Suitably secured or keyed to this shaft 53 at a point between the hangers 48 49 is a pair of arms 54, and between the hangers 50 51 is a similar pair of arms, also numbered 54. These arms 54 are for the purpose of simultaneously raising or lowering the pattern and stripper plates in their respective charger-boxes 24 25, and the mechanism for connecting one pair of these arms 54 with said pattern and stripper plates being the same in both instances a description of one set of mechanism will suffice for both. Pivoted to the free end of each of the arms 54 by means of a pin 56 is a link 57, which, together with the arm 54, constitutes a toggle, and the upper end of each of these links 57 is pivoted, by means of stud or pin 58, to the side members 59 of the casing on which the pattern-plate 36 is formed, so that when the shaft 53 is rocked the pattern-plates 36 will be simultaneously raised or lowered in their respective charger-boxes 24 25, and when the lateral projections of the foot-pieces 42 (see Figs. 25, 28) come against the lower ends 47 of the guide-casing 32 they will also lift said guide-casing, and consequently force the stripper-plate, along with the pattern-plate, up through their respeictve charger-boxes 24 25, and thereby force the sand out of the charger-boxes into their respective flasks and produce the impressions in the faces of the mold members, as will be hereinafter described.

Power is imparted to the rocker-shaft 53 for thus raising and lowering the pattern and stripper plates by means of a toothed segment 60, which is keyed or otherwise secured to shaft 53, as better shown in Figs. 10 and 12, and this segment is engaged by rack-bar 61, adapted to be reciprocated relatively to the carriage 9 by means of a screw 62 when the charger-boxes 24 25 reach a position coincident with the flasks 63 64, respectively. This rack-bar 61, together with the segment 60, is located in the space between the two intermediate hangers 49 50, as shown in Fig. 9, and the rack-bar is connected by a dovetailed connection 64$^a$ with the under side of a sleeve 65, (see Figs. 9 and 12,) which sleeve is mounted to slide in suitable bearings 66, carried by the carriage 9 in such manner that when the sleeve 65 reciprocates the segment 60 will be oscillated and the pattern and stripper plates accordingly raised or lowered. In one end of the sleeve 65 is formed a nut 67, in which the screw 62 engages for imparting motion to the sleeve. This nut, sleeve, and screw also serve as means for imparting bodily motion to the carriage 9, whereby the carriage is caused to alternately move into positions registering with the sand-hoppers 1 and 2 and the flasks 63 and 64. As above explained, the sleeve 65 is capable of sliding in its bearings independently of the carriage 9, and it is during this independent motion of the sleeve that movement is imparted to the segment 60 for raising and lowering the pattern and stripper plates, and thus charging the flasks 63 64 and withdrawing to a position below said flasks, while the charger-boxes 24 25 remain in a position registering with the flasks, respectively.

In order that the sleeve 65 and screw 62 may be instrumental in imparting bodily motion to the carriage 9, the sleeve and carriage are provided with an automatic latch mechanism which will disengage when the charger-boxes 24 25 reach a position registering with the flasks 63 64, thus permitting the sleeve to continue its motion a sufficient distance to operate segment 60 and charge the flasks, and which latch mechanism will automatically reengage the sleeve 65 when the sleeve makes its return motion, and thus cause the carriage to return with the sleeve for the purpose of bringing the charger-boxes 24 25 into registration with the sand-hoppers 1 and 2. This automatic latch mechanism may consist of any suitable devices. In the drawings is shown a dog 69, which is pivoted to a bracket 70 (see Figs. 12, 21) and provided with a pin 71, adapted to drop into a notch 72, formed in a rib 73, extending in the upper side of the sleeve 65, when said notch arrives at a position under the pin or bar 71, and thus lock the carriage to the sleeve 65 when the sleeve returns from the position shown in Fig. 12 toward the left as viewed in said figure. When the carriage 9 reaches a position registering with the flasks, however, the pin or bar 71 of the dog 69 is automatically lifted out of engagement with the notch 72 as a result of an arm 74 on the dog striking a stop 75, screwed into a cross member 76, Figs. 12, 13ª, of the main frame, the pin 71 being normally forced downwardly against the top of the rib 73 by any suitable means, such as a spring 77, interposed between the back of the arm 74 of the dog and a part of the carriage 9. The stop 75 is made in the form of a set screw or bolt, so as to be adjustable, and thus accurately time the disengagement of the dog from the sleeve. As the pin 71 of the dog 69 swings upwardly out of engagement with the notch 72 it instantly engages in another notch, 78, formed just above it in the main-frame member 76. In the example of the invention shown in the drawings this notch 78 is produced in a hang-block 79, secured in any suitable way to the main-frame member 76, but virtually constituting a part of said frame. By this means it will be seen that the instant the carriage is released from the sleeve 65 it is locked to the main frame in a position registering with the flasks, so that it cannot move in either direction while the charger is forcing the sand into the flasks. For the sake of greater safety, insuring the disengagement of the dog 69 from the main-frame block 79 as the sleeve 65 returns from its protruding position, (shown in Figs. 12, 21,) the dog may be provided with a depending arm 80 and the side of the sleeve 65 with a projecting lug 81, adapted to strike said arm, and thus positively release pin 71 from the notch in block 79 should the spring 77 fail to accomplish that result.

When the sleeve moves toward the right as viewed in Fig. 12 from a position in which the notch 72 is in engagement with pin 71, it begins the independent motion which actuates the segment 60 for forcing the sand upwardly into the flasks, and during this motion toward the right it moves the toggles sufficiently to cause them to pass center and produce sufficient compression of the sand to impart the requisite solidity or density to the faces of the mold members, such compression, it will be seen, being thus produced from the face side of the mold. As the sleeve 65 returns from the limit of its stroke on the right as viewed in Fig. 12 to the limit of its independent stroke toward the left it rocks segment 60 in the opposite direction and lowers the pattern-plate and stripper-plate into their respective charger-boxes 24 25 a sufficient distance to clear the lower edges of the flasks before the carriage, with its charger-boxes, begins to move toward the left, or, in other words, returns to the sand-hoppers 1 2. The pattern-plates 36 being connected directly and positively with the shaft 53 and segment 60 through the intermediary of the toggles 54 57, the effect of this independent motion of the sleeve 65 toward the left is to cause the pattern-plates to begin to descend the instant said independent motion starts; but the stripper-plates 28 being supported by the housings 30 engaging under flanges 31 of guide-casings 32, which have a limited vertical movement independently of the pattern-plates, may be held aloof and in firm contact with the lower faces of the mold members (shown at 82 83, Figs. 9 and 10) until the patterns have been withdrawn from the sand downwardly through the pattern-openings 37 in the stripper-plates, whereupon the stripper-plates may be caused to descend into their respective charger-boxes 24 25 and according to this invention are caused to overtake the pattern-plates and descend in unison with them before the latter reach the limit of their downward movement. In order that this action of the stripper-plates may be produced, the stripper-plates are held aloof from the pattern-plates when the latter begin to descend by means of some yielding mechanism or device, such as a weight 84, connected with the housings 30 in any suitable manner. In the example of the invention shown in the drawings the weight is supported upon one end of a lever 85, Fig. 12, which is pivoted by pin $86^{\times}$ to a hanger 86 on the lower side of the carriage 9, and has its other end pivoted to a block 87, secured in any suitable way to a cross member 88, (see Fig. 24,) which has its end suitably attached to the housings 30, which latter are shown with corner projections 89 as a means of attaching them to the cross member 88. The lever 85 is slotted, as shown at 90, where the pivot-pin $91^{\times}$ of block 87 passes through it, so that the housings 30 may rise and fall in a straight line while the lever 85 oscillates. After the pattern-plates have been drawn the requisite distance to release the patterns from the sand the downward motion of the stripper-plates is produced by the segment 60 engaging the inner end of the arm or lever 85 and raising weight 84. In order that the shock of this engagement may be relieved, the inner end of arm 85 is provided with some suitable yielding device, such as stem 91, arranged in a housing 92, carried by the arm 85 and containing a spring 93, which presses under a shoulder 94 on stem 91 and tends to force stem 91 upwardly against the action of segment 60. The upper end of stem 91 is provided with antifriction-roller 95 for reducing the friction. It will thus be seen that the weight 84 will hold stripper-plates up against the faces of the mold members until segment 60 engages antifriction-roller 95, and at that time the pattern-plates may be well along on their downward course, (see Figs. 12, 13$^a$;) but inasmuch as the leverage of the inner end of arm 85 between the roller 95 and pin 91$^\times$ is longer than the toggle-arms 54 and the roller 95 approaches the center of segment 60 as the segment descends it will be seen that the stripper-plates will descend more rapidly than the pattern-plates and with a gradually-decreasing speed until it overtakes the pattern-plate. This is because the segment is longer that the toggle-arm and at first transmits motion to roller 95 at a point nearer its (the segment's) outer end, which is moving the fastest; but as the segment descends the roller 95 approaches nearer and nearer the center of the segment, where the speed is less, and consequently the speed of the stripper-plate gradually decreases as it descends. If desired, the edge of segment 60 may be provided with a cam-face 96, which may be so outlined as to gage the movement of the stripper-plates to a nicety. When the stripper-plates reach the limit of their downward movement, the carriage, together with the charger-boxes and the balance of the charger mechanism supported thereon, begins its movement toward the hoppers for another charge of sand, which is taken into said charger-boxes directly upon the faces of the patterns and the stripper-plates, which constitute the bottoms of the charger-boxes, and the extent of depressions or downward movement of the stripper-plates and pattern-plates therefore determines the amount of the sand or charge taken into the charger-boxes and forced into the flasks at each operation. In order that the sizes of the charge may be varied at will to suit the requirements of the mold, the rack-bar 61 is made adjustable with reference to the sleeve 65, so that the segment 60 will be turned downwardly for lowering the stripper-plates and patterns a greater or less extent before the notch 72 in the sleeve 65 comes under and is engaged by the dog 69 71, secured to the carriage. This relative adjustment of the rack-bar 61 may be conveniently accomplished by means of a set-screw 97, threaded in a boss or lug 98 on the under side of sleeve 65 and also threaded in the end of rack-bar 61, which, as before explained, is slidably connected with the under side of sleeve 65 by means of the dovetailed connection 64. Thus it will be seen that by unscrewing said screw 97 a greater number of the teeth of rack-bar 61 will have to pass segment 60 before notch 72 reaches pin 71, and consequently the pattern and stripper plates will be lowered a greater extent in their respective charger-boxes than they would be if said screw 97 were turned in a direction to force rack-bar 61 inwardly with reference to sleeve 65. 97$^\times$ represents jamb-nuts for locking screw 97.

In order that the weight 84, tending to hold the stripper-plates up against the faces of the mold members, may not be overcome by any friction between the patterns and the pattern-apertures in the stripper-plates as the patterns begin to descend, which sometimes occurs when core-wires or other foreign substances get jammed between the patterns and said apertures, it is desirable to lock the stripper-plates in their upper position until they are fully cleared by the patterns and the segment 60 is about to engage roller 95 for lowering the stripper-plates. As a means for accomplishing this locking of the stripper-plates in their elevated position a latch 99 (see Fig. 12) is pivoted at 100 to hanger 86 and is adapted to be thrown outwardly over a beveled block 101, carried by the lever 85, when the lever reaches the limit of its downward movement by means of a spring 102, normally tending to throw the lower end of latch 99 outwardly over the block 101. At about the time segment 60 begins to engage antifriction-roller 95, however, the end of rack-bar 61 engages the upper end of pivoted latch 99 and throws the lower end of the latter inwardly out of engagement with block 101, thus releasing the lever 85 and permitting the weight 84 to be elevated by the action of segment 60. The under side of rack-bar 61 is cut away, as shown at 103, to avoid releasing latch 99 prematurely.

As clearly shown in Figs. 5$^a$, 9, 12, and 24, the cross-bar 88, which supports the housings 30, is located below transverse shaft 53, which is rigidly supported in the hangers 48 51 of the carriage 9, as before described, and in order that the housings 30 may rise and fall, as just described, for actuating the stripper-plates without interference the shaft 53 is arranged between the depending portions 89 of the housings 30, and in order that the toggle-links 57 may rise and fall independently of guide-casings 32 and also oscillate laterally said guide-casings are cut away in the form of inverted-V-shaped notches 104, as better shown in Fig. 28, the inner faces of housings 30 serving to hold the upper ends of said toggle-links from lateral displacement, as clearly indicated in Figs. 9 and 10.

The main operating-screw 62, which imparts bodily movement to the carriage 9 and operative movement to the charging mechanism and stripper-plates, as already described, is supported at its inner end by the nut 67, and as the carriage approaches the sand-hoppers 1 and 2 the plain interior of the sleeve 65 receives said inner end, while the other or outer end of the screw is formed on or secured to a shaft 105, mounted in a bearing 106, Figs. 5, 6, and 77, in a journal-box 107, formed on a cross member 108 of the main frame, the shaft 105 being held, together with the screw 62, against longitudinal movement in said bearing in any suitable manner, such as grooves 109 in the shaft engaging circumferential ribs in bearing 106, which latter is housed in box 107, and thus held against longitudinal movement. Shaft 105 is capable of being rotated alternately in opposite directions for first advancing the carriage 9 to a position registering with the flasks and then withdrawing it to a position registering with the hoppers. As a means for thus rotating the screw and shaft a shiftable clutch mechanism of any suitable form may be provided. The example shown in the drawings consists of two pulleys 110 111, which are capable of rotation independently of shaft 105 and with which engage driving-belts 112 113, respectively, (see Figs. 1 and 77,) which latter are driven in opposite directions by any suitable means, (not shown,) and between these pulleys is arranged a third clutch member 114, capable of being forced into engagement with either pulley, so that rotation of the pulley may be imparted to the shaft 105 through the agency of a key 115 or other suitable connection between the shaft and clutch member 114. As shown in Figs. 77 78, this clutch member 114 is composed of a series of arms whose outer ends are bent so as to engage the inner conical faces of the pulleys 110 111, and the outer faces of said arms are also beveled transversely, so as to conform to and produce a wedge connection with either of the pulleys. The clutch member 114 may be forced into engagement with either pulley by means of a shift-rod 116, located within the shaft 105, which is hollow and connected to clutch member 114 by means of pin 117 passing through a slot 118 in the hollow shaft 105. This shift-rod 116 is also connected with a flanged collar 119 by means of a transverse pin 120 passing through a slot 121 in shaft 105. The collar 119 is sleeved loosely on shaft 105, and between the flanges of said collar is journaled a two-part collar 122, (see Fig. 79,) having pivots 123, with which engage the branches of the shifting fork 124, whose lever-arm 125 is pivoted in bracket 126 (see Fig. 3) to the frame member 108 and is pivoted at its outer end to a rod 127, supported longitudinally of the main-frame member 3 in hangers 128 and extending to the opposite end of the machine, where it is connected to the outer end of a lever 129, which is pivoted in bracket 130 on cross member 76 of main frame and has its inner end arranged to be actuated in any suitable way by the protruding end of sleeve 65. As shown in Fig. 7, lever 129 has its inner end provided with a fork 130ª, which engages a pin 131 on a collar 132, secured to a sliding sleeve 133, which is supported and guided by a rod 134, secured rigidly to the main frame 76, and this sleeve 133 is provided at its outer end with a head or lug 135, adjustably clamped or otherwise secured thereto, adapted to be struck by the end of the sleeve 65 when the latter is at the extremity of its independent movement toward the right as viewed in Fig. 12, thus imparting a pull to the inner end of the lever 129, and thereby shifting rod 127 in such manner as to disengage the clutch member or pulley 111 (see Fig. 77) and force it into engagement with clutch member or pulley 110, thus reversing the rotation of screw 62 and causing sleeve 65 to immediately start back on its inward movement for oscillating segment 60 toward the left and withdrawing the patterns and stripper-plates from the flasks in the manner already described, it being understood that this movement of the sleeve 65 toward the left continues until the inner end of the sleeve strikes against collar 119 and forces clutch member 114 outwardly and again into engagement with clutch member or pulley 111, thereby reversing the rotation of the screw, the sleeve in carrying its notch 72 under the pin 71 of dog 69 picking up the carriage and carrying the charger-boxes thereof into a position coincident or registering with the sand-hoppers 1 2 and opening the valves 5 6 to permit the sand to fill the charger-boxes by the time the end of the sleeve reaches collar 119 and reverses the rotation of the screw 62, as described. The lug or head 135 is made adjustable on the sleeve 133 in order to gage to a nicety the time at which the rotation of the screw 62 will be reversed. The pulley 110 retracts the carriage, and pulley 111 advances it toward the flasks.

In order that the movement of the carriage 9 may be stopped or started in either direction at the will of the operator, a hand-controlled lever 137 is provided. This, as clearly shown in Fig. 1, is pivoted to the side member 3 of the main frame and has its lower end provided with a fork 138, engaging a pin 139 upon a block 140, secured to shift-rod 127, so that clutch member 114 may be thrown into engagement with either of clutch members 110 or 111 or held in a neutral position, as now shown in Fig. 77.

The clutch members 110 111 may be rotatably supported in any suitable manner. As shown in Figs. 1, 8, and 77, the main frame is provided with a bracket 141, having journal-box 142, in which the extremity of shaft 105 is journaled. This journal-box is formed in two sections, as usual, and its inner end is provided with a flange 143, which hooks over a flange 144 on a bushing 145, sleeved on shaft 105, and constituting the bearing for hub of pulley 111, to which bushing 145 is secured in any suitable manner. By this means it will be seen that pulley 111 is journaled loosely on shaft 105 and at the same time held against longitudinal movement thereon. Pulley 110 is mounted upon a similar sleeve or bushing 146 and to which pulley 110 is secured, and this bushing 146 also has a flange 147, which is engaged by a flange 148, secured to the side of a pulley 149, rigidly secured to shaft 105 by means of key 150 or other suitable device, thus holding pulley 110 against longitudinal movement on the shaft while permitting it to rotate independently thereof.

147$^a$ are antifriction-washers.

As illustrated in Figs. 9 and 13, the upper edges of the charger-boxes 24 25 fit into close contact with the lower edges of the flasks 63 64, and consequently the hanging sand on the mold members 82 83 would be shaved off by the edges of the charger-boxes as they moved away from the flasks toward the hoppers 1 2 if such edges were not carried out of line with the hanging sand during that movement or until they had cleared the flasks. With this end in view the upper edges of the end walls of both charger-boxes are caused to drop down automatically before the charger-boxes start on their return movement. As better shown in Fig. 23, the end walls of each of the charger-boxes are provided at their upper edges with independently-movable sections 24$^a$ 25$^a$, respectively secured to the slides 151, mounted upon inclined guideways 152, (see Figs. 5, 5$^a$,) cast on or otherwise secured to the side of the carriage 9, the independently-movable sections 24$^a$ 25$^a$ of the charger-boxes being divided from the main wall of their respective boxes on an oblique line or line parallel with the face of the guide 152, so that when the movable section of the wall is in place the parts will fit together along the inner surface of the wall without the formation of a breach or crack of any considerable width, as shown in Fig. 5$^a$, and at the same time the joint will be such as to permit the movable section to readily drop down out of the way of the hanging sand, as better shown in Fig. 23. These slides 151 may be held on their guideways 152 in any suitable manner. In the example shown in the drawings (see Figs. 21, 23) each of the slides is bifurcated, so that the bifurcations will fit on opposite sides of a guide-block 153, formed on the guideway 152, and to this guide-block is secured a plate 154, whose edges overlap the edges of the bifurcations of the slides 151, and thus hold the slides in position, while permitting them to slide up and down. These slides, with their movable sections 24$^a$ 25$^a$ of the charger-boxes, are lowered after the sand has been forced out of the charger-boxes and are automatically raised again into their proper operative position, as illustrated in Fig. 21, before the charger-boxes come into register with the sand-hoppers. A simple means of accomplishing this consists in connecting each of the slides 151 to a pair of crank-arms 155, Figs. 13$^a$ and 21, on a rocker-shaft 156, by means of a pair of links 157, pivoted at their upper ends to the lugs 158, projecting from the sides of slides 151, and at their lower ends to suitable pivots on the crank-arms 155, which latter are secured in any suitable way to shaft 156, so that the rocking of the shaft will raise or lower the slides 151, the shaft being journaled in suitable bearings 159, formed on or secured to the end of the carriage 9. The shaft at about its mid-length (see Fig. 11) is provided with a pinion 160, which is engaged by a sliding rack-bar 161, (see Fig. 12,) dovetailed in a suitable support 162 on the under side of the carriage 9. The inner end of this rack-bar 161 is provided with an arm 163, which is arranged to be struck by a lug 164, formed on or secured to the side of segment 60 when the segment is about to complete the end of that one of its movements which forces sleeve 65 outwardly, as shown in Fig. 12, thus rocking shaft 156 and pulling the slides 151 downwardly into position shown in Fig. 23, where they remain out of the way of the hanging sand as the carriage moves toward the sand-hoppers until the charger-boxes are about to coincide with the hoppers 1 2, whereupon the shaft 156 is rocked in the opposite direction and the movable sections 24$^a$ 25$^a$ of the charger-boxes restored to their normal positions by any suitable means, such as a lug or roller 165, Fig. 21, coming into engagement with a cam or incline 168, Figs. 1 and 53, formed on or secured to the side member 3 of the frame and forcing downwardly on a rod 169, Fig. 21, connected to the rocker-shaft 156 by means of crank-arm 170, the upper end of rod 69 being supported and guided by a swivel-keeper 171, pivoted to the side of carriage 9, as clearly shown in Figs. 21 and 23.

The flask 63 is a shell rigidly secured in any suitable manner in a flask-frame 172, (see Figs. 9, 10, 11, and 13,) which is provided at opposite ends with trunnions 173 174, journaled in suitable bearings 175 176 on the side members of the main frame, while the flask 64 is a shell of similar form removably seated in a socket 177, Figs. 9, 10, and 11, formed in the flask-frame 172. Flask 64 is provided with hinged members 178, keyed or otherwise rigidly secured to a transverse shaft 179, journaled in bearings 180, formed on or screwed to flask-frame 172, so that by the rotation of shaft 179 the movable flask 64 may be caused to close over flask 63 and accurately fit face to face therewith in the manner illustrated in Fig. 11, while the flasks as a whole may be turned on their common axis or trunnions 173 174 when the flasks are opened in the position shown in Fig. 10. By thus hinging the flasks together it will be seen they are given a definite positive relation to each other, whereby the movable one always moves in the same line with reference to the other one, and when the two come together they accurately register without the aid of dowels or pins, commonly used. When the flasks receive the sand from their respective chargers, they are in their inverted position, as illustrated in Fig. 10, and after the pattern and stripper plates of the charging mechanism rise and force the sand into the flasks simultaneously in the manner shown in said figure and then descend to draw the patterns and carry the stripper-plates back into the charger-boxes. The flasks turn face upward on their common axis or trunnions 173 174 in the position shown in Fig. 7, after which movable flask 64 folds over fixed flask 63, as shown in Fig. 11, thus bringing the two mold members 82 83 face to face, the cope being placed upon the drag. The carriage 9, in which the charger-boxes 24 25 are formed, is provided in its upper side with a semi-cylindrical depression $9^\times$, located between the boxes 24 25, so that shaft 179 and hinge members 178 may extend below the edges of the boxes and permit the carriage to move back and forth. The bottom (the top when inverted) of flask 64 is provided with a sprue-funnel 181, which projects into the mold member 83 to form the conical part of the sprue, and the pattern-plate 36, which coöperates with this flask 64, is provided with a sprue-bar 182, projecting upwardly through the stripper-plate 28 and entering the sprue-funnel 181 when the pattern-plate is forced upwardly, as shown in Fig. 10, the stripper-plate being formed with a boss 183 around the aperture through which sprue-bar 182 protrudes, so that at the completion of the compressing stroke such boss will form the gate 184, (see Fig. 11,) when it, together with sprue-bar 182, is withdrawn from mold member 83, any sand forced upwardly into funnel 181 being allowed to drop through gate 184 as sprue-bar 182 descends. In the particular example of the invention shown in the drawings the bottom of flask 64 is shown with threaded collar 185, into which the sprue-funnel 181 is screwed, and the flask-frame 172 is provided with a separate frame member 186, secured to the main frame 172 by bolts 187 and having aperture 188 directly opposite sprue-funnel 181 to permit any loose sand to drop out when the flask-frame is turned upward, as shown in Fig. 7. For the sake of greater security the movable flask 64 is locked or latched in its socket 177 in the main frame by means of an automatic catch (shown in Fig. 32) consisting of a dog 189, pivoted to the flask-frame 172 and having a tooth 190 passing through said frame and engaging with a catch member 191, (shown as a hang-plate secured to flask 64,) the dog 189 being thrown into engagement by spring 192 and automatically thrown out of engagement for releasing flask 64 and permitting the latter to be turned over on top of flask 63 when the flasks turn face upward by a heel-piece 193, Figs. 30 to 32, coming into engagement with the side member 4 of the main frame as the flasks turn face upward on their common axis or trunnions 173 174.

Each of the flasks is provided at its face side (and by the "face sides" of the flasks is meant their sides which come together) with outwardly-projecting flanges 194, Figs. 9, 10, 11, and upon these flanges are mounted retaining-strips which hold mold members 82 83 in place until the cope has been placed upon the drag, when the strips are automatically withdrawn, as will be hereinafter described. These retaining-strips project around the four sides of each flask, and each flask is provided with two of these strips, which are each made in the form of a triangle, as shown at 195 196, respectively. (See Figs. 33, 34.) The faces of the side flanges 194 of the flasks are provided with inclined dovetailed grooves 197, and the under sides of the retaining-strips 195 196 are provided with blocks 198 of complementary form fitting and sliding in said grooves, so that when one of the retaining-strips is pushed in one direction it will move outwardly to release the mold member and when pushed in the opposite direction will overhang the edge of the flask, as shown in Figs. 10, 11, for holding the mold member in place. The inner edges of the retaining-strips adjacent to the face side of the flask are beveled at an angle of about sixty degrees, so that when the sand is forced upwardly it will also back laterally, and the charger-boxes 24 25 and their respective stripper-plates 28 are of smaller diameter than the diameter of the mouth of the flask, but about equal in diameter to the distance between the retaining-strips when the latter are in their retaining or inner position, as shown in Figs. 9 and 10, so that the sand will not back against the under sides of the retaining-strips when the stripper-plates rise, but will be forced through the retaining-strips, leaving the stripper-plates to come up flush with the lower faces of the retaining-strips. In order that the movement of one strip on each flask may simultaneously effect the movement of both strips for each flask, the contiguous ends of the strips are provided with rack bars or teeth 199, arranged parallel with each other, and located between these rack-bars is a small pinion 200, which is pivoted to the flange 194. Thus it will be seen that when the retaining-strip 195, for example, is pushed toward the right, as viewed in Fig. 33, it will release the mold and simultaneously effect the movement of retaining-strip 196 in the opposite direction, causing it also to release the mold. Each of the retaining-strips 195 is provided at one end with a projection 201, so arranged that when the flasks are folded together in the manner shown in Fig. 11 both of these projections will come opposite a lever 202, (see Figs. 7 and 46,) which at the proper time is caused to force against projections 201, and thus disengage all four retaining-strips simultaneously by means which will be presently described. At the opposite ends of retaining-strips 195 are formed similar projections 203 204. When the flasks resume their open relation and are again inverted into the position shown in Fig. 9, the projection 204 comes into engagement with the face of an incline $205^\times$, secured to frame member 292, (see Figs. 7 and $46^a$,) and the projection 203 at the same time comes into engagement with an incline 205, (see Fig. 7,) secured to the side member 4 of the main frame, thus shifting retaining-strips of flask 64 in the opposite direction (relatively to the flasks) to that in which they were moved by lever 202 and causing them to overhang the edges of the flask for retaining the mold. The lever 202 is of inverted-U shape, as shown in Fig. $46^a$, and the incline $205^\times$ is arranged between the sides thereof, so as to be struck by projection 203. The lever 202 is pivoted in any suitable bearing 206 on the top of side member 3 of the main frame, which being secured to a two-part shaft 207, whose parts are connected together by the lever 202 and journaled in bearings 206, so that the lever 202 may be located inward from the frame member 3 at a point in line with the projections 201, while the arm $202^\times$, which is secured to the outer end of shaft 207, may be outside the frame member 3, as shown in Fig. 48, where it is connected by a pin 208 to an operating-rod 209, the rod being located inside the frame member 3 and the pin 208 projecting through a slot 210 in said frame member. The other end of this rod 209 is supported by a keeper 211, secured to the side member 3 of the main frame. Sliding on the rod beyond the keeper is a block or lug 212, and acting between this and the nut 213 on the rod is a coil-spring 214, which cushions block 212 on the rod, and allowing for excessive motion spring $214^a$ serves to shift the rod longitudinally and throw the upper end of lever 202 out of engagement with the projecting ends 201 of the retaining-strips. Movement in the opposite direction is imparted to rod 209 by an adjustable trip 215, secured to the side of carriage 9 in line with and adapted to strike an arm 216, Figs. 46 to 48, pivoted at 217 at its lower end and having its upper end engaging flange 218 on the inner side of block 212, so that at the proper time—i. e., after the mold members have been placed together—the trip 215 on the carriage will effect the disengagement of the retaining-strips of both flasks simultaneously, and when said trip 215 moves away from arm 216 spring $214^a$ will return lever 202 to its disengaged position, as shown in dotted lines in Fig. 46. The movement of arm 216 by spring 214 may be limited by stop $218^a$.

After the mold members are placed one upon the other face to face in the manner shown in Fig. 11 the flasks separate, as above described, and the completed mold, comprising the two members 82 83, is then ejected from the lower flask by means which will now be described with reference to Figs. 1, 2, 3, 4, 5, 9, 10, 11, 14, and 17, the sides of the flask being flared or rounded, so that the upper one in turning away from its mold member will not injure the sides thereof and the lower one will readily release the lower mold member as the latter is projected upwardly by the ejector. In the lower flask member 63 is located a removable bottom board 219, having lugs or teeth 220 on its under side, with which respectively engage two latches 221, which are pivoted to ears or hangers 222, formed on a movable bottom 223 of the flask 63, and these latches are forced normally into engagement with the hooks or lugs 220 by means of springs 224 or other suitable devices engaging with hangers 222 and the latches, as better shown in Fig. 18. Thus when the latches are not otherwise restrained they hold the bottom board in place, and the lower mold member is produced on the top of this board, as clearly shown in Fig. 11. The lower ends of the latch 221 are provided with converging tailpieces 225, which engage over shaft 226 in such manner that when the bottom board is forced upwardly the tailpieces 225 will be separated and the latches 221 released from the hooks 220, whereby the bottom board may be removed, the bottom board in the meanwhile being supported on the movable bottom 223, Figs. 11 and 14, of the flask. The movable bottom of the flask is in turn supported by two slides 228, secured thereto and sliding in guideways 229, formed on or secured to the flask-frame 172 and constituting the supports for shafts 226, and to each of these slides 228 is pivoted an antifriction-roller or other suitable lug 230, with which engage, respectively, two cams 231, rigidly secured to shaft 226 in such manner that when the shaft is rotated the cams will engage under lugs 230 and raise the bottom 223, with bottom board 219 supported thereon, and as the parts thus rise independently of shaft 226 the tailpieces 225, engaging with said shaft, effect the release of the latches 221, as before described, holding said latches released until the minor parts of cams 231 come under the lugs 230 and permit bottom 222 to descend by gravity, assisted by auxiliary cams $231^\times$ on cams 231 engaging rollers or lugs 230ˣ, to its normal position, where it is held by the cams 231ˣ and rollers 230ˣ on the ends of the slides 228. As better shown in Figs. 10 and 11, the latches 221 and their tailpieces 225 are located between cams 231, and the slides 228 are provided with slots 232, Figs. 9, 10, and 17, through which shaft 226 passes. By this means it will be seen that the mold may be elevated or ejected through the face side of the lower flask, whence it may be removed by hand, but preferably by automatic mechanism, as hereinafter described.

The mechanism for imparting rotary motion to shaft 226 at the proper time for thus ejecting the mold will be described later on with reference to the means for opening and closing the flasks and the means for turning the flasks on their common axis. The means for automatically removing the mold, together with the bottom boards 219, will now be described.

When the mold is raised, together with the bottom board 219, to an elevated position, as shown in Fig. 17, a pair of mold-removing arms 233 (see Figs. 1, 2, 5, and 42) slide longitudinally under the edges of the bottom board 219 and support the said bottom board with the mold thereon when the rollers 230 drop off the edges of cams 231 and permit the bottom 223 of the mold to descend from the position shown in Fig. 17 to the position shown in Fig. 14, said arms 233 being formed of L-shaped angle-bars, the horizontal angle of which projects under the bottom board, while the upright angle of which bar stands at the edge of the bottom to guard against lateral displacement thereof on the arms. As better shown in Fig. 3, these mold-carrying arms are mounted upon a turn-table consisting of a ring 234 and a hub 235, (see Fig. 42,) to which the arms 233 are secured by plates 236, the ring 234 being braced and supported by girders 237, attached to the upper end of said hub 235. The latter is journaled upon a spindle 238, having an antifriction-bearing 239 at its lower end serving for the support of antifriction-balls 240, interposed between said bearing and hub 235, while the upper end of spindle 238 is provided with antifriction-bearings 241 for the sleeve 235. Spindle 238 is supported by a spider 242, which constitutes part of a carriage 243, having wheels or rollers 244, mounted in runways 246, composed of channel-irons, as shown in Fig. 43, extending toward the flask 63, as better shown in Fig. 3, connected and supported at their inner ends upon the cross member 76 of the main frame, while their outer ends are supported by cross member 247, secured on the upper end of a standard 248, thus constituting a horizontal track upon which the carriage 243, together with the mold removing and carrying arms 233, may reciprocate toward and from the flask. The carriage 243 is moved toward the flask for engaging under and receiving the mold upon the arms 233 by means of a revolving crank-arm 249, pivoted at its outer end to a link 250, which in turn is connected to the carriage 243 by an arm 251, depending from the lower side thereof. The crank-arm 249 is of bifurcated form, with the outer ends of the bifurcations converging, as shown in Fig. 3, and their inner ends adjoining two shaft members 252 253, respectively, which are journaled in hangers 254 255, respectively, depending from the guideways 246, (see Figs. 3 and 5,) so that as the crank 249 revolves the link 250 passes between its members without interference. The crank-shaft member 253 is secured to a convolute gear 256, which meshes with a companion convolute gear 257, secured to a shaft 258, journaled in arms 259, projecting from the main frame, and which shaft 258 derives intermittent rotation at the proper time from the mechanism which actuates the flasks, as will be hereinafter described. The effect of these convolute gears 256 257 is to impart to carriage 243 a movement toward the mold, rapid at first and gradually decreasing in speed as the smaller part of gear 257 comes into mesh with the larger part of gear 256. When the crank-arm 249 is moved toward the left and upwardly, as viewed in Fig. 5, from the position shown in said figure to a position on the opposite side of the center diametrically opposite its present position, the arms 233 will be at the limit of their stroke toward the mold and the mold will be effectively supported thereon, the bottom 223 of the flask having in the meanwhile descended. The continued rotation of arm 249 in the same direction instead of causing the arms 233 to return endwise or with a reciprocatory motion causes them to swing outwardly in a lateral direction, while at the same time moving away from the flask bodily lengthwise of the runways 246. In order to accomplish this movement of the arms, one side of the runway 246 is provided with a rack-bar 260, with which continually meshes a gear-wheel 261, loosely journaled on the spindle 238, said spindle being formed with a notched bearing 262 just below and supporting the bearing-cone 239 for the accommodation of gear-wheel 261, so that as the carriage 243 starts back upon its return movement or away from the flask the rack 260 and gear 261 will cause the arms 233 to turn end for end on their pivot 238, the arms being double-ended, as better shown in Fig. 3, so that the ends which support the mold just received will be carried to the outer side or on the right, as viewed in Fig. 3, while the other ends will be brought in position in readiness to be advanced under the next mold when the carriage again moves in a forward direction or toward the flask. In order, however, that the arms 233 may not be rotated on their pivot 238 when moving toward the flask, the connection between the gear-wheel 261 and the arms 233 is made so as to disengage the latter until the carriage starts to return or move away from the flask. This connection, as shown in Figs. 42, 45, consists of a bevel-ended dog 263, having its upper end mounted in a box 264, supported on a cross member 265, secured to the arms 233, the box 264 containing the spring 266, which bears upon a shoulder 267 on dog 263 and bears under a guide-cap 268 in the upper end of box 266, so as to normally tend to force dog 263 down against the plain side of gear-wheel 261, which is provided in line with said dog 263 with two diametrically opposite sockets or perforations 269, into one of which dog 263 drops when it registers therewith, as shown in Fig. 42. The rack 260 being a fixture and gear 261 moving with carriage 243, the gear will be rotated toward the right as the carriage approaches the mold; but in rotating in this direction it slips past the beveled end of dog 263 (see Fig. 45) and permits the carriage to advance without rotating the arms 233 on their pivot 238; but by the time the arms arrive at the limit of their stroke toward the mold the socket 269, which is now in engagement with dog 263, as shown in Fig. 42, will be in the position of the other socket and the latter will be in engagement with dog 263, or, in other words, gear 261 will have made a half-rotation. Consequently when the gear starts to rotate in the opposite direction socket 269 will strike the abrupt side of dog 263 and cause the left-hand ends of arms 233, as viewed in Fig. 3, to swing toward the observer and make a half-rotation by the time the carriage 243 arrives at the limit of its outward travel. In order that the arms 233 may be positively locked against rotation in either direction until they are safely under the bottom board of the mold, as described, the ring 234 of the turntable is provided in diametrically opposite sides with sockets 270 271, one of which at the completion of each half-revolution of the arms 233 is engaged by a locking pin or dog 272, having its lower ends pivoted to a lever 273, which is pivoted at 274 to one of the cross members of carriage 243 and has its other end provided with an antifriction-ball 275, projecting under one of the guideways 246 in position to strike an incline 276, secured to the under side thereof, when the carriage 243 advances sufficiently to bring the mold-removing arms 233 safely under the mold, at which time dog 272 is thereby released from socket 270 to permit the turntable to swing on its pivot 238 with the arms 233. At the completion of the half-rotation of the arms the socket 271 arrives over and receives dog 272, which is automatically forced upward thereinto by spring 277, sleeved on the dog between a shoulder 278 on the dog and the upper side of carriage 243. By this means it will be seen no time is lost in presenting the mold-carrying arms to the mold-support on the ejector after the removed mold has been lifted from the mold-remover.

The effect of the convolute gears 256 257 upon the returning movement of the carriage 243 while the mold is supported upon the arms 233 is to cause said arms to swing from their inner position adjacent to the flask to the extremity of their delivery position with a gradually-decreasing speed, so that the mold may not be jostled or damaged by sudden stoppage. Both movements of the carriage, it will be seen, are produced by a single rotation of the convolute gears, which at the final movement of the carriage relatively operate in such a manner that the minor diameter of the driving-gear 257 comes into mesh with the maximum diameter of the driven gear 256, and when they arrive at this position the driven gear 256 is automatically locked against further rotation, so as to be held in the proper position for engagement with the maximum diameter of the driving-gear 257 at the inception of the forward stroke of the carriage 243, it being understood that gear 257 makes a partial rotation toward gear 256, while the ends of their larger portions are approaching each other without being in mesh or affecting gear 256 in any manner, the rotation of gear 256 commencing only when the shoulder of gear 257 strikes under the shoulder of gear 256, causing arm 249 to move downwardly and to the left from the position shown in Fig. 5. The lock for holding gear 256 against movement toward the left, as shown in Figs. 5, 14, consists of a bevel-ended dog 279, housed in a socket 280, formed in the hangers 255. In Fig. 15 this socket 280 is shown extending along the upper side of the bearing $253^a$, in which shaft member 253 is journaled. The beveled end of the dog is pressed against one side of gear 256 by a spring 281, located in socket 280 and bearing between the shoulder 282 on dog 279 and a guide-cap 283 in the outer end of the socket, so that when a notch 284 in gear 256 reaches the dog the gear will be locked against backward rotation.

With the described means for producing a mold and removing it to a place of safety out of the way of the mold-producing mechanism may be combined, and preferably is combined, means for automatically placing the core or cores in the mold before the flasks come together for placing the cope upon the drag. In Fig. 7 the two mold members 82 83 are shown turned face upward with the pattern-imprints 285 produced therein in readiness to receive the cores, four of which are shown at 286 in said figure, being one for each of the imprints in mold member 82. As soon as the flasks turn face upward in this position the hinged flask 64 at once begins to fold over upon the flask 63, finally placing the cope 83 upon the drag 82 in the position shown in Fig. 11; but before mold member 83 arrives at this position the cores 286 are carried by an oscillating frame 287 over the drag 82 and set in the mold-imprints 285, respectively, and as soon as setter-frame 287 returns to its former position shown in Fig. 7. The core-setter frame 287 in approaching mold member 282 moves rapidly at first in order that no time may be lost in bringing the mold members together; but its speed gradually decreases as it nears the mold member, so that when the cores arrive at the core-prints they will be set in place without jostling or damaging the mold, and as soon as released by the core-holder (which will be presently described) the core-setter frame rises with a gradually-increasing speed, returning to its former position before the mold member 83 crosses its path. This core-setter frame, as shown in Figs. 3 and 7, is provided with arms 288 288$^a$, loosely journaled upon a shaft 289, journaled in bearings 290 291, supported on a member 292, Figs. 49 to 54, of the main frame and the main-frame side member 3, respectively, or in any other suitable way. The arm 288$^a$ is provided with a disk 293, and fitting against this disk and journaled loosely upon the outer end of shaft 289 is a convolute gear 294, which carries a pin 295, adapted to be projected into socket 296, Figs. 48 to 52, in the face of disk 293, and thereby operatively connect gear 294 to core-setter frame 287 in such manner that the core-setter frame may be rendered inactive whenever necessary, it being desirable sometimes to allow a defective mold to be cast out of the machine without wasting the cores, which in that event would be held in the core-setter in readiness for the next mold, the pin 295 being pushed in in time to cause the core-setter to act. The pinion 294 is engaged by a rack-bar 297, formed on the upper side of a reciprocating pitman 298, which is slotted at 299, supported by a pin or roller 300, secured to the side frame 3 and passing through slot 299. (See Fig. 48.) The other end of this pitman is pivoted by wrist-pin 301 to a disk or crank 302, so that at each revolution of the disk or crank the core-setter frame 287 will be thrown from its horizontal position shown in Fig. 48 to a diametrically opposite horizontal position directly over the mold member 82 and returned again to its former position. This crank-disk 302 is journaled loosely upon a short shaft 303 (see Figs. 49 and 50) and is provided with a flange 304, which carries the pivoted pawl 305, adapted to engage the tooth 306 in member 307, keyed rigidly to shaft 303, and constituting, with disk 302 and pawl 305, an intermittent grip mechanism which will actuate the core-setter when the member 307 revolves in one direction only, the pawl 305 being held normally against the periphery of member 307 by a spring 308. The shaft 303 is journaled in bearings 309, formed on a suitable casing 310, which is secured to the side member 3 of the main frame and constitutes a housing for a gear-wheel 311, rigidly secured to shaft 303 and engaging with a rack-bar 312, formed on or secured to one of the side flanges 10 of carriage 9, so that when the carriage moves back and forth it will revolve gear-wheel 311 and member 307 alternately in opposite directions; but the core-setter will be forced over and turned away from the mold member 82 only during the movement of the carriage 9 toward the sand-hoppers.

The core-holders for gripping and carrying the cores are better shown in Figs. 54, 56. As more clearly appears in Fig. 7, however, the core-setter frame is provided with cross-bars 313, and, as shown in Fig. 56, upon these cross-bars are supported as many pairs of gages 314 as there are cores to be set simultaneously. These gages consist of plates secured on the edge to the cross-bars 313, arranged sufficiently close together to constitute a level support for the core 286, holding any of the hanging parts of the core aloof from the bar 313, and preferably engaging with the core-prints only. At the outer side of each of these gage-plates 314 is a clamping-jaw 315, pivoted at 316 to a yoke 317, secured to the under side of cross-bar 313, the cross-bar being provided with apertures 318 for the passage of jaws 315, which project slightly above the gage-plates 314 and engage with opposite sides of the core, the cores being uniformly formed with side notches 319, in which jaws 315 engage to determine the position of the core upon the gages 314. The lower ends of the jaws 315 are provided with tailpieces 320, which are brought together over an incline or cam 321, formed on a sliding bar 322, mounted in suitable guides 323, formed on the lower ends of yoke 317, one of these bars 322 passing under all of the core-holders which may be in line therewith and having one of the inclines or cams 321 for each core-holder. The jaws 315 are pressed normally together or toward the core by means of a spring 324, secured at its upper end to a bracket 325, formed on yoke 317 and pressing at its lower end against a lip 326, formed on one of the tailpieces 320 and overlapping the other, whereby the tailpieces will be forced downwardly or toward the inclines 321 by the spring for closing the jaws together and will be simultaneously forced upwardly by the incline when pulled in the proper direction for forcing the jaws apart and releasing the core. As shown in Fig. 7, each one of these bars 322, with the inclines 321 thereon, is employed for each row of cores, two being shown, and these two bars 322 are rigidly secured together by a cross member 327, which compels the bars to move in unison. One of the bars is pivoted to the end of a link 328, whose other end is secured to the free or outer end of a crank-arm 329, which is rigidly secured to the shaft 289. The shaft 289, although rotatable independently of arm 288 of the core-setter frame, is attached to said frame by means of a coil-spring 330, one end of which is secured to a collar 331, attached to shaft 289, so that the spring will tend to hold the shaft in a certain position with relation to the core-setter frame and in such position that the inclines 321 will be normally out of engagement with the tail-pieces 320 of the core-gripping jaws 315. When the core-setter frame 287 is inverted over the mold member 82 in the manner shown in Fig. 55, the cores are automatically released from the jaws 315 by a pull imparted to link 328 by a crank-arm 329. This pull is produced at the proper time by a cam 332, Fig. 49, formed on the periphery of crank-disk 302, striking against a bevel end 333 on one end of a sliding rod 334, whose other end carries a knocker 335, which engages a finger 336, rigidly secured to shaft 289, thus rocking the shaft in the proper direction for releasing the cores. As soon as the cores are released the core-setter starts on its return movement; but the core-gripping jaws 315 are prevented from again taking hold of the cores in the mold by a catch 337, pivoted to a hub 338 on the arm 288$^a$ and adapted to engage with a notched hub 339, formed on or secured to finger 336 when said finger is pushed toward the right (see Fig. 50) by finger 335. As the core-setter returns to its former position, with the core-holders facing upward, as shown in Fig. 49, the hub 338, with catch 337, rotates or turns with it into the position shown in Fig. 49, the catch retaining possession of the notched hub 339 and holding jaws 315 open, so that the cores may lie in place in the core-holders, and after which all of the jaws 315 may be simultaneously caused to grip their respective cores by releasing catch 337 and permitting spring 330 to rotate shaft 289 relatively to the core-setter frame 287, and thereby pull inclines 321 away from tail-pieces 320. To this end catch 337 is provided with a hand-trigger 340. In order that the crank-disk 302 may be centered at the end of each revolution and prevented from turning too far, so as to get cam 332 out of time, the periphery of the disk may be provided with a centering-notch 341, which will check rotation of the disk when it reaches the beveled end 333 of rod 334, but will slip past the latter when the disk is rotated by pinion 311 and rack 312. The latter is supported in suitable keepers 342 on member 3 and is pressed normally toward disk 302 by spring 343 bearing against one of the keepers and a shoulder 344 on the rod.

In order that the gear-wheel 311 may not turn member 307, which carries the pawl 305, too far and get it out of time with the notched disk 302, the gear is provided with a flat part 345, (see Fig. 53,) which is engaged by a plain-faced bar 346 at one end of the rack-bar 312 when the carriage 9 moves toward the left and by plain-faced bar 347, Fig. 23, arranged at the other end of rack-bar 312, when carriage 9 moves toward the right, rack-bar 312 being only sufficient in length to impart one rotation to gear 311 and the parts being so timed that the pawl 305 will drop into engagement with the tooth of disk 302 at the completion of the backward travel of the pawl.

The means for inverting the flasks upon their common axis 173 174 preparatory to receiving the sand, which is forced upwardly thereinto from the charger-boxes 24 25 below, as before described, then turning the flasks face upward, with the mold members produced therein, and finally causing the hinged flask to place the cope upon the drag and return to its former position in the flask-frame, will now be described, particularly with reference to Figs. 2, 3, 7 to 19, and 58 to 75. As better shown in Fig. 9 the trunnion 174 of the flask-frame has a reduced end 174$^a$, which projects through and is rigidly secured to a disk 348, which latter is thus made to constitute a part of the flask-frame, and on the inner face of this disk is formed a horizontal box or socket 349, in which is located a double-acting bolt 350, having two heads 351 352 adapted to be alternately projected into engagement first with socket 353, formed at one end of a rigid arch 354, secured to the main frame of the machine, (see Fig. 57,) and next into engagement with a socket 355, (see Fig. 60,) formed in the inner face of disk 356, which is journaled loosely upon the trunnion end 174$^a$ and is provided with a toothed rim 357, whereby it is constituted a worm-wheel engaging with a worm 358, driven alternately in opposite directions by means which will be presently described, whereby the bolt-head 352 when in engagement with the socket 355 will effect the rotation of the flask-frame upon its trunnions 173 174. When the bolt-head 351 is in engagement with socket 353, as shown in Fig. 57, the flask-frame is thereby locked in its inverted position, as shown in Fig. 9, and is held in such locked position until the flask-charging devices have pressed sand into the flasks, as shown in Fig. 10, and withdrawn to a position of safety within the charger-boxes 24 25. As the bolt 350 is carried with the gear 356 357 it shoots into second socket 359, formed at the opposite side of rigid arch 354, (see Fig. 57,) when the bolt-head 351 comes opposite said socket 359, and thereby locks the flask-frame in its upright or upwardly-facing position, as shown in Figs. 7 and 11. Any suitable mechanism may be provided for thus causing the bolt to alternately shift in opposite directions and engage first the sockets in the arch 354 and then the socket in the disk for gear 356; but such means preferably consists of a spring 360, which is coiled on the bolt 350 and has one end attached thereto in any suitable manner, as by means of screw-threads 361, while the other end of such spring is secured by the screw-threads 362 or other means to a sleeve 363, which surrounds the spring and slides in socket or box 349. One side of this sleeve is formed with a rack-bar 364 in line with slot 365 in the side of box 349 and with which rack-bar engages a pinion 366, pivoted at 367 to the box 349 or to another part affixed to the disk 348, and with the other side of pinion 366 engages a rack-bar 368, formed in a depression 369 in one side of a slide 370, (see Figs. 63, 64, 65,) which is cylindrical in cross-section, as shown in Fig. 64, with beveled ends 370ª and located in a socket 371, formed along the inner side of socket 349. By the means described it will be seen that when the slide 370 is pushed toward the right, as shown in Fig. 60, it moves sleeve 363 toward the left, compressing the spring and giving bolt-head 351 a tendency to shoot toward the left when not restrained. Until said bolt-head arrives at a position opposite one of the sockets 353 359 it is restrained by the plain inner face of the rigid arch 354, as shown at 360, and slides along said face with the movement of disk 348 and worm 357 until one of said sockets is arrived at, whereupon it instantly shoots thereinto and locks the flask-frame against further movement, it being understood that in shooting the head 351 into one of sockets 353 359 the other head, 352, withdraws from socket 355 and releases worm-wheel 356 357, permitting it to continue its rotation for other purposes described farther on. It will also be seen that when the slide 370 is pushed toward the left, as shown in Fig. 57, it will expand spring 360 and give bolt-head 352 a tendency to shoot into socket 355 when the two coincide, the bolt-head 352 being at other times restrained against such movement by pressing against the plain face of disk 356, which constitutes the web of worm-wheel 357, as shown in Fig. 57. The spring 360 is thus cocked, as it were, to shoot the bolt 4 out of socket 353 or 359 into socket 355, and vice versa, as soon as that one of its heads 351 352 not in engagement with one of the sockets comes opposite the plain face of either the arch 354 or the disk 356, so that when the bolt does arrive opposite the socket into which it must engage it will be in readiness to shoot thereinto and leave the socket with which it previously engaged. This assisting of the slide 370 for thus cocking the spring alternately in opposite directions is effected in one direction by a double bevel or incline 372, formed on the inner face of the arch 354. As better shown in Fig. 61, this incline is arranged at the top of the arch in line with the beveled end 378 of slide 370, so that when the slide arrives at the incline 372 in moving in either direction it will shift the slide toward disk 356 and cock the spring for moving the bolt 350 toward the left, causing it to engage one of the sockets 353 359.

The slide 370 is shifted in the opposite direction by an incline or double bevel 373, formed in concentric groove 374 in face of the disk 356, into which the right-hand beveled end of the slide 370 engages and which end of the slide is engaged by the incline 373 when passing the slide in either direction, thus shifting the slide toward the left or toward the arch 354 and cocking the spring 360 to shoot bolt-head 352 toward the right into socket 355 when the latter coincides with it. In order that the slide 370 may be held in the position into which it is forced alternately by the inclines 372 373 until it is necessary to shift it in the opposite direction, the side of slide 370 opposite rack-bar 368 is provided with a pair of notches 374ª 375, into the latter of which engages a lock or latch 376 when the slide 370 is shifted toward the arch 354, said latch 376 engaging notch 374ª when the slide is shifted in the opposite direction. In order that this latch may be automatically released from the slide as soon as the end of the slide is engaged by one of the inclines 372 373, the slide is provided with an independently-movable member 377, located in slot 378 (see Fig. 65) in slide 370 and having a double-ended incline or cam 379 arranged normally between notches 374ª 375 and adapted when pushed toward disk 356 to depress or deflect latch 376 out of engagement with notch 374ª, and thus permit incline 372 to shift the slide 370 into the groove 374 of disk 356, it being understood that the ends of member 377 protrude slightly from the ends of slide 370, so that the incline 372 acts on member 377 before it acts on slide 370. When the slide is thus shifted by incline 372, latch 376 automatically drops into engagement with notch 375, and when cam or incline 373 on disk 356 arrives opposite slide 370 the incline first engages the protruding end of member 377 at that side, and by shifting it toward the left forces latch 376 out of engagement with notch 375, thereby releasing slide 370, permitting it to be shifted in the same direction by cam or incline 373 as soon as the latter touches it. The member 377 is cut away on one side, as shown in Fig. 62, so as not to interfere with pinion 366, and it may be provided in its ends with slots 380, in which engage cross-pins 381 in slide 370 for holding member 377 in position while permitting of the requisite independent movement. The latch 376, as shown in Figs. 58, 59, and 71, is pivoted on a stud 382, carried by disk 348, and is normally pressed upward by a spring 383, the inner side of box 371 having a slot 384, Fig. 59, through which latch 376 enters.

It will now be understood that by means of the tension-reversing mechanism, comprising in the main the shiftable rack-bar 368, pinion 366, and sleeve 363, the tension may be so placed on the spring 360 as to cause the bolt 350 to shoot in either direction, so that when pressing against the plain face of the arch 354 it would shoot into one of the sockets or stops 353 359, and thereby hold the flask-frame in a level or horizontal position, stop or socket 353 serving to hold it in its inverted position and the other, 359, serving to hold it in its facing-upward position. When the flask-frame is in its inverted position, with the flasks presented downwardly for receiving the sand from the charger-boxes when the latter coincide therewith, the worm-gear 356 357 is in the position illustrated in Figs. 57, 75, bolt-head 351 being at that time in socket or stop 353, and the other bolt-head, 352, being pressed by the spring into firm engagement with the plain face of gear-disk 356, as shown in Fig. 57, while the socket 355 in the gear-disk 356 is slightly below bolt-head 352, as shown in Figs. 70 and 75, the gear-wheel 356 357 being at that time at the limit of its rotation toward the right as viewed in Fig. 75 and toward the left as viewed in Fig. 70, and consequently its next movement will carry socket 355 upwardly into coincidence with the bolt-head 352, which immediately shoots into socket 355, releasing head 351 from stop-socket 353 and permitting worm-gear 356 357 to turn the flask-frame over into an upwardly-facing position, as shown in Fig. 7, the frame during such movement making one-half turn, and as the slide 370 passes incline 372 on arch 354 the tension of spring 360 is reversed, causing bolt-head 351 to strain toward arch 354, and consequently as soon as it reaches stop-socket 359 it shoots into the latter socket, leaving socket 355, and locks the flask-frame in the position shown in Fig. 7, worm-gear 356 357 being thereby permitted to continue its rotation in the same direction independently of disk 348, which is secured to and constitutes a part of the flask-frame. This independent further rotation of worm-gear 356 357 is utilized for causing the hinged flask 64 to fold over flask 63, and thus place the cope upon the drag; to return the hinged flask to its former position within its socket in the flask-frame; to eject the mold from the bottom flask in the manner shown in Fig. 17, as before described, and to finally advance the mold-remover under the elevated mold and carry the same to a place of safety, as also previously described. For these purposes the worm-gear 356 357 has secured to it or formed thereon a gear-wheel 385, which meshes with a pinion 386, secured to the outer end of a shaft 387, journaled in boxes or bearings 388 389, secured to or formed on the flask-frame 172, (see Figs. 7, 30,) and consequently adapted to revolve bodily with the gear-wheel 385 and worm-gear 357 when the flask-frame is locked to the worm-gear, as before described, and when said flask-frame is held independently of the worm-gear the pinion 386 will be given independent rotation upon its own axis for revolving shaft 387.

The inner end of shaft 387 is secured to a worm 390, which meshes with a worm-wheel 391 on the cross-shaft 179, to which the hinged members of the hinged flask 64 are secured, as heretofore described. Thus it will be seen that by properly proportioning gear-wheel 385 and pinion 386 the rotation of worm-gear 357, which occurs after the flask-frame is turned face upward and held by bolt-head 351 in stop-socket 359, may be utilized for turning the hinged flask 64 over upon fixed flask 63 in the manner shown in Fig. 11, and then by rotating worm-gear 357 in the opposite direction said hinged flask may be returned to its former position in the flask-socket 177. This relative proportion of gear 385 and pinion 386 is such that by the time the flasks come together in the manner shown in Fig. 11 gear 385 will have made a little less than a complete revolution from socket 359 or, in other words, about one and one-half revolutions from the position shown in Fig. 70 toward the right, as viewed in that figure, or toward the left, as viewed in Figs. 61, 75, so that after bolt-head 351 shoots into stop-socket 359 for holding the flask-frame in its upwardly-facing position the socket 355 in the gear-disk 356 will not again pass bolt 356 while turning in that direction; but nevertheless disk 356 will have rotated sufficiently far to cause one end of the cam or double incline 373 to pass to the end of slide 370 and shift the latter toward the arch 354, so as to cock the spring 360, and thus strain bolt 350 toward and against the plain face of disk 356, whereby the bolt will instantly shoot into socket 355 in disk 356 as soon as said socket coincides with the bolt-head 352 during the backward or reverse rotation of worm-gear 356 357 and in this way enable the worm-gear to pick up the flask-frame and turn it into inverted position, as shown in Fig. 9, the instant it is released from the fixed arch 354 by the bolt 350 shooting out of the stop-socket 359 into worm-gear socket 355, as just described, the tension of spring being again reversed as soon as slide 370 passes double incline 372 on the top of arch 354, so that when bolt-head 351 comes opposite stop-socket 353 at the farther end of the arch the bolt will shoot out of worm-gear socket 355 and lock the flask-frame in its inverted position by simultaneously shooting into stop-socket 353 in the arch. This return or reverse motion of the worm-gear carrying gear-wheel 385 with it (and by "return motion" I mean rotation toward the right as viewed in Figs. 61, 75, or toward the left as viewed in Fig. 70) is utilized for causing the flask 64 to return from its position over flask 63 to its former position in its socket 177 in the flask. In the operation of the parts for accomplishing this movement it will be seen that after the worm-gear 357 has made a turn and a half from the position shown in Fig. 70 toward the right, turning the flask-frame over into an upwardly-facing position and closing the hinged flask over upon the fixed flask during such rotation and finally coming to rest with the worm-gear socket 355 just above bolt-head 352, as before described, the pinion 386 will remain in a relatively fixed position while gear-wheel 385 is turning from said extremity of its rotation back to the position where socket 355 coincides with and picks up bolt 350 for inverting the flask-frame, and this independent rotation of gear 385 against pinion 386 is of sufficient duration to return flask 64 from its position over flask 63 to its former position in flask-socket 177, where it is automatically locked in place by the catch or dog 189, before described.

The worm 358 is rocked alternately in opposite directions, as before described, for imparting the slight movements to worm-gear 357 by means of an intermittent clutch mechanism (better shown in Fig. 38) comprising two members 392 393, the former of which is secured to the shaft 394 of worm 358, and the latter of which is secured to a counter-shaft 395, driven in unison on the shaft 105 by means of belt 396, running over pulley 397, Fig. 3, on shaft 395 and driving pulley 149, secured rigidly to shaft 105, the pulleys 397 149 being preferably provided with teeth and the belt with perforations in a well-known manner for preventing slipping, so that shaft 395 cannot by any possibility get out of time with shaft 105. Clutch members 392 393 are thrown into and out of action by means which will be presently described, whereby the gear-wheel 385 and worm-gear disk 356 will be given sufficient rotation in opposite directions alternately for turning the flask's face upward, folding them together, returning the hinged flask to its normal position, and then inverting the flask-frame, as before explained. In order, however, that worm-gear 357 may not be carried too far after the flask-frame is locked in its inverted position either by the momentum of clutch member 392 or by the tardiness of the disengagement of the clutch members, it is desirable to lock the worm-gear with reference to the flask-frame. This may be accomplished by providing the disk 348 of the flask-frame with a stop-pin 399, Figs. 59 to 59$^b$ and 61, located in suitable housing or disk 400, secured to the back of disk 348 and containing a spring 401, which normally presses stop-pin 399 toward the face of disk 356, which is provided at the proper point for arresting the worm-gear at the position just referred to with a socket 402, (see Fig. 74,) into which stop-pin 399 shoots when worm-gear disk 356 arrives at the position shown in Figs. 2, 70, and 75, thus locking the disk 356 against further rotation in the same direction and compelling clutch members to separate should they be stuck, and in any event preventing further rotation of worm 358. One side of stop-pin 399 is beveled, as shown in Fig. 60, so that when the worm-gear 357 begins to turn in the opposite direction to that just described the edge of socket 402 will automatically push the stop-pin out of engagement, as shown in Fig. 60; but in order that it may not drop into engagement with socket 402 when the latter again passes the pin in turning in the same direction (it being understood that worm-disk 356 makes a revolution and a half in each direction) the end of stop-pin 399 is provided with a head or flange 403, which as soon as or shortly before worm-gear 357 is released from the flask-frame when turning the flask-frame from its inverted to its upwardly-facing position engages with a fork 404, secured to member 4 of the main frame, (see Figs. 60, 61, and 70,) thus holding the stop-pin 399 from dropping back into engagement with socket 402 as the latter passes it while gear 385 is making the necessary movement for closing the hinged flask over the fixed flask. At the completion of said movement gear 385, with worm-gear disk 356, turns in the opposite direction, as before described, socket 355 in said disk picks up bolt 350, as it coincides with it, and thereby carrying disk 348, with its stop-pin 399, in the same direction and disengaging head 403 of said stop-pin from the retaining-fork 404, placing said stop 399 in readiness to shoot into socket 402 as soon as the latter coincides with the pin after bolt 350 has left socket 355 and locked the flask-frame in its inverted position, as before described.

In order that gear-wheel 385 may turn independently of pinion 386 after the flask-frame has been inverted, so as to carry the socket 355 below bolt-head 352 and permit incline 373 to reverse the tension of spring 360 for causing bolt-head 352 to shoot into socket 355 the instant the latter rises into coincidence therewith, as before described, gear 385 is mutilated, as shown at 385$^a$, Fig. 70, and consequently turns without turning gear-pinion 386 at that time, pinion 386 being provided on one side with a plain shoe 386$^a$, as usual, for engaging mutilated surface 385$^a$ and holding pinion 386 against accidental rotation.

After hinged flask 64 has been folded over on fixed flask 63 and has risen a sufficient distance therefrom to clear the upper mold member the mold-ejector, comprising movable bottom member 222, (see Fig. 17,) begins to rise, as before described, for elevating the mold into the position shown in that figure, the action taking place while hinged flask is returning to its place in the flask-frame, so as to save time, and the ejector is thus operated by gear-wheel 385 during this movement, while pinion 386 is held against bodily revolution therewith. To this end shaft 179 is provided with a sprocket-wheel 405, Figs. 4 and 19, which is connected by chain 406 to sprocket 407 on shaft 226, sprocket 405 being firmly secured to shaft 179, while sprocket 407 is loose on shaft 226; but an intermittent clutch mechanism is provided whereby the rotation of sprocket 407 will be imparted to shaft 226 after hinged flask 64 has risen a sufficient distance from the upper mold member to make it safe to begin to eject the mold from the lower flask. As shown in Figs. 19 and 20, this intermittent clutch mechanism consists of a member 408, secured rigidly to shaft 226, provided with socket 409, arranged in the circular line of travel of a dog or locking-pin 410, carried in a box or housing 411, secured to the loose sprocket 407, which latter is arranged flat upon the face of disk member 408. In box 411 is located spring 412, which strains dog 410 continually toward socket 409, and dog 410 is provided with a beveled end 413, so that when the sprocket 407 is turning in one direction dog 410 will slip past socket 409 without rotating shaft 226. During this direction of rotation the flask 64 is being folded over the other flask. During the opposite direction of rotation, however, dog 410 will automatically drop into socket 409 and impart a sufficient degree of rotation to shaft 226 to cause cams 231 to lift ejector 222 into the position shown in Fig. 17 and release the bottom board 219 by forcing the upper ends of latches 221 together. In order, however, that the rotation of shaft 226 may not begin until flask 64 has cleared the upper mold member, the parts are proportioned and timed so that the sprocket 407 would turn a considerable distance past sprocket 409 while revolving in the inactive direction, and consequently shaft 226 will remain inactive during a considerable portion of the rotation of sprocket 407 when the latter turns in the reverse direction for causing dog 410 to engage with socket 409.

The motion is imparted to the shaft 258 for actuating the mold-remover arms 233, as before described, from a sprocket-wheel 414, Figs. 2, 3, and 4, secured on the hub 415, Figs. 10 and 11, of the worm-gear disk 356 by means of a sleeve 416, held in place by a washer 417 and pin 418, passing through trunnion 174ª, or by any other suitable means which would permit the sprocket 414 to revolve independently of said trunnion and also of hub 415, sprocket 414 being connected to a sprocket 419 on shaft 258 by a belt or chain 420. To one side of sprocket 414 is secured a ratchet-wheel 421, Figs. 7, 9, and 61, which is provided with only two teeth 422 423, as better shown in Fig. 76, adapted to be engaged by a pawl 424, secured to the outer face of worm-gear disk 356 and held in place by suitable spring 425, so that when worm-gear disk 356 revolves in one direction it will impart motion to sprocket 414 and drive the convolute gear 257 toward the left as viewed in Figs. 5, 17 as long as worm-gear disk 356 continues to revolve in that direction, and when it revolves in the opposite direction the mold-remover will of course remain inactive with the parts in the position shown in Fig. 5. The parts are so timed and proportioned in this particular example of the invention that it requires about one and one-half revolutions of the sprocket 414 to advance the mold-remover carriage 243 toward the mold and return it to its former position with the mold supported on the ends of the arms 233, and the latter revolve end for end, as described, and for this reason the ratchet-wheel 421 is provided with the second notch 423, diametrically opposite the notch or tooth 422, so that at the completion of the turn and half the pawl 424 will inevitably be in position to engage with one of said teeth. The pawl 424, however, in making its backward rotation ceases at a point a little beyond one of the notches 422 423, so that it will make a slight forward movement before imparting any motion to the sprocket-wheel 414, it being seen that if there should be but one of the notches or teeth 422 423 in the ratchet 421 the pawl 424 would be compelled to make a half-revolution before rotating the ratchet 421, according to the time and relative dimensions of the parts.

The clutch members 393 393 are operatively related to the main screw 62 in such a manner that the operation of the screw will effect the disengagement of such clutch members shortly after the flasks have been inverted into a position for receiving the sand from the charger-boxes 24 25 as soon as the latter coincide therewith. This operative relation between the screw and the clutch member may be established by the mechanism shown in Figs. 38 to 41, from which it will be seen that the shaft 395 is connected by collar 426, having pins 427, to slotted arm 428 of a bell-crank lever pivoted to a suitably fixed support 429 and having its other arm 430 provided with antifriction-rollers 431, adapted to be struck by some part moving in unison with carriage 9. As shown in Fig. 38 in plan view and in Fig. 10 in end view, the side of the carriage is provided with a supporting-bracket 432, whose outer edge 432ª constitutes a deflector-bar, which when the carriage 9 advances toward the flask to a certain position comes into engagement with antifriction-roller 431 and throws clutch member 393 out of engagement with member 392, collar 226 being rotatably secured to shaft 395, but held against independent longitudinal movement thereon. When bell-crank arm 430 is released from deflector-bar 432, clutch member 393 is instantly thrown back into engagement by means of spring 433, sleeved on shaft 395 and bearing between collar 426 and the shaft-bearing box 434. The deflector-bar 432ª is of sufficient length to throw clutch member 393 out of engagement when the flask-frame has been turned into its inverted position and hold it out of engagement, so that the worm-gear 355 and gear-wheel 385, carried thereby, will remain inactive until the charger-boxes have advanced to a position coincident with the flasks, and the independent motion of sleeve 65, as above described, has oscillated segment 60 first to the right, as shown in Fig. 12, for forcing sand out of the charger-boxes into the flasks, and then to the left for drawing the patterns and lowering the stripper-plates back into the charger-boxes, and the reëngagement of dog 69 71 with notch 72 in the sleeve has effected the return movement of the carriage 9 a sufficient distance to make it safe to turn the flask-frame face upward again without striking any part of the carriage. During these movements the antifriction-roller 431 rests in engagement with the deflector-bar 432ª, and the clutch member 393 does not reengage its companion member for turning the flasks face upward until the carriage has moved toward the right, as in Fig. 38, sufficiently apart to permit said roller to drop off the left-hand end of the deflector-bar.

It has been found to be very difficult to cause the friction clutch members 392 393 to instantly engage and disengage in such a way that when disengaging the driven member 392 will cease rotation at the desired instant, so that the worm-gear with its mutilated gear 385 will get out of time when turned toward the right, as viewed in Fig. 2, with pinion 386 and will take up the rotation of the driving member 393 with the maximum speed of the latter at the instant it is desired to begin the rotation of said worm-gear and mutilating gear toward the left, as viewed in Fig. 2, when turning the flasks from their inverted to their upwardly-facing position or toward the right, as viewed in said figure, when opening the flasks and ejecting the mold, as before described, and it is therefore desirable to provide means whereby the clutch members 392 393 will be engaged at a point in the line of movement of the carriage 9 a little in advance of the point at which they disengage, so as to allow for slippage of the clutch members and permit the driven member to get under way or take up the full speed of rotation of the driving member before gear 385 begins to actuate the flask-frame when turning toward the left, as viewed in Fig. 2, or begins to open the flasks, eject the mold, and operate mold-remover when turning toward the right, as viewed in said figure. In other words, the clutch members disengage when the carriage 9 reaches a certain point moving toward the flasks, and they reëngage at a point a little in advance of said first point when moving away from the flasks. This is accomplished by means of a deflectable end on the deflector-bar 432ª in the form of a pivoted member 435, Figs. 38 to 41, secured on a pivot-pin 436, driven into the end of a deflector-bar 432ª and arranged in line with the antifriction-roller 431, so as to strike the latter as the carriage 9 moves back and forth. When the deflectable member 435 is not otherwise restrained, it will be pushed inwardly by lever-arm 430, and consequently lever-arm will not be oscillated, substantially, until it strikes bar 432ª proper, or that part of member 435 which is incapable of moving inwardly away from the roller; but when rendered rigid this member 436 will push roller 431 outwardly and disengage the clutch members. Arranged between bracket 432 and deflector-bar 432ª is a shift-rod 437, Figs. 38 to 41, which is adapted to be projected along the inner side of member 435 and prevent said member from being deflected inwardly as carriage 9 moves toward the flask or to the left, as shown in Fig. 38; but before the carriage completes this movement in that direction a lug 438 on shift-rod 437, carrying an adjustable bumper 439, comes into engagement with the hub of bell-crank 428 430 and shifts rod 437 to the right, as shown in Fig. 38, leaving member 435 free to be deflected inwardly when the carriage returns and said member is pressed by the roller 431. Before the carriage completes its movement toward the right bumper 439 strikes a stop 440 on frame member 4 and shifts bar 437 back again into the position shown in Fig. 38 for rendering member 435 rigid. Hence it will be seen that as the carriage 9 moves toward the flasks clutch members 392 393 will be disengaged when member 435 strikes roller 431; but when the carriage returns the clutch members will be forced into reëngagement as soon as roller 431 is passed by the pivotal point of member 435. Clutch member 393 being in continuous rotation at the time it will gradually impart its movement to member 392. The mutilated surface 385ª of gear 385 will be passing pinion 386 while the inertia of clutch member 392 and parts connected therewith is being overcome by clutch member 393, and it is estimated that by the time it is fully overcome the teeth of gear 385 will have engaged the teeth of pinion 386. When the gear turns toward the right, as viewed in Fig. 2, independently of bodily movement of pinion 386, and when such inertia is being overcome during the rotation of gear 385 toward the left from the position shown in Fig. 2 to the position where socket 355 in worm-gear disk 356 coincides with bolt-head 351, the mutilated surface 385ª of gear 385 will be passing pinion 386 without affecting either it or the position of the flask-frame.

The independently-deflectable end member 435 of the deflector-bar 432ª may, if desired, be provided with a pin 441, sticking downwardly into a grooved slot 442 in bracket 432, for limiting both the inward and downward movement of member 435. Shifter-bar 437 may be limited in its shifting movement by an offset 443, formed therein and engaging in a recess 444 of greater length in the inner side of deflector-bar 432ᵃ. Shifter 437 is held down in place by straps 445.

With a molding-machine thus constructed it will be seen that the mold is made complete, starting with the sand in bulk and finishing with the mold members properly faced together with a core or cores therein ready for the metal, all by the aid of machinery. The sand may be placed in the hoppers 1 2 in any suitable manner, and the machine then set in motion by shifting the controller-lever 137 from the central position to the right or to the left, accordingly as it may be necessary to bring the charger-carriage 9, with its connected parts, from the flasks through the hoppers or from the hoppers to the flasks. When the charger-boxes 24 25 arrive into a position where they are about to register with the hoppers, the hopper-valves 5 6 are automatically pushed open by the table 8 of the carriage, as before described, and the sand descends thereinto while the charger-boxes are moving to the position shown in Fig. 5ᵃ, at which place they will be sufficiently filled with sand resting directly upon the patterns and the stripper-plates, and at this stage the end of sleeve 65 strikes against collar 119 and reverses the motion of screw 62 by the means before described with reference to Fig. 77, causing said screw to immediately return the carriage to a position where the charger-boxes register with the flasks 63 64, which have been previously inverted by the worm-gear 357 and bolt 350 to await the coming of the new charges of sand and are left in this inverted position, clutch member 393 being then held out of engagement with its companion member by the deflector-bar 432ᵃ on the side of the carriage 9. When the charger-boxes reach the registering position with the flasks, the dog 69 71 is disengaged from notch 72 in sleeve 65 and simultaneously locks the carriage to the main frame-block 79, so that the carriage cannot then move in either direction, but the sleeve 65 continues on its way, as shown in Fig. 12, for rocking the segment 60 toward the right and effecting first the upward movement of the patterns and stripper-plates, forcing sand out of the charger-boxes into the flasks, and when that is done finally reversing the rotation of screw 62 by striking against the head 135, which oscillates lever 129 (see Fig. 7) and shifts the rod 127, which imparts the necessary reversing motion to clutch member 114, whereupon sleeve 65 at once begins to recede into its bearings 66 in carriage 9 for rocking segment 60 in the opposite direction, and thereby first drawing the patterns and then raising weight 84 and withdrawing the stripper-plates, as before described, and this receding independent motion of sleeve 65 continues until notch 72 therein again arrives under dog-pin 71, which instantly drops into said notch and locks the carriage 9 to the sleeve, while simultaneously unlocking the carriage from the main frame, causing the carriage to begin its course back to the hoppers. As shown in Figs. 9 and 12, the upper side of the carriage just above hangers 49 and 50 is recessed or depressed, as indicated at 9ᵃ, to accommodate shaft 179 and the parts connected therewith and permit the flask-frame to be brought down close to the top of the carriage, so that the flanges 10 of the carriage may slide in close contact with the faces of the retaining-strips. When the roller 431 is released by the deflector-bar 432ᵃ, the clutch members 392 393 reëngage and the worm-gear 356 357 begins its rotation toward the left, as viewed in Fig. 2, carrying its socket 355 into engagement with bolt 350 and during the next half-rotation in the same direction turns the flask-frame with the flasks into an upwardly-facing position, whereupon the bolt shoots out of socket 355 and into socket 359 of the ratchet 354, thus locking flask-frame in a horizontal position while gear 357 continues on its rotation for one nearly whole turn farther and during this turn operates pinion 386 for closing the flasks together, the core-setter in the meanwhile having been actuated by the return motion of the charger-carriage toward the hopper to set the cores and return to its normal position and the retaining-strips being released from their respective mold members by the carriage forcing trip 215 into engagement with arm 216, as before described, (see Fig. 46,) as soon as mold members are placed face to face. This being done, sleeve 65 or, more accurately speaking, nut 67 thereon, strikes collar 119 and again reverses the screw 62, starting carriage 9 back toward the flask and simultaneously reversing shaft 395 and its clutch members 393, which latter remains in firm engagement with its companion member 392 until disengaged by deflector-bar 432ᵃ, and consequently gear 385 at once begins rotation toward the right, as viewed in Fig. 2, for separating the flask 64 from the flask 63 and at the same time or shortly after raising the mold-ejector and advancing the mold-remover toward the flask for receiving and delivering the mold.

This machine is designed to be used in connection with some suitable mechanism for lifting a mold from the end of mold-receiving arms 233, and in order that the mold may be elevated from said arms, so as to render it accessible and enable any lifting mechanism, whatever it might be, to be placed under the bottom board of the mold the device shown in Fig. 81 as a modification may be employed in connection with the machine. This consists of a pedestal 446, mounted on a vertical sliding standard 447, which is capable of being elevated by a bell-crank 448 directly under the bottom board of the mold, as the latter rests upon the arms 233, one arm of said bell-crank constituting one arm of a toggle and is connected to a push-rod 450, arranged to be struck by carriage 9 when the latter arrives at or about the limit of its stroke toward the hoppers, thus elevating pedestal 446, with the mold thereon, and holding it in said elevated position sufficient length of time for the mold to be removed. The pedestal is allowed to descend by gravity when the toggle-center 451 is deflected. This may be accomplished by connecting it with one end of a cable 452, whose other end is attached to the joint of arm 249 and pitman 250, so that as the mold-remover carriage travels forward the pedestal will be lowered. Center 451 is connected to standard 447 by toggle-link 453.

Owing to the magnitude of the mechanism in this machine and the necessary length of the specification and claims, it has been considered expedient to avoid the use of synonyms and alternative forms of expression for describing the particular example of the invention shown; but it will nevertheless be understood that the invention is not limited to the construction shown, although the same has been fully and particularly described in detail, and it will also be understood that the term "sand" is used herein as a generic expression meaning any material of which a mold might be formed; the term "core" as a generic expression meaning a core or chill or any other object to be set in a mold or mold member; the term "mold" as a generic expression meaning "mold" or a "part of a mold," or what has been herein termed "mold member," wherever the mechanism specified with such expression does not necessitate the presence of a plurality of mold members; the expression "flask" as a generic term meaning any member in which the mold is formed; the expression "charger-box" as any receptacle for carrying a charge of sand to the flask. The claims interpreted in the light of this understanding define the scope of the invention.

Having thus described my invention, what I claim as new therein, and desire to secure by Letters Patent, is—

1. In a molding-machine, the combination of two relatively movable flasks, means for forcing the sand into said flasks while open or separated, and means operatively connected to the sand-forcing means for bringing the flasks together face to face, substantially as set forth.

2. In a molding-machine, the combination of two flasks operatively connected together and adapted to face in the same, and also in opposite directions, mechanism for depositing the sand in said flasks while turned away from each other, and means for opening the flasks operatively connected with said sand-depositing means, substantially as set forth.

3. In a molding-machine, the combination of two operatively-connected flasks, adapted to face in the same direction, means for simultaneously depositing the sand in said flasks while facing in the same direction, and means connected with the flasks for bringing them together face to face, substantially as set forth.

4. In a molding-machine the combination of two flasks movable one over the other, shiftable means for retaining the mold in the upper flask, means for forcing the sand into said flasks while apart, means for thereafter bringing said flasks together face to face and then separating them and means operatively connected with the said means for bringing the flasks together, for shifting said retaining means after the cope has been deposited upon the drag, substantially as set forth.

5. In a molding-machine the combination of two invertible flasks adapted to be brought together face to face, means for inverting said flasks, and means for depositing the sand in said flasks, operatively timed with the flask-inverting means, substantially as set forth.

6. In a molding-machine, the combination of two invertible flasks, means for depositing the sand in said flasks and means for bringing the flasks together face to face, operatively timed with the sand-depositing means, substantially as set forth.

7. In a molding-machine the combination of two flasks, two chargers movable into register with said flasks respectively, means for inverting said flasks, and means for forcing sand from said chargers respectively into said flasks, said flasks being movable toward and from each other face to face, substantially as set forth.

8. In a molding-machine the combination of two flasks having a common axis on which they are invertible and one of which is hinged and movable with relation to the other on an independent axis and means for depositing sand in said flasks, substantially as set forth.

9. In a molding-machine the combination of two flasks invertible on a common axis and one of which is hinged and movable with relation to the other on an independent axis extending transversely of said common axis and means for depositing the sand in said flasks, substantially as set forth.

10. In a molding-machine the combination of two flasks operatively connected and movable together face to face, means individual to said flasks for ramming the sand into said flasks from the face side, and means for simultaneously moving said ramming means toward the flasks and in the same direction, substantially as set forth.

11. In a molding-machine the combination of two flasks, a charger movable under each of said flasks, means for inverting said flasks over said chargers respectively, and means for forcing sand from said chargers up into said flasks, said flasks being movable toward and from each other, substantially as set forth.

12. In a molding-machine the combination of two flasks, a charger movable under each of said flasks, means for inverting said flasks over said chargers respectively, means for forcing sand from said chargers up into said flasks and means operatively related to and timed with said charging means for bringing the flasks together face to face, substantially as set forth.

13. In a molding-machine the combination of an invertible flask, a charger movable to a position registering therewith when inverted, a pattern-plate movable upwardly through said charger for forcing the sand therefrom into said flask and impressing the pattern in the face of the mold thus produced, means for inverting the flask and means operatively connecting said inverting means with the pattern-plate, substantially as set forth.

14. In a molding-machine the combination of two flasks, two chargers movable to positions registering with said flasks respectively, pattern-plates movable through said chargers respectively and means for simultaneously forcing said pattern-plates toward their respective flasks, substantially as set forth.

15. In a molding-machine the combination of two flasks, two chargers movable to positions registering with said flasks respectively, pattern-plates movable through said chargers respectively, means for simultaneously forcing said pattern-plates toward their respective flasks, and means for bringing the flasks face to face operatively related to said pattern-plates, substantially as set forth.

16. In a molding-machine the combination of two flasks invertible on a common axis and also movable toward each other face to face, two chargers movable to positions registering with said flasks respectively, pattern-plates constituting the bottom of said chargers respectively and movable therewith and means for forcing said pattern-plates toward their respective flasks, substantially as set forth.

17. In a molding-machine the combination of two flasks, means for filling said flasks, means for forming the cope and the drag therein, respectively, means for bringing said flasks together face to face, for depositing the cope upon the drag, means for ejecting the cope and drag from the flask while placed together, and mechanism automatically connecting said ejecting means with the means for bringing the flasks together, substantially as set forth.

18. In a molding-machine the combination of two flasks movable toward and from each other face to face whereby the cope may be deposited upon the drag, means for forming the cope and drag in said flasks respectively, means for separating the flasks, means for ejecting the mold therefrom, means for removing the mold from the ejecting means and means operatively connecting said ejecting means with said mold-removing means, substantially as set forth.

19. In a molding-machine the combination of two flasks movable toward and from each other face to face whereby the cope may be deposited upon the drag, means for forming the cope and drag in said flasks, respectively, means for separating said flasks, means for ejecting the mold from said flasks and means operatively connecting said flask-separating means with said mold-ejecting means, substantially as set forth.

20. In a molding-machine the combination of two flasks hinged together face to face, an invertible frame therefor in which one of said flasks has an independent movement toward and from the other on the hinge thereof and means for ramming the sand in said flasks when said frame is inverted, substantially as set forth.

21. In a molding-machine the combination of two flasks, an invertible frame therefor in which one of said flasks has an independent movement toward and from the other, a latch for holding said movable flask from dropping down when the frame is inverted and means for automatically releasing said latch preparatory to the movement of said movable flask toward the other, substantially as set forth.

22. In a molding-machine the combination of two flasks, an invertible frame therefor in which one of said flasks has an independent movement toward and from the other, a main frame in which said flask-frame is pivoted, and a latch carried by said flask-frame for locking the movable flask thereto, and having a portion arranged to strike a part of said main frame for releasing said latch when the flask-frame turns face upward, substantially as set forth.

23. In a molding-machine the combination of two flasks, an invertible frame therefor in which one of said flasks has an independent movement toward and from the other, gearing carried by said frame for moving said movable flask toward and from the other, and an independent driving member with which one gear of said gearing engages and which is pivoted on the axis of said flask-frame, substantially as set forth.

24. In a molding-machine the combination of two flasks, a hinge connecting said flasks, an invertible frame therefor in which one of said flasks has an independent movement toward and from the other on said hinge, a worm-wheel secured to said movable flask and a worm for rotating said wheel journaled in said frame, substantially as set forth.

25. In a molding-machine the combination of a flask, shiftable retaining-strips therefor overhanging the edges thereof and racks and pinions located between and operatively connecting said strips together, substantially as set forth.

26. In a molding-machine the combination of a flask, a shiftable retaining-strip therefor, means for inverting said flask, means for shifting said strip out of engagement, and means operatively connecting said strip-shifting means with said flask-inverting means, substantially as set forth.

27. In a molding-machine the combination of a flask, a shiftable retaining-strip therefor, means for inverting said flask, means for shifting said retaining-strip out of engagement after said flask is inverted operatively connected with the flask-inverting means and means for shifting said strip back to its engaging position when said flask makes its return movement, located to engage said strip as the flask moves, substantially as set forth.

28. In a molding-machine the combination of a flask, a shiftable retaining-strip therefor having a projecting end, means for inverting said flask, and an oscillatory lever for engaging the end of said strip and shifting it out of engagement, substantially as set forth.

29. In a molding-machine the combination of a flask, a shiftable retaining-strip therefor having a projecting end, means for inverting said flask and an incline for engaging said projecting end and shifting said strip as the flask moves, substantially as set forth.

30. In a molding-machine the combination of two flasks having retaining-strips, means for turning one of said flasks over upon the other, an operating-lever arranged to simultaneously engage and shift said strips, and means operatively connecting said lever with said first means, substantially as set forth.

31. In a molding-machine the combination of a bottom board, a flask having a bottom-board holder, provided with a latch for retaining said bottom board, a cam for raising said bottom board and latch and means with which said latch engages and by which said latch is released as the bottom board rises, substantially as set forth.

32. In a molding-machine the combination of two flasks, two retaining-strips for each flask, each extending along two sides of said flasks, operative connections between the ends of said strips on each flask whereby the movement of one of them will also shift the other, and a shifting lever for simultaneously engaging the strips of both flasks, substantially as set forth.

33. In a molding-machine the combination of a flask, two retaining-strips each extending along two sides of said flask and provided with rack-bars at their contiguous ends and pinions arranged between and engaging said rack-bars whereby the shifting of one of said strips will also shift the other, substantially as set forth.

34. In a molding-machine the combination of an invertible flask, a shiftable retaining-strip therefor, an oscillatory lever for pushing said strip in one direction, said lever having an opening therein and an incline opposite said opening for pushing said strip in the opposite direction as the flask turns over, substantially as set forth.

35. In a molding-machine the combination of a bottom board, a flask, a bottom-board holder movable upwardly toward the face of said flask and provided with a pair of bottom-board latches having converging tailpieces and a member fixed with relation to and engaging between said tailpieces and means for raising said bottom-board holder, substantially as set forth.

36. In a molding-machine the combination of a bottom board, a flask, a bottom-board holder movable upwardly toward the face of said flask and provided with a pair of bottom-board latches having converging tailpieces, perpendicular guideways, guides secured to said bottom-board holder and sliding in said guideways, a shaft passing between said tailpieces, cams on said shaft acting on said guides for raising said bottom-board holder and means for rotating said shaft, substantially as set forth.

37. In a molding-machine the combination of an invertible flask, a bottom-board holder therein, and means invertible with said flask for raising said holder to the face of the flask, substantially as set forth.

38. In a molding-machine the combination of an invertible flask, a bottom-board holder therein, means invertible with said flask for raising said holder to the face of said flask and means for inverting said flask and means operatively connecting said inverting means with said means for raising said bottom-board holder, substantially as set forth.

39. In a molding-machine the combination of an invertible flask, means for inverting the same, a removable bottom board therein, means for locking said bottom board when the flask is inverted and means for releasing said locking means operatively connected with the flask-inverting means, substantially as set forth.

40. In a molding-machine the combination of an invertible flask, means for inverting the same, a removable bottom board therein, means for locking said bottom board when the flask is inverted and means for elevating and releasing said bottom board operatively connected with the flask-inverting means, substantially as set forth.

41. In a molding-machine the combination of two flasks, means for bringing said flasks together face to face and then separating them, and means timed operatively with relation to said flask-operating means to eject the mold after the flasks begin to separate, substantially as set forth.

42. In a molding-machine the combination of two flasks, means for bringing said flasks together face to face and then separating them, and means timed operatively with relation to said flask-operating means to eject the mold from the flasks while the flasks are in the act of separating, substantially as set forth.

43. In a molding-machine the combination of two flasks, means for bringing said flasks together face to face and then separating them, means for ejecting the mold from the flasks and means movable in opposite directions operatively connected with the flask-operating means and having operative connection with said ejecting means when moving in one direction and inoperative thereon when moving in the other direction whereby said ejecting means will act to eject the mold after the flasks have closed and will remain inactive until the flasks begin to open, substantially as set forth.

44. In a molding-machine the combination of two flasks, means for bringing said flasks together face to face and then separating them, means for ejecting the mold from the flasks, a shaft for operating said means, a gear and a dog mounted on said shaft and one of them being secured thereto and the other loose thereon and said dog being adapted to engage said gear when moving in one direction only, and means connecting said gear with said means for bringing the flasks together and then separating them whereby said latter means and ejector will operate in time with relation to each other, substantially as set forth.

45. In a molding-machine the combination of two invertible and relatively movable flasks, means for opening and closing said flasks, means for ejecting the mold from one of said flasks and means operatively connecting said ejecting means with said flask-operating means, substantially as set forth.

46. In a molding-machine the combination of two invertible and relatively movable flasks, means for opening and closing said flasks, means for ejecting the mold from one of said flasks and means for inverting said flasks operatively connected with said ejecting means and flask-operating means, substantially as set forth.

47. In a molding-machine the combination of an invertible flask-frame, two relatively movable flasks carried thereby and a mold-ejecting means and means for opening and closing said flasks operatively connected and carried by said frame, and means independent of said frame, for imparting motion to one of the aforesaid means, substantially as set forth.

48. In a molding-machine the combination of an invertible flask-frame, two relatively movable flasks carried thereby, a mold-ejecting means and means for opening and closing said flasks operatively connected and carried by said frame, means for imparting motion to one of said means, means for depositing sand in said flasks and means operatively connecting said ejecting means with said sand-depositing means, substantially as set forth.

49. In a molding-machine the combination of an invertible flask-frame, two relatively movable flasks carried thereby, a mold-ejecting means and means for opening and closing said flasks operatively connected and carried by said frame, a gear journaled concentric with the axis of said frame and having operative connection with said flask-operating means, and means for driving said gear, substantially as set forth.

50. In a molding-machine the combination of two relatively movable bodily-invertible hinged flasks, means for opening and closing said flasks, a gear connected with said means and means for driving said gear alternately in opposite directions, substantially as set forth.

51. In a molding-machine the combination of two relatively movable invertible flasks, means for opening and closing said flasks, a gear journaled concentric with the center of oscillation of said flasks and connected with said means and means for driving said gear alternately in opposite directions, substantially as set forth.

52. In a molding-machine the combination of two relatively movable invertible flasks, means for opening and closing said flasks, a gear connected with said means and means for intermittently locking said gear in operative connection for inverting said flasks, substantially as set forth.

53. In a molding-machine the combination of two relatively movable invertible flasks, means for opening and closing said flasks, a gear connected with said means, means for driving said gear alternately in opposite directions and means for intermittently locking said gear into operative connection with said flasks for oscillating the latter, substantially as set forth.

54. In a molding-machine the combination of two relatively movable flasks oscillatory as a whole on a common axis, means operatively connected therewith for turning them on their common axis, means for depositing sand in said flasks, and mechanism connecting the latter means with said means for turning the flasks on their common axis, substantially as set forth.

55. In a molding-machine the combination of two relatively movable flasks oscillatory as a whole on a common axis, means for opening and closing said flasks, a gear connected with said means, means for alternately rotating said gear in opposite directions and means for intermittently locking said gear and flasks against relative rotation on said common axis, whereby said flasks will be compelled to oscillate with said gear, substantially as set forth.

56. In a molding-machine the combination of two relatively movable flasks oscillatory on a common axis, means for opening and closing said flasks, a gear connected with said means, means for alternately rotating said gear in opposite directions, means for intermittently locking said gear and flasks against relative rotation on said common axis and causing said flasks to oscillate on said common axis during a part of the rotation of said gear and means for automatically releasing said lock after the gear and flasks have rotated together a portion of the gear's rotation in both directions, substantially as set forth.

57. In a molding-machine the combination of two flasks adapted to be closed together, chargers movable to positions registering with said flasks respectively for supplying sand thereto, means for supporting the flasks independently of said chargers, means for closing the flasks together and mechanism operatively connected with said flask-closing means for giving said chargers said movement, substantially as set forth.

58. In a molding-machine the combination of two flasks relatively movable, a common axis on which they are also oscillatory, means movable relatively to said flask and operatively related thereto for oscillating them alternately in opposite directions on said axis and means for depositing sand in said flasks, substantially as set forth.

59. In a molding-machine the combination of two flasks relatively movable and also oscillatory on a common axis, means for oscillating said flasks alternately in opposite directions on said axis and means for depositing the sand in said flasks operatively related to and timed with said flask-oscillating means, substantially as set forth.

60. In a molding-machine the combination of two flasks relatively movable and also oscillatory on a common axis, a gear-wheel, means for rotating said wheel alternately in opposite directions, means for connecting both flasks with said gear-wheel during a part of its rotation in each direction and then releasing them therefrom, means for closing said flasks together operatively connected with said gear and means for charging said flasks, substantially as set forth.

61. In a molding-machine the combination of an invertible flask, a gear-wheel, means for rotating said gear-wheel alternately in opposite directions, means for connecting said flask with said gear during a part of its rotation in each direction and then releasing it therefrom, and means for charging said flask coöperatively related to the said gear, substantially as set forth.

62. In a molding-machine the combination of two flasks relatively movable and also oscillatory on a common axis, a gear-wheel, means for rotating said wheel alternately in opposite directions, means for connecting both of said flasks with said gear during a part of its rotation in each direction and then releasing them therefrom, means for closing said flasks together operatively connected with said gear and means for charging said flasks coöperatively related to said gear, substantially as set forth.

63. In a molding-machine the combination of two flasks relatively movable and oscillatory on a common axis, a rotary member rotative alternately in opposite directions, means for locking said flasks as a whole to said rotary member during a part of its rotation in each direction, means for locking said flasks against oscillation when released from said member, means operatively connected with said member for closing said flasks together and means for charging said flasks, substantially as set forth.

64. In a molding-machine the combination of two flasks relatively movable and oscillatory on a common axis, a flask-frame, a double-acting bolt carried thereby, two fixed stops adapted to alternately receive one end of said bolt for locking the frame against oscillation, a rotary member rotative alternately in opposite directions and having a socket for receiving the other end of said bolt and causing said frame to oscillate with said member, means for shifting said bolt alternately into engagement with said socket and one of said stops as said member rotates for locking said frame alternately to one of said stops and to said rotary member, means operatively connected with said member for closing said flasks together and means for charging said flasks, substantially as set forth.

65. In a molding-machine the combination of a flask, means for ejecting the mold member produced therein above the edges thereof and means operatively related to said ejecting means for removing said mold from said ejecting means, substantially as set forth.

66. In a molding-machine the combination of a flask, a detachable bottom board therein, means for ejecting said bottom board above the edges of the flask and releasing the bottom board and means coöperatively related to said ejecting means for removing the bottom board from the ejecting means with the mold member thereon, substantially as set forth.

67. In a molding-machine the combination of a flask, means for ejecting the mold member produced therein above the edges thereof, mold-removing arms adapted to be projected under said mold member when thus elevated, and means for supporting said arms, substantially as set forth.

68. In a molding-machine the combination of a flask, means for ejecting the mold member therein above the edges thereof, mold-removing arms movable endwise under and adapted to receive the mold member thus elevated, and means for supporting and guiding said arms under said mold member, substantially as set forth.

69. In a molding-machine the combination of a mold-producing means and a mold-ejector one movable with relation to the other in a perpendicular direction whereby the mold is caused to occupy a relatively elevated position, and means for engaging under and removing said mold when thus elevated, substantially as set forth.

70. In a molding-machine the combination of means for producing the cope and the drag and placing the former upon the latter, means for carrying the mold as a whole to an elevated position, means for removing the mold from such position, and means operatively connecting said second and third means, substantially as set forth.

71. In a molding-machine the combination of two flasks, movable toward and from each other, means for separating said flasks and means for removing the mold therefrom while the flasks are in the act of separating, operatively connected with the flask-separating means, substantially as set forth.

72. In a molding-machine the combination of two flasks movable toward and from each other, means for separating said flasks, means for ejecting the mold therefrom while the flasks are separating, a mold-remover and means for causing said mold-remover to project under and receive the mold while the flasks are separating, substantially as set forth.

73. In a molding-machine the combination of a mold-producing means, a double-ended mold-remover and means for successively presenting the ends thereof to the mold for receiving the latter thereon, substantially as set forth.

74. In a molding-machine the combination of a mold-producing means, mold-ejecting means, a double-ended mold-remover and means for alternately projecting the ends of said mold-remover under the mold, substantially as set forth.

75. In a molding-machine the combination of a mold-producing means, mold-ejecting means, a reciprocatory and oscillatory mold-remover for receiving and removing the mold, and means operatively connecting said mold-remover with said mold-producing means, substantially as set forth.

76. In a molding-machine the combination of a mold-producing means, a pivoted and bodily-movable double-ended mold-remover, means for holding the mold in position to be received by said mold-remover and means for successively presenting the ends of said remover to the mold for receiving the latter, substantially as set forth.

77. In a molding-machine the combination of a mold-producing means, and a mold-ejector one movable with relation to the other in a perpendicular direction whereby the mold is caused to occupy a relatively elevated position, means for engaging under and removing the elevated mold and means for withdrawing said mold-removing means with the mold thereon with a speed gradually increasing to a maximum and gradually decreasing from said maximum to a point of rest, substantially as set forth.

78. In a molding-machine the combination of a mold-producing means and a mold-ejector one movable with relation to the other in a perpendicular direction whereby the mold is caused to occupy a relatively elevated position, arms for engaging under and removing said mold, means for moving said arms endwise toward the mold and means for moving said arms bodily in a return direction and at the same time turning them end for end, substantially as set forth.

79. In a molding-machine the combination of a mold-producing means, a pivoted and bodily-movable double-ended mold-remover, a reciprocating carriage on which said mold-remover is pivoted, a gear mounted on said carriage and rotatable independently of said mold-remover, a fixed rack with which said gear engages and means for connecting said gear and mold-remover when the carriage moves in one direction, substantially as set forth.

80. In a molding-machine the combination of a mold-producing means, pivoted reciprocating mold-removing arms, means for moving said arms endwise toward the mold for receiving it, a lock for holding said arms against pivotal movement, means for releasing said lock after the mold is received on said arms and means for imparting a pivotal and bodily return movement to said arms after the mold is received thereon, substantially as set forth.

81. In a molding-machine the combination of a mold-producing means, a reciprocatory carriage, mold-removing arms pivoted thereon, a way upon which said carriage runs toward and from said mold-producing means, mold-removing arms pivotally supported on said carriage, a lock for holding said arms against pivotal movement, means on said way for releasing said lock when the carriage makes its advancing movement and means for imparting a bodily movement to said carriage and an oscillatory movement to said arms, substantially as set forth.

82. In a molding-machine the combination of a mold-producing means, a reciprocatory mold-remover for receiving the mold, means for presenting the mold to said remover, convolute gears for imparting motion to said mold-remover, means for operatively connecting said gears with said means for presenting the mold to the mold-remover, substantially as set forth.

83. In a molding-machine the combination of means for producing the mold, a mold-remover, intermeshing convolute gears, means for rotating one of said gears intermittently in one direction, and means for imparting the movement of the other of said gears to said mold-remover, substantially as set forth.

84. In a molding-machine the combination of means for producing a mold, a mold-remover, intermeshing convolute gears, means for rotating one of said gears intermittently in one direction, means for imparting the movement of the other of said gears to said mold-remover and a stop for preventing retrograde movement of one of said gears, substantially as set forth.

85. In a molding-machine the combination of invertible and relatively movable flasks, a member rotating alternately in opposite directions, means for imparting the movement of said member to said flasks for inverting them, means for imparting the movement of said member to said flasks for moving them relatively, a mold-remover, a pair of intermeshing convolute gears one of which is operatively connected with said mold-remover, and an intermittent-grip-mechanism connection between the other of said gears and said rotary member whereby the rotation of the latter in one direction will be imparted to said gears, substantially as set forth.

86. In a molding-machine the combination of two relatively movable flasks also oscillatory on a common axis, means carried with said flasks for moving them relatively having a pinion, a gear-wheel engaging said pinion and with which gear said pinion revolves bodily, means for rotating said gear alternately in opposite directions and means for operatively connecting said flasks with said gear during a portion of its rotation in each direction whereby said flasks will be oscillated on said common axis, said gear having a greater degree of oscillation than said flasks and pinion whereby the pinion will be rotated by the further movement of the gear after the bodily movement of the pinion ceases, substantially as set forth.

87. In a molding-machine the combination of two flasks relatively movable and oscillatory on a common axis, means for opening and closing said flasks having a pinion movable bodily therewith, a mutilated gear engaging said pinion, means for rotating said gear alternately in opposite directions, a bolt movable with said flasks in their oscillatory movement, a spring for actuating said bolt, said gear having a socket in which said bolt engages, means for reversing the tension of said spring for causing said bolt to alternately shoot into and out of said socket, an element carried by said gear for actuating said tension-reversing means in one direction and means for actuating said tension-reversing means in the other direction as the gear rotates, substantially as set forth.

88. In a molding-machine the combination of two relatively movable flasks, an oscillatory frame therefor, means for opening and closing said flasks having a pinion carried by said frame, a gear engaging said pinion, means for rotating said gear alternately in opposite directions, means comprising a dog for imparting the movement of said gear to said frame in one direction, and means fixed relatively to said dog for disengaging the latter before the gear completes its rotation, substantially as set forth.

89. In a molding-machine the combination of a flask, a charger-box for filling the same adapted to be held registering therewith, means for holding the pattern in said box and forcing the same toward said flask and means for adjusting the pattern transversely of said box, substantially as set forth.

90. In a molding-machine the combination of a flask, a charger-box for filling the same adapted to be held registering therewith, a pattern-plate movable in said charger-box toward said flask and means for adjusting said plate transversely of said box, substantially as set forth.

91. In a molding-machine the combination of a flask, a pattern-plate, corner-gibs carried thereby and adjustable relatively thereto, a guide-casing for said gibs movable therewith and having a limited movement independently thereof, a stripper-plate supported by said guide-casing and means for actuating said pattern-plate and stripper-plate, substantially as set forth.

92. In a molding-machine the combination of a flask, a pattern-plate, corner-gibs carried thereby and adjustable longitudinally and transversely thereof, a guide-casing for said gibs movable therewith and having a limited movement independently thereof, a stripper-plate supported by said guide-casing and means for actuating said pattern-plate and stripper-plate, substantially as set forth.

93. In a molding-machine the combination of a flask, a pattern-plate, a guide-casing for said plate having a stripper-plate, a charger-box for filling said flask, in which said pattern-plate and guide-casing slide, means for operating said pattern-plate and means independent of said first means for actuating said guide-casing to hold the stripper-plate elevated, substantially as set forth.

94. In a molding-machine the combination of a flask, a pattern-plate, a guide-casing for said plate having a stripper-plate, a charger-box for filling said flask, a housing inclosing and secured to said guide-casing and fitting and sliding in said box, means for raising said pattern-plate and means for holding said housing elevated independently of the means for raising said pattern-plate, substantially as set forth.

95. In a molding-machine the combination of a flask, a charger-box for filling the same adapted to be held registering therewith, a pattern-plate movable in said charger-box toward said flask and having depending guide-legs, corner-gibs adjustably secured to said guide-legs, a guide-casing for said gibs and means for actuating said pattern-plate, substantially as set forth.

96. In a molding-machine the combination of a flask, a pattern-plate and a stripper-plate movable into register with said flask, a member for thus moving said pattern-plate and stripper-plate, movable independently thereof, means for withdrawing said pattern-plate and a latch for holding said stripper-plate elevated, arranged to be engaged by the said member during its independent movement, whereby the said latch will be released, substantially as set forth.

97. In a molding-machine the combination of a flask, a pattern-plate, a stripper-plate, means for withdrawing said pattern-plate, a weight for holding said stripper-plate against the face of the mold and means operatively connected with the pattern-plate for raising said weight after the pattern-plate has partially withdrawn, substantially as set forth.

98. In a molding-machine the combination of a flask, a pattern-plate, a stripper-plate, means for withdrawing said pattern-plate, a weighted lever for holding said stripper-plate up to its work and means for engaging one end of said lever and raising the weight thereof after the pattern-plate starts to withdraw, substantially as set forth.

99. In a molding-machine the combination of a flask, a pattern-plate, a stripper-plate, means for withdrawing said pattern-plate, a weighted lever for holding said stripper-plate up to its work and means for engaging one end of said lever and raising the weight thereof after the pattern-plate starts to withdraw, said latter means operating in unison with said pattern-plate-actuating means but being set at a distance from said lever at the time when the pattern-plate and stripper-plate are at the limit of their compressing stroke, substantially as set forth.

100. In a molding-machine the combination of a flask, a pattern-plate, a stripper-plate, means for actuating said pattern-plate to withdraw, a weighted lever for holding said stripper-plate up to its work, means for deflecting one end of said lever and raising the weight thereof after the pattern-plate starts to withdraw and a yielding device for imparting the impact of said second means to said lever, substantially as set forth.

101. In a molding-machine the combination of a flask, a pattern-plate, a stripper-plate, means for withdrawing said pattern-plate, a weighted lever for holding said stripper-plate up to its work, a crank-arm, means for operating said crank-arm in unison with said means and adapted to engage one end of said lever and lift the weight thereof, said crank-arm having a greater movement than said end of the lever whereby the lever will not be moved until after the crank-arm has completed part of its movement and the pattern-plate has started to withdraw, substantially as set forth.

102. In a molding-machine the combination of two flasks, two pattern-plates, two stripper-plates, a shaft, means operatively connecting said shaft with both of said pattern-plates, a weight for holding said stripper-plates up to their work, means connected with said shaft for raising said weight and lowering said stripper-plates and means for operating said shaft, substantially as set forth.

103. In a molding-machine the combination of two flasks, two pattern-plates, two stripper-plates, a yieldingly-supported frame carrying said stripper-plates, a relatively fixed shaft, toggles connecting said shaft with said pattern-plates, means for oscillating said shaft, and means operatively related to said shaft for lowering said frame after the toggles have made their initial movement for lowering the pattern-plates, substantially as set forth.

104. In a molding-machine the combination of two flasks, two pattern-plates, two stripper-plates, a yieldingly-supported frame carrying said stripper-plates, a relatively fixed shaft, toggles connecting said shaft with said pattern-plates, a segment on said shaft, means operatively related to said segment for lowering said frame and a reciprocating rack-bar for operating said segment, substantially as set forth.

105. In a molding-machine the combination of a flask, a charger-box movable to a position registering therewith, a pattern-plate and a stripper-plate carried with said box and movable therewith and also movable toward said flask through said box and means for operating said plates to approach and recede from said flask, substantially as set forth.

106. In a molding-machine the combination of a flask, a charger-box movable to a position registering therewith, a pattern-plate and a stripper-plate movable toward said flask through said box and means carried with said box for actuating said plates to approach and recede from said flask, substantially as set forth.

107. In a molding-machine the combination of a flask, a charger-box movable to a position registering therewith, a pattern-plate and a stripper-plate movable toward said flask through said box, means for operating said plates carried with said box and means independent of said box for actuating said first means, substantially as set forth.

108. In a molding-machine the combination of a flask, a charger-box movable to a position registering therewith, a pattern-plate and a stripper-plate movable toward said flask through said box, a movable member for moving said box to a position registering with said flask, means for detaching said member from said box and means for imparting the independent movement of said member to said plates for actuating them, substantially as set forth.

109. In a molding-machine the combination of a flask, a charger-box movable to a position registering therewith, a pattern-plate, a stripper-plate, a member for moving said box having a limited movement independently thereof and means carried with said box for imparting said independent movement to said pattern-plate and stripper-plate for actuating them, substantially as set forth.

110. In a molding-machine the combination of a flask, a charger-box movable to a position registering therewith, a pattern-plate, a stripper-plate, a member for moving said box having a limited movement independently thereof, means for releasing said box from and connecting it with said member, and means for imparting the independent movement of said member to said pattern-plate and stripper-plate for actuating them, substantially as set forth.

111. In a molding-machine the combination of a flask, a charger movable to a position registering with said flask, a toothed member, a member for moving said charger having a limited movement independently thereof and provided with teeth for engaging and operating said toothed member when the charger comes to rest and means for ramming the sand by the movement of said first toothed member, substantially as set forth.

112. In a molding-machine the combination of a flask, a charger movable to a position registering with said flask, an oscillatory toothed member movable with said charger, a member for moving said charger having a limited movement independently thereof and provided with teeth for engaging and oscillating said toothed member when the charger stops and means for ramming the sand by the oscillatory movement of said toothed member, substantially as set forth.

113. In a molding-machine the combination of a flask, a charger movable to a position registering therewith, a toothed segment, a reciprocating member for moving said charger having a limited movement independently thereof and provided with teeth for engaging and oscillating said segment when the charger stops and means for ramming the sand in the flask by the movement of said segment, substantially as set forth.

114. In a molding-machine the combination of a flask, a charger movable to a position registering therewith, a toothed member, a member for moving said charger movable therewith and having a limited movement independently of said charger and provided with teeth for engaging and operating said first toothed member when the charger stops and means for ramming the sand in the flask by the movement of said first toothed member, substantially as set forth.

115. In a molding-machine the combination of a flask, a charger movable to a position registering therewith, a toothed member, a member for moving said charger having a limited movement independently thereof and provided with a relatively adjustable rack-bar engaging said toothed member and adapted to oscillate said toothed member when the charger stops, and means for depositing the sand into the flask by the movement of said toothed member, substantially as set forth.

116. In a molding-machine the combination of a flask, a charger movable to a position registering therewith, a toothed member, a member for moving said charger having a limited movement independently thereof, a rack-bar slidable longitudinally of said second member and engaging said toothed member, means for adjustably securing said second member and rack-bar together, and means for depositing the sand in the flask by the movement of said toothed member, substantially as set forth.

117. In a molding-machine the combination of a flask, means coöperative therewith for producing a mold member, movable to a position registering with said flask, a member for moving said means to said registering position having a limited independent movement after said registering position is reached and means for imparting said independent movement to said first means for actuating the latter, substantially as set forth.

118. In a molding-machine the combination of a flask, means coöperative therewith for producing a mold member, movable to a position registering with said flask, a nut for moving said means to said registering position having a limited independent movement after said registering position is reached, means for imparting said independent movement to said first means for actuating the latter and a screw engaging and moving said nut, substantially as set forth.

119. In a molding-machine the combination of a flask, means coöperative therewith for producing a mold member, movable to a position registering with said flask, a member for moving said means to said registering position having a limited independent movement after said registering position is reached, means for imparting said independent movement to said first means for actuating the latter, and means for reciprocating said second member, substantially as set forth.

120. In a molding-machine the combination of a flask, means coöperative therewith for producing a mold member, movable to a position registering with said flask, a nut for moving said means to said registering position having a limited independent movement after said registering position is reached, means for imparting said independent movement to said first means for actuating the latter, a screw for engaging and moving said nut and means for automatically reversing said screw at the end of the movement of said nut, substantially as set forth.

121. In a molding-machine the combination of a flask, means coöperative therewith for producing a mold member, movable to a position registering with said flask, a member for moving said means to said registering position having a limited independent movement after said registering position is reached, means for imparting said independent movement to said first means for actuating the latter and means for attaching said member to and detaching it from said first means, substantially as set forth.

122. In a molding-machine the combination of a flask, means coöperative therewith for producing a mold member, movable to a position registering with said flask, a member for moving said means to said registering position having a limited independent movement after said registering position is reached, a dog for operatively connecting said means to said second member, a trip for releasing said dog when said registering position is reached and means for imparting said independent movement to said first means for actuating the latter, substantially as set forth.

123. In a molding-machine the combination of a flask, means coöperative therewith for producing a mold member, movable to a position registering with said flask, a stop for limiting the movement of said means relatively to said flask, a member for moving said means to said registering position having a limited independent movement after said registering position is reached and means for imparting said independent movement to said means for actuating the latter, substantially as set forth.

124. In a molding-machine the combination of a flask, means coöperative therewith for producing a mold and movable to a position registering with said flask, a member for moving said means to said coincident position having a limited independent movement after said position is reached, means for imparting said independent movement to said first means for actuating the latter, a reversible mechanism for reciprocating said member and a trip for reversing said mechanism arranged to be actuated by the independent movement of said member, substantially as set forth.

125. In a molding-machine the combination of a flask, means coöperative therewith for producing the mold and movable to a position registering with said flask, a member for moving said means to said coincident position having a limited independent movement after said position is reached, means for imparting said independent movement to said first means for actuating the latter, a screw for reciprocating said member, oppositely-revolving clutch members for rotating said screw, a shiftable clutch member for connecting said screw with either of said revolving clutch members, and means for shifting said shiftable clutch member by the independent movement of said first member, substantially as set forth.

126. In a molding-machine the combination of a flask, a charger-box movable to a position registering therewith, a pattern-plate constituting the bottom of said charger-box, means for forcing said plate toward said flask and means for varying the initial or starting position of said plate whereby the charge of sand received in said box will be accordingly varied, substantially as set forth.

127. In a molding machine the combination of a flask, a relatively movable carriage having a charger for filling said flask, a nut reciprocally mounted on said carriage and having a limited movement independently thereof, means for locking said nut and carriage against independent movement, means for releasing said locking means when the carriage reaches a position registering with said flask, means carried by said carriage for operating said charger by the said independent movement of said nut, and a relatively fixed screw for reciprocating said nut, substantially as set forth.

128. In a molding-machine the combination of a flask, a relatively movable carriage, and a charger-box, a pattern-plate, a stripper-plate and means for operating said plates all carried by said carriage, and means for moving said carriage into and out of register with said flask, substantially as set forth.

129. In a molding-machine the combination of a flask, a charger movable to a position registering therewith, means for actuating the charger while coincident with said flask and means for carrying an edge of the charger out of line with hanging sand on the face of the mold, preparatory to withdrawing the charger from the flask, substantially as set forth.

130. In a molding-machine the combination of a flask, a charger-box movable to a position registering therewith, means for forcing the sand from said box into said flask and means for lowering an edge of said box out of line with hanging sand on the face of the mold preparatory to withdrawing said box from said registering position, substantially as set forth.

131. In a molding-machine the combination of a flask, a reciprocating charger having a charger-box movable to a position registering with said flask, and having an independent edge movable at an angle to the face of the flask and means for raising and lowering said edge of said box preparatory to receiving sand therein and receding from said flask, substantially as set forth.

132. In a molding-machine the combination of a flask, a charger having a charger-box movable to a position registering with said flask, the edge of one side of said box being independently movable out of line with the hanging sand on the face of the mold and means for actuating said movable edge, substantially as set forth.

133. In a molding-machine the combination of a flask, a charger having a charger-box movable to a position registering with said flask, the edge of one side of said box being independently movable out of line with the hanging sand on the face of the mold and at an oblique angle to the side of the box and means for actuating said movable edge, substantially as set forth.

134. In a molding-machine the combination of a flask, a charger having means for ramming sand in said flask, a charger-box containing said means and movable to a position registering with said flask and being provided with an independently-movable side, means for actuating said sand-ramming means and means operatively related thereto for moving said side of the box out of line with the hanging sand on the face of the mold after the flask has been filled, substantially as set forth.

135. In a molding-machine the combination of a flask, a charger having means for ramming the sand therein, a charger-box containing said means, movable to a position registering with said flask and provided with an independently-movable side, means for actuating said sand-ramming means, a crank-shaft connected with said movable side, a pinion on said shaft, a rack-bar engaging said pinion and means for moving said rack-bar at the conclusion of the sand-ramming operation, substantially as set forth.

136. In a molding-machine the combination of a flask, a charger-box movable to a position registering with said flask and provided with an independently-movable side, means for forcing the sand from said charger-box into said flask, means arranged in operative position with relation thereto for moving said side out of line with the hanging sand after the sand has been deposited in the flask and a trip arranged adjacent to the line of movement of said charger-box for restoring said movable side to its normal position, substantially as set forth.

137. In a molding-machine the combination of a flask, a charger-box movable to a position registering with said flask, and provided with an independently-movable side, means for forcing the sand from said box into said flask, means operatively related thereto for moving said movable side out of line with the hanging sand, comprising a crank-shaft having a crank-arm, a relatively fixed cam or incline adjacent to the line of movement of said charger-box and means for oscillating said crank-arm by engagement with said cam for restoring said movable side to its normal position after passing the flask, substantially as set forth.

138. In a molding-machine the combination of a flask, a charger-box movable to a position registering therewith and provided with an independently-movable side, means for forcing the sand from said box into said flask, a member for moving said charger-box back and forth having a limited movement independently thereof after the charger-box registers with said flask and means for imparting said independent movement to the means for forcing the sand from the box and to the means for operating said independently-movable side of the box, substantially as set forth.

139. In a molding-machine the combination of a flask, a sand-hopper, a charger-box movable alternately into register with said hopper and flask and having an independently-movable side adapted to be moved out of line with the hanging sand in the flask at an angle to the face of the flask and mold and means arranged in operative position with relation to said charger-box for restoring said movable side to its normal position before the box reaches said hopper, substantially as set forth.

140. In a molding-machine the combination of a flask, a sand-hopper and a charger-box for said flask movable toward and from said hopper, in contact with the lower surface thereof, said hopper having an incline for shooting the sand laterally toward said box as the latter approaches it and at the lower end of said incline a second incline turned in the reverse direction, substantially as set forth.

141. In a molding-machine the combination of two flasks, two sand-hoppers, two charger-boxes movable into communication with said hoppers, two connected valves for closing said hoppers respectively, a tongue or projection connected with said boxes and extending between said valves, a catch for connecting said tongue with said valves and means for disengaging said catch when the valves close the hoppers, substantially as set forth.

142. In a molding-machine the combination of an invertible flask, means for charging said flask movable to a position coincident therewith, means for inverting said flask, means for moving said charging means and means for throwing said flask-operating means out of action while the means for moving the charging means continues to operate, substantially as set forth.

143. In a molding-machine the combination of an invertible flask, means coöperative therewith for producing a mold member and movable to and from a position coincident with said flask, means for thus moving said first means, means for inverting said flask and means operatively related to said second means for throwing said flask-inverting means alternately out of and into action, substantially as set forth.

144. In a molding-machine the combination of an invertible flask, a charger-box, means for forcing the sand therefrom into said flask, means for moving said charger-box to a position registering with said flask having a limited movement independently of said box, means for imparting said independent movement to said sand-forcing means, means for inverting said flask and means for throwing the latter means out of action while said independent movement is taking place, substantially as set forth.

145. In a molding-machine the combination of an invertible flask, a charger-box, means for forcing the sand therefrom into said flask, means for moving said charger-box to a position registering with said flask having a limited movement independently of said box, means for imparting said independent movement to said sand-forcing means, means for inverting said flask and means moving with said charger-box for throwing the last said means out of action while said independent movement is taking place, substantially as set forth.

146. In a molding-machine the combination of an invertible flask, means for inverting said flask comprising a clutch, means coöperative with said flask for producing a mold member, movable to a position registering with said flask, and means coöperatively related to the latter means for holding said clutch disengaged while said second means is coöperating with said flask for producing the mold member, substantially as set forth.

147. In a molding-machine the combination of an invertible flask, means for inverting said flask comprising a clutch, means coöperative with said flask for producing a mold member movable to a position registering with said flask and means carried by said latter means for holding the clutch disengaged while said second means is in said coincident position, substantially as set forth.

148. In a molding-machine the combination of an invertible flask, means for inverting said flask, comprising a clutch, means coöperative with said flask for producing a mold member, movable to a position registering with said flask, a lever for operating said clutch and means carried by said second means for engaging said lever and holding said clutch disengaged while said second means is in said coincident position, substantially as set forth.

149. In a molding-machine the combination of an invertible flask, means for inverting said flask comprising a clutch, means coöperative with said flask for producing a mold member movable to a position registering with said flask, means coöperatively related to the latter means for holding said clutch disengaged having an independently-deflectable portion and means for alternately rendering said portion rigid and deflectable as the said second means moves back and forth, substantially as set forth.

150. In a molding-machine the combination of an invertible flask, means for inverting said flask comprising a clutch, means coöperative with said flask for producing a mold member movable to a position registering with said flask, means coöperatively related to the latter means for holding said clutch disengaged having an independently-deflectable portion and a shifting bar for alternately rendering said portion rigid and deflectable as said second means moves back and forth, substantially as set forth.

151. In a molding-machine the combination of an invertible flask, means for inverting said flask comprising a clutch, means coöperative with said flask for producing a mold member, movable to a position registering with said flask, means coöperatively related to the latter means for holding said clutch disengaged, having an independently-deflectable portion, a shifting bar arranged to engage said portion and render the same rigid and means for shifting said bar in opposite directions as said second means moves back and forth, substantially as set forth.

152. In a molding-machine the combination of an invertible flask, means for inverting said flask comprising a clutch, means coöperative with said flask for producing a mold member, movable to a position registering with said flask, an elongated deflecting-bar carried by said second means for holding said clutch out of engagement having an independently-deflectable end, a shifting bar carried with said deflecting-bar for engaging and holding said end rigid, and means for alternately moving said shifting bar into and out of engagement with said end as said second means moves back and forth, substantially as set forth.

153. In a molding-machine the combination of an invertible flask, means for inverting the same comprising a gear and means for driving said gear; means for intermittently throwing said latter means out of action comprising a reciprocating deflecting-bar having an independently-deflectable end, means for alternately rendering said end rigid when said bar moves in one direction and means coöperative with said flask for producing a mold while said second means is inactive, substantially as set forth.

154. In a molding-machine the combination of two flasks, means for oscillating said flasks on a common axis and moving one of them toward the other comprising a mutilated gear and a pinion engaging with said gear, means for driving said gear, means for intermittently throwing said driving means out of action comprising a reciprocating deflecting-bar having an independently-deflectable end, means for rendering said end rigid when said bar moves in one direction and means coöperating with said flasks for producing two mold members when said driving means is out of action, substantially as set forth.

155. In a molding-machine the combination of two flasks, means for closing said flasks together comprising a pinion and means for oscillating said flasks on a common axis comprising a mutilated gear engaging said pinion and with which gear the pinion has a limited bodily travel, reciprocating means for charging said flask movable into register therewith, means for starting the rotation of said gear in one direction when the charging means reaches a certain point going in one direction and means for stopping the rotation of said gear before said charging means reaches said point going in the opposite direction, substantially as set forth.

156. In a molding-machine the combination of two flasks, means for closing said flasks together comprising a pinion and means for oscillating said flasks on a common axis comprising a mutilated gear engaging said pinion and with which gear the pinion has a limited bodily travel, reciprocating means for charging the flask movable into coincidence therewith, disengageable driving means for rotating said gear, means for causing said driving means to engage at a certain point in the travel of said charging means when going in one direction, and to disengage before said charging means reaches said point going in the opposite direction, substantially as set forth.

157. In a molding-machine the combination of two flasks, means for charging said flasks, means for closing said flasks together comprising a pinion and means for oscillating said flasks on a common axis comprising a mutilated gear engaging said pinion and means for giving said gear an intermittent rotation ceasing at a certain point with reference to the length of the advancing stroke of the charger and commencing its rotation before the charger reaches said point in its return stroke, substantially as set forth.

158. In a molding-machine the combination of two flasks, reciprocating means for charging said flasks, means for closing said flasks together comprising a pinion and means for oscillating said flasks on a common axis comprising a mutilated gear engaging said pinion, means for giving said gear an intermittent rotation alternately in opposite directions ceasing at a certain point with reference to the length of the advancing stroke of the charger and commencing its rotation before the charger reaches said point in its return stroke, and means for locking said flasks and pinion against bodily movement with said gear during a part of the latter's rotation in both directions, substantially as set forth.

159. In a molding-machine the combination of a movable flask, a charger therefor, a screw for imparting bodily movement to said charger, means for driving said screw alternately in opposite directions, and means operating in unison with said screw for operatively connecting the screw with said flask, substantially as set forth.

160. In a molding-machine the combination of two flasks, relatively movable, a charger therefor, a screw for imparting bodily movement to said charger, means for driving said screw alternately in opposite directions and means operating in unison with said screw for operatively connecting said flasks therewith and imparting relative movement thereto, substantially as set forth.

161. In a molding-machine the combination of an invertible flask, a charger therefor, a screw for moving said charger into register with said flask, means for driving said screw alternately in opposite directions, a clutch one member of which rotates in unison with said screw, means connecting the other member of said clutch with said flask for inverting it and means for holding said clutch members disengaged while the charger is in said registering position, operatively connected with said screw, substantially as set forth.

162. In a molding-machine the combination of means for holding a mold member in position to have the core set therein, means movable toward and away from said first means, having a core-holder for carrying and setting the core in the mold member, and means operatively connected with said second means for releasing said core-holder from the core at the end of the movement of said second means toward said first means, substantially as set forth.

163. In a molding-machine the combination of a flask for holding a mold member in position to have the core set therein, means having a support fixed with relation to said flask, said means being movable toward and away from said flask for carrying and setting the core in the mold member and movable clear of the face of the flask in its movement away from the flask, and means operatively connected with said core carrying and setting means for releasing the core therefrom, substantially as set forth.

164. In a molding-machine the combination of means for holding a mold member in position to have the core set therein, means movable toward and away from said first means provided with means for holding the core and setting the same in the mold member, and means arranged to coöperate with the core-holding means for releasing said core-holding means from the core, substantially as set forth.

165. In a molding-machine the combination of means for holding a mold member in position to have the core set therein, means movable toward and away from said first means provided with grippers for holding the core and setting the same in the mold member and means for releasing said grippers at the end of the movement of said second means, substantially as set forth.

166. In a molding-machine the combination of means for holding a mold member in position to have the core set therein, means movable toward and away from said first means provided with a core-holder, means for automatically opening said core-holder at the end of the movement of said second means and means for closing said core-holder by hand, substantially as set forth.

167. In a molding-machine the combination of means for holding a mold member in position to have the core set therein, means movable toward and away from said first means for carrying and setting the core and means for moving said second means with a gradually-decreasing speed, substantially as set forth.

168. In a molding-machine the combination of means having a core-holder invertible over the mold and comprising means for retaining and supporting the core while inverted, and means for releasing the core when the holder reaches its inverted position, substantially as set forth.

169. A molding-machine having a core-setter provided with an openable core-holder movable into first an outwardly-facing position and then into an inwardly-facing position with reference to the mold, for first receiving a core and then turning the same inwardly into the face of the mold and means in combination therewith for alternately opening and closing said core-holder, substantially as set forth.

170. In a molding-machine the combination of an oscillatory core-setter provided with a core-holder movable from an upwardly-facing horizontal position to a downwardly-facing horizontal position for alternately receiving and depositing the core, means for retaining the core in the core-setter while said holder is facing downward, and means for releasing the core when the latter position is reached, substantially as set forth.

171. In a molding-machine the combination of a core-setter having a core-holder, adapted to open and close, movable to and fro for receiving and delivering the core and means for opening said holder when the delivery-stroke is completed and holding it open until the completion of the return stroke, substantially as set forth.

172. In a molding-machine the combination of a core-setter having a core-holder, adapted to open and close, movable to and fro for receiving and delivering the core, means for opening said holder when the delivery-stroke is completed and holding it open until the completion of the return stroke and means for closing said holder after the core is inserted, substantially as set forth.

173. In a molding-machine the combination of a core-setter having a core-holder, adapted to open and close, movable to and fro for receiving and delivering the core, means for automatically opening said holder when the delivery-stroke is completed and holding it open until the completion of the return stroke and means for closing said holder by hand after the core is inserted in said holder, substantially as set forth.

174. In a molding-machine the combination of a core-setter having a core-holder, adapted to open and close, movable to and fro for receiving and delivering the core, means for opening said holder when the delivery-stroke is completed, and a catch having a hand-trigger for holding said holder open after the core has been released therefrom, substantially as set forth.

175. In a molding-machine the combination of a core-setter having a core-holder, adapted to open and close, movable to and fro for receiving and delivering the core and means operatively connected to and movable in time with said setter for opening said holder when the delivery-stroke is completed, substantially as set forth.

176. In a molding-machine the combination of a core-setter having a core-holder, adapted to open and close, movable to and fro for receiving and delivering the core, a cam or incline for opening said holder, a rocker-shaft for operating said cam one way, a spring for rocking said shaft and causing said cam to release said holder and permit it to close, a finger for rocking said shaft and causing said cam to engage and open said holder, a trigger for holding said shaft when rocked by said finger and means for oscillating said finger when the core-setter reaches the delivery position, substantially as set forth.

177. In a molding-machine the combination of a rocker-shaft, an oscillatory core-setter frame pivoted concentrically therewith, a core-holder on said frame having grippers, a wedge slidable on said frame for opening said grippers, a crank-arm on said shaft connected with said wedge, a finger on said shaft for rocking the latter one way, a catch for holding said shaft against rocking in the opposite direction, means for oscillating said finger and means for releasing said catch, substantially as set forth.

178. In a molding-machine the combination of a core-setter frame movable to and fro and a core-holder thereon comprising a core-gage for positioning the core and means movable relatively to said gage for retaining the core in said position on said gage, substantially as set forth.

179. In a molding-machine the combination of a core-setter frame movable to and fro, and a core-holder thereon comprising a core-gage for positioning the core and a spring-actuated jaw for retaining the core in position with reference to said gage, substantially as set forth.

180. In a molding-machine the combination of a core-setter frame movable to and fro, a core-holder thereon comprising a core-gage for positioning the core and a pair of jaws for gripping the core having tailpieces, and means for engaging said tailpieces and simultaneously operating said jaws, substantially as set forth.

181. In a molding-machine the combination of means for producing a mold, means for setting a core in said mold and means operatively connecting the first and second said means together, substantially as set forth.

182. In a molding-machine the combination of means for producing a mold, a core-setter, means for moving said setter to and fro operatively connected with said first means, and disengageable means for connecting the core-setter to said second means, substantially as set forth.

183. In a molding-machine the combination of a core-setter having a plurality of core-holders, adapted to open and close, operatively related to each other so as to be actuated in unison, and means for opening said holders simultaneously, substantially as set forth.

184. In a molding-machine the combination of means for producing two mold members, a core-setter for placing a core in one mold member and means for placing one mold member face to face with the other operatively connected to and timed with said core-setter, substantially as set forth.

185. In a molding-machine the combination of means for producing a mold member and turning it face upward, a core-setter for depositing a core in said mold movable relatively to said means, and means automatically connecting said core-setter and mold-producing means together, substantially as set forth.

186. In a molding-machine the combination of means for producing a mold member and turning it face upward, a core-setter normally presented face upward and movable to a downwardly-facing position over said first means, and means for releasing the core operatively connected with said first means, substantially as set forth.

187. In a molding-machine the combination of means for producing a mold, a core-setter, means for holding said core-setter stationary in a receiving position during the actuation of said mold-producing means and means operatively connected with said first means for moving the core-setter toward and from said first means and depositing the core in the mold, substantially as set forth.

188. In a molding-machine the combination of two flasks, means for forming a mold member in each thereof, a core-setter movable toward and from one of said flasks, and means for bringing said flasks together face to face operatively connected with said core-setter, substantially as set forth.

189. In a molding-machine the combination of two flasks operatively related and movable one toward the other, means for setting a core in the mold movable toward and from the face of one of said flasks and means for operating said core-setting means while the flasks are closing together, substantially as set forth.

190. In a molding-machine the combination of a flask, a reciprocating charger therefor, a core-setter movable toward and from said flask and means operatively connecting said charger with said core-setter, substantially as set forth.

191. In a molding-machine the combination of a flask, a reciprocating charger therefor, a rack-bar reciprocated by said charger, a core-setter movable toward and from the flask, a gear rotated by said rack-bar alternately in opposite directions, and an intermittent grip mechanism for imparting the rotation of said gear in one direction to said core-setter, substantially as set forth.

192. In a molding-machine the combination of a flask, a reciprocating charger therefor, a rack-bar reciprocated by said charger, a core-setter movable toward and from said flask, a gear rotated by said rack-bar alternately in opposite directions, a rotary member connected to said gear, a second rotary member independent of said gear, a crank connection between said core-setter, a second rotary member, and a pawl-and-ratchet connection between said members, substantially as set forth.

193. In a molding-machine the combination of a core-setter for carrying and setting a core in the mold, having a core-holder, means for actuating said core-setter for carrying the core to the mold, a cam operatively connected with said means and a bar actuated by said cam and arranged to coöperate with said holder for releasing the core therefrom, substantially as set forth.

194. In a molding-machine the combination of a core-setter for carrying and setting a core in the mold, having a core-holder, means for actuating said core-setter to carry the core to the mold, a cam operatively connected with said means and a bar actuated by said cam and arranged to coöperate with said core-holder for releasing the core therefrom, said cam having a centering-notch into which said bar engages at the completion of the return movement of the core-setter, substantially as set forth.

195. In a molding-machine the combination of a core-setter for carrying and setting a core in the mold, a convolute gear connected with said core-setter for moving the latter toward and from the mold, a rack-bar engaging said gear and means for reciprocating said rack-bar, substantially as set forth.

196. In a molding-machine the combination of a core-setter for carrying and setting a core in the mold, a convolute gear connected with said core-setter for moving the latter toward and from the mold, a reciprocating rack-bar having its teeth arranged in a line at an angle to its line of movement for engaging said gear and means for reciprocating said rack-bar, substantially as set forth.

197. In a molding-machine the combination of a core-setter for carrying and setting a core in the mold, a convolute gear connected with said core-setter for moving the latter toward and from the mold, a transversely-oscillatory and endwise-movable rack-bar having its teeth arranged in a line at an angle to the line of its endwise movement and engaging said gear and means for reciprocating said rack-bar, substantially as set forth.

198. In a molding-machine the combination of a core-setter for carrying and setting a core in the mold, a convolute gear connected with said core-setter for moving the latter toward and from the mold, an oscillatory rack-bar engaging said gear and a crank connected with said rack-bar for moving it endwise and also oscillating it with reference to the gear, substantially as set forth.

199. In a molding-machine the combination of a core-setter for carrying and setting a mold in the core, a gear for moving said core-setter toward and from the mold, a detachable connection for imparting the motion of said gear to said core-setter and means for rotating said gear alternately in opposite directions, substantially as set forth.

200. In a molding-machine the combination of a movable core-setter, means for forming two mold members and facing one of them toward the line of movement of said core-setter and means for moving the core-setter toward and from that one, and means for bringing the mold members together face to face operatively connected with said means for moving the core-setter, substantially as set forth.

201. In a molding-machine the combination of a core-setter, two operatively-related flasks, means for moving the core-setter toward and from one of said flasks, means for bringing the flasks together face to face and then separating them, operatively connected with said means for moving the core-setter and means for charging the flasks operatively connected with said flask-actuating means, substantially as set forth.

202. In a molding-machine the combination of two relatively movable flasks, a core-setter movable with relation to one of said flasks, means for moving said core-setter toward and from one of said flasks, means for bringing the flasks together face to face operatively connected with said core-setter-actuating means and a mold-ejector operatively connected with said flask-operating means, substantially as set forth.

203. In a molding-machine the combination of two relatively movable flasks, means for bringing said flasks together face to face, a core-setter, means for moving said core-setter toward and from one of said flasks, a mold-ejector for ejecting the mold from said flasks operatively connected with the means for moving said flasks relatively and a mold-remover operatively connected with said mold-ejector and flask-actuating means for conveying the mold from said ejector, substantially as set forth.

204. In a molding-machine the combination of means for forming a mold member, means movable toward and from said means, for setting a core in said member, operatively connected with said mold-forming means, means for ejecting the mold member from said mold-forming means and a mold-remover operatively timed with relation to the movement of said mold-ejecting means and core-setter, for receiving the mold and conveying it away from said ejector, substantially as set forth.

205. In a molding-machine the combination of two relatively movable flasks, a reciprocatory member, reversible means for reciprocating said member, means operatively connected with said member for reversing said reversible means at the two extremities of its movement alternately, charging means for filling said flasks detachably connected with said member, means for detaching said charging means when the latter reaches a position coincident with said flasks, means for moving said flasks relatively, operating in unison with said member, and means at an intermediate point of the line of travel of said member for throwing said flask-operating means out of action, substantially as set forth.

206. In a molding-machine the combination of an invertible flask-frame, means for inverting said frame, a stop, a lock carried with said frame for alternately locking said frame to said stop and means, and a second stop for limiting the movement of said means with relation to said frame after said lock has locked the frame to said first stop, substantially as set forth.

207. In a molding-machine the combination of two flasks hinged together on an axis extending longitudinally of their meeting edges, said flasks being adapted to fold together face to face and to also have their faces turned outwardly, and means individual to each of said flasks for depositing sand therein simultaneously, substantially as set forth.

208. In a molding-machine the combination of two hinged flasks movable one over and toward the other in a direction at an angle to their faces, two charger-boxes for said flasks respectively movable together to positions registering with said flasks respectively in a direction across the faces of the flasks, pattern-plates movable through said boxes respectively and means for forcing said pattern-plates toward their respective flasks, substantially as set forth.

209. In a molding-machine the combination of two flasks relatively movable face to face, means for directing the movement of one in a plane at an angle to the face of the other, two charger-boxes for said flasks respectively movable into register therewith respectively contiguous to and across the face sides thereof, and plates movable through said boxes respectively for forcing the sand therefrom into said flasks, respectively, substantially as set forth.

210. In a molding-machine the combination of two flasks relatively movable face to face, means for directing the movement of one in a plane at an angle to the face of the other, two charger-boxes for said flasks respectively connected together and movable simultaneously into register with said flasks respectively contiguous to and across the face sides of said flasks, and plates connected to each other and movable through said boxes respectively for forcing the sand therefrom into said flasks respectively, substantially as set forth.

211. In a molding-machine the combination of two flasks for making the cope and the drag respectively, relatively movable face to face, means for directing the movement of one of said flasks in a plane at an angle to the face of the other, and retaining means for holding the cope in the upper flask while being placed upon the drag, and means arranged to engage and shift said retaining means by the motion of the cope-flask, substantially as set forth.

212. In a molding-machine the combination of a flask, a charger-box movable thereunder to a position registering therewith, a pattern-plate and a stripper-plate, said plates constituting the bottom of said charger-box for supporting the sand therein, means for forcing said plates upwardly through said boxes and means for adjusting the initial or starting position of said plates relatively to the height of said box, whereby the capacity of said box above said plates may be varied and the amount of sand receivable therein accordingly varied, substantially as set forth.

213. In a molding-machine the combination of an invertible flask, a hollow sprue-funnel projecting downwardly thereinto and secured to the top thereof, a charger-box movable across and contiguous to the face of said flask, means in said box constituting the bottom thereof for forcing the sand up into said flask, and a sprue-bar supported by and movable upwardly with said means and adapted to register with said funnel for forming the sprue, substantially as set forth.

214. In a molding-machine the combination of an invertible flask, a hollow sprue-funnel projecting downwardly thereinto and secured to the top thereof, a charger-box movable across and contiguous to the face of said flask, means in said box constituting the bottom thereof for forcing the sand up into the flask, and a sprue-bar supported by and movable upwardly with said means and adapted to register with the funnel for forming the sprue, said sprue-bar being long enough when in its lowest position to project near the lower face of the flask, so as to leave but little sand above it to be forced into the sprue-funnel, substantially as set forth.

215. In a molding-machine the combination of a cope-flask and a drag-flask definitely related and movable one over the other on an axis extending longitudinally of the contiguous edges thereof, a cope pattern and a drag pattern for said flasks respectively, means for moving said patterns to positions registering with their respective flasks, a stop for arresting the movement of the patterns when they reach positions registering with the flasks and equidistant from said axis on a line crossing said axis at right angles thereto, and means for forcing said patterns against the sand in their respective flasks, substantially as set forth.

216. In a molding-machine the combination of a flask, a sand-hopper, a charger-box movable laterally into register with said hopper and in contact with the lower surface thereof, and means for forcing the sand laterally toward the side of the box remote from said hopper while the box is moving toward and is in register with the hopper, substantially as set forth.

217. In a molding-machine the combination of a flask, a flask-frame, means for inverting said flask-frame, a rotary member, means for intermittently connecting said rotary member with said flask-frame for inverting it, means for rotating said member alternately in opposite directions and a stop for limiting the movement of said rotary member with relation to said frame after the rotary member has been released from the frame, substantially as set forth.

218. In a molding-machine the combination of a flask, a pattern-plate, a stripper-plate, means for actuating said pattern-plate to withdraw and positively-acting means for actuating said stripper-plate to withdraw after the pattern-plate has started to withdraw, with a gradually-decreasing speed, substantially as set forth.

219. In a molding-machine the combination of an invertible flask, retaining-strips arranged at the sides of the flask and adapted to be projected inwardly beyond the edges thereof, and means smaller in diameter than the flask but substantially equal in diameter to the distance between the retaining-strips when the latter are in their closed or retaining position, for simultaneously depositing and ramming the sand in the flask, through the face side of the flask while the retaining-strips occupy their closed or retaining position, substantially as set forth.

220. In a molding-machine the combination of an invertible flask, retaining-strips arranged at the sides of the flasks and adapted to be projected inwardly beyond the edges thereof, a charger-box of smaller diameter than said flask, movable into register with the retaining-strip side thereof and a support for the sand in said box, of smaller diameter than the flask and of not greater diameter than the distance between the retaining-strips when in their closed or retaining position, and means for forcing said support through said box toward the flask, substantially as set forth.

221. In a molding-machine the combination of two flasks hinged together and adapted to fold one over the other, the upper one of said flasks having a permanent rigid bottom, a sprue-funnel permanently secured to said bottom and projecting into said upper flask, a removable bottom board in the lower one of said flasks, separate pattern-plates for said flasks respectively, means for forcing said pattern-plates toward their respective flasks, and means for raising the bottom board upwardly through the bottom flask, substantially as set forth.

GEORGE W. PACKER.

Witnesses:
F. A. HOPKINS,
D. C. GURNEE.